US010943345B2

(12) United States Patent
Barker et al.

(10) Patent No.: US 10,943,345 B2
(45) Date of Patent: Mar. 9, 2021

(54) PROFILING OF PATHOLOGY IMAGES FOR CLINICAL APPLICATIONS

(71) Applicant: The Board of Trustees of the Leland Stanford Junior University, Stanford, CA (US)

(72) Inventors: Jocelyn E. Barker, San Jose, CA (US); Daniel L. Rubin, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 167 days.

(21) Appl. No.: 15/776,041

(22) PCT Filed: Nov. 15, 2016

(86) PCT No.: PCT/US2016/062088
§ 371 (c)(1),
(2) Date: May 14, 2018

(87) PCT Pub. No.: WO2017/087415
PCT Pub. Date: May 26, 2017

(65) Prior Publication Data
US 2018/0374210 A1 Dec. 27, 2018

Related U.S. Application Data

(60) Provisional application No. 62/256,550, filed on Nov. 17, 2015.

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/0014* (2013.01); *G06K 9/00147* (2013.01);
(Continued)

(58) Field of Classification Search
None
See application file for complete search history.

(56) References Cited

U.S. PATENT DOCUMENTS

| 6,272,235 B1 | 8/2001 | Bacus et al. |
| 8,934,718 B2 | 1/2015 | Cosatto et al. |

(Continued)

FOREIGN PATENT DOCUMENTS

| CN | 105550651 | 5/2016 |

OTHER PUBLICATIONS

Arthur and Vassilvitskii (2007) "K-means++: The Advantages of Careful Seeding, in: Proceedings of the Eighteenth Annual ACM-SIAM Symposium on Discrete Algorithms, SODA '07" Society for Industrial and Applied Mathematics; 1027-1035.

(Continued)

*Primary Examiner* — Soo Jin Park
(74) *Attorney, Agent, or Firm* — Brian E. Davy; Bozicevic, Field & Francis LLP

(57) ABSTRACT

Provided are automated (computerized) methods and systems for analyzing digitized pathology images in a variety of tissues potentially containing diseased or neoplastic cells. The method utilizes a coarse-to-fine analysis, in which an entire image is tiled and shape, color, and texture features are extracted in each tile, as primary features. A representative subset of tiles is determined within a cluster of similar tiles. A statistical analysis (e.g. principal component analysis) reduces the substantial number of "coarse" features, decreasing computational complexity of the classification algorithm. Afterwards, a fine stage provides a detailed analysis of a single representative tile from each group. A second statistical step uses a regression algorithm (e.g. elastic net classifier) to produce a diagnostic decision value for each representative tile. A weighted voting scheme (Continued)

aggregates the decision values from these tiles to obtain a diagnosis at the whole slide level.

20 Claims, 22 Drawing Sheets

(51) Int. Cl.
    *G06T 7/12*     (2017.01)
    *G06T 7/13*     (2017.01)
    *G06T 7/90*     (2017.01)
    *G06K 9/46*     (2006.01)
    *G06K 9/62*     (2006.01)

(52) U.S. Cl.
    CPC .................. *G06T 7/12* (2017.01); *G06T 7/13* (2017.01); *G06T 7/90* (2017.01); *G06K 9/4652* (2013.01); *G06K 9/6247* (2013.01); *G06K 2209/05* (2013.01); *G06T 2207/10024* (2013.01); *G06T 2207/10056* (2013.01); *G06T 2207/20016* (2013.01); *G06T 2207/20021* (2013.01); *G06T 2207/20064* (2013.01); *G06T 2207/20076* (2013.01); *G06T 2207/30016* (2013.01); *G06T 2207/30024* (2013.01); *G06T 2207/30028* (2013.01); *G06T 2207/30061* (2013.01); *G06T 2207/30096* (2013.01)

(56) References Cited

U.S. PATENT DOCUMENTS

| | | | |
|---|---|---|---|
| 9,805,248 B2 * | 10/2017 | Brieu | .................... G06K 9/4642 |
| 2013/0034301 A1 | 2/2013 | Cosatto et al. | |
| 2014/0233826 A1 | 8/2014 | Agaian et al. | |

OTHER PUBLICATIONS

Depeursinge et al. (2014) "Rotation Covariant Texture Learning Using Steerable Riesz Wavelets" IEEE Trans. Image Process. 23(2):898-908.
Ghaznavi et al. (2013) "Digital Imaging in Pathology: Whole-Slide Imaging and Beyond," Annu. Rev. Pathol. Mech. Dis.; 8:331-359.
Gurcan et al. (2009) "Histopathological Image Analysis: A Review" IEEE Rev. Biomed. Eng.; 2:147-171.
Haralick (1979) "Statistical and structural approaches to texture," Proc. IEEE, 67(5):786-804.
Kong et al. (2009) "Computer-aided evaluation of neuroblastoma on whole-slide histology images: Classifying grade of neuroblastic differentiation. Pattern Recognit." Digital Image Processing and Pattern Recognition Techniques for the Detection of Cancer; 42(6):1080-1092.
Kong et al. (2013) "Machine-Based Morphologic Analysis of Glioblastoma Using Whole-Slide Pathology Images Uncovers Clinically Relevant Molecular Correlates" PLoS ONE; 8(11):e81049.
Langley et al. (2010) "The Riesz transform and simultaneous representations of phase, energy and orientation in spatial vision," Vision Research, 50:1748-1765.
Rojo et al. (2006) "Critical Comparison of 31 Commercially Available Digital Slide Systems in Pathology," Int. J. Surg. Pathol.; 14(4):285-305.
Ruiz et al. (2007) "Pathological Image Analysis Using the GPU: Stroma Classification for Neuroblastoma" IEEE International Conference on Bioinformatics and Biomedicine; 78-88.
Sertel et al. (2009) "Computer-aided prognosis of neuroblastoma on whole-slide images: Classification of stromal development. Pattern Recognit." Digital Image Processing and Pattern Recognition Techniques for the Detection of Cancer; 42(6):1093-1103.
Xu et al. (2014) "Weakly supervised histopathology cancer image segmentation and classification" Med. Image Anal.; 18:591-604.
Zou and Hastie (2005) "Regularization and variable selection via the Elastic Net" J. R. Stat. Soc. Ser. B; 67:301-320.

* cited by examiner

B

Days

PROFILING OF PATHOLOGY IMAGES FOR CLINICAL APPLICATIONS

CROSS-REFERENCE TO RELATED APPLICATIONS

This application claims the benefit of U.S. Provisional Patent Application Ser. No. 62/256,550, filed Nov. 17, 2015, the disclosure of which is herein incorporated by reference in its entirety.

STATEMENT OF GOVERNMENTAL SUPPORT

This invention was made with Government support under contracts CA141457 and CA142555 awarded by the National Institutes of Health. The Government has certain rights in the invention.

INTRODUCTION

Presented below is background information on certain aspects of the present invention as they may relate to technical features referred to in the detailed description, but not necessarily described in detail. That is, individual compositions or methods used in the present invention may be described in greater detail in the publications and patents discussed below, which may provide further guidance to those skilled in the art for making or using certain aspects of the present invention as claimed. The discussion below should not be construed as an admission as to the relevance or the prior art effect of the patents or publications described.

While computer aided diagnosis has become common in radiology (Doi, 2007), there have been challenges in realizing similar successes in pathology. Only a fraction of pathology practices digitize their slides (Onega et al., 2014). Even if digital images were more widely available, there are two key challenges to computerized analysis of whole-slide pathology images (WSI). First, pathology images are large with each image consisting of around $10^{10}$ pixels, and processing this large amount of information can be computationally expensive. Second, large portions of pathology images contain non-tumor tissue, which is not necessarily relevant to the diagnosis. Signals arising from substantial tissue regions not directly relevant to the diagnosis may mislead computerized diagnosis algorithms. Thus, there are two key challenges thwarting computerized analysis of digital pathology images: first, whole slide pathology images are massive, making computerized analysis inefficient, and second, diverse tissue regions in whole slide images that are not directly relevant to the disease may mislead computerized diagnosis algorithms. Two approaches have been undertaken to attempt to overcome these obstacles, subsetting the image and tiling the image.

Image Subsetting Methods

Subsetting the image is the most common approach, where one selects a small region of the image for processing, simultaneously reducing the image size and potentially extraneous tissue present in the image. Even before WSI was practical, researchers captured a single frame of an entire slide using a standard microscope creating a subset of the image for computational analysis (Adiga et al., 2006; Aiad et al., 2009; Altunbay et al., 2010; Baak et al., 1981; Brook et al., 2007; Esgiar et al., 2002, 2002; Farjam et al., 2007; Fatima et al., 2014; Glotsos et al., 2008; Gunduz et al., 2004; Gupta et al., 2001; Hall et al., 2008; Huang and Lai, 2010; Huang and Lee, 2009; Jafari-Khouzani and Soltanian-Zadeh, 2003; Kong et al., 2007; Land et al., 2008; Lessmann et al., 2007; Meng et al., 2010; Ozolek et al., 2014; Qureshi et al., 2008, 2007; Sboner et al., 2003; Schnorrenberg et al., 1997; Sudbø et al., 2000; Tahir and Bouridane, 2006; Tasoulis et al., 2003; Thiran and Macq, 1996; Tsai et al., 2009). For many researchers doing pathology image analysis today, this is still the best option, either because they do not have access to a WSI system, or because they can capture data not possible with a WSI system, such as confocal microscopy images.

A similar approach is to manually designate a region in the WSI for analysis (Al-Kadi, 2010; Basavanhally et al., 2010, 2008; Doyle et al., 2012a, 2008, 2007; Dundar et al., 2011, 2010; Qureshi et al., 2008; Sertel et al., 2010). This is essentially the same as the subsetting process described above: in both procedures, a human uses their knowledge and time to reduce the data available for analysis based on their evaluation of what is informative.

One group has specifically applied this tactic to the problem of distinguishing lower grade gliomas (LGG) from glioblastoma multiforme (GBM; Mousavi et al., 2015). In their method, a pathologist selects multiple regions of interest from each histopathological slide. Classification identifies regions of interest containing two hallmarks of GBM: microvascular proliferation and pseudopalisading necrosis. It may be difficult to generalize the method to other problems as the method requires a specific tissue type to identify that defines each class. Additionally, for a problem like distinguishing GBM from LGG, the process of identifying a region for analysis (ie. pseudopalisading necrosis) is the same process pathologists use to diagnose the disease, making the computational analysis less helpful in terms of the efficiency of the pathologist workflow.

An alternative method for subsetting the data uses automatic segmentation to identify regions of interest in the image for analysis. Since these methods are automatic, they are not subjective and do not require a time commitment from an individual with pathology expertise. This method has most commonly been applied to assigning a Gleason grade to prostate cancer samples (Doyle et al., 2012b; Monaco et al. 2008, 2010; Naik et al., 2008, 2007; Sparks and Madabhushi, 2013) though it has found applications in other cancers as well (Petushi et al., 2006). The Gleason scoring system is particularly well suited to this type of analysis because the system characterizes how ordered the glands are in a prostate tumor. In other applications where the task is not so rigidly defined, determining a target for segmentation may be a limiting factor in the method's applicability.

All of these approaches to subsetting WSI share a common limitation; a human must decide what data is valuable for analysis. This limits the analysis' ability to discover signal in previously unappreciated regions of the slide.

Image Tiling Methods

A second approach to tackling the challenges to computerized analysis of WSI uses tiling to break the image into small, manageable pieces (Kong et al., 2013, 2009; Ruiz et al., 2007; Sertel et al., 2009), analyzing each image piece, as opposed to just examining a few selected regions. However this increase in data means an increase in computation complexity. In order to characterize the oligodendroglioma vs astrocytoma components of 117 GBM samples, Kong et al., 2013 segmented and classified over 200 million nuclei. Based on this high computational complexity, it is easy to understand why Ruiz et al., 2007 focused their work on using a GPU to reduce the execution time of their stromal classification in neuroblastoma.

An alternative approach to reduce computational load while still examining the entire WSI is to reduce the image resolution. For their stromal classification in neuroblastoma, Sertel et al., 2009 used a multi-resolution approach to classify their slides, starting with low resolution and continuing to a higher one in the case of a weak classifier decision.

While these approaches have managed to leverage the vast quantities of information available in the WSI, there is room for improvement in determining the final decision. Both stromal classification and oligodendroglioma vs astrocytoma characterizations classify the slide based on the area occupied by a particular tissue type. Therefore, the methods can classify individual tiles as the clinically relevant tissue type, and then classify the entire image by determining the dominant tissue type in the slide. However, these approaches are unsuitable for diseases where a local feature determines the diagnosis for the slide or where the disease they are classifying is heterogeneous, such as in the LGG vs GBM classification. Additionally, many of them do not perform well with images containing a large amount of extraneous tissue, as this tissue can bias their classification.

In order to develop computer aided diagnosis systems for pathology, it is important not only to analyze the data present in the entire WSI, but also be able to filter out the important signal (i.e., relevant regions in the WSI) from the background.

Histopathology of Gliomas Gliomas account for 28% of primary brain tumors and tumors of the central nervous system, and make up 80% of malignant brain tumors, affecting Americans at a rate of 5.83 per 100,000 in 2007-2011 (Ostrom et al., 2014). Of those, glioblastoma multiforme (GBM, WHO grade 4) represents 54.7%, and lower grade gliomas (LGG, astrocytomas, oligodendrogliomas, and oligoastrocytomas, WHO grade 2 and 3) represent 24.2% of the gliomas. The prognosis for GBM is dire with a 1-year survival at 36.5%, with only 5.0% surviving 5-years, whereas the 5-year survival for LGG is much higher at 51.4%. Not only does prognosis differ for patients, but the choice of therapy differs as well (Khasraw and Lassman, 2010). Many LGG subtypes have curative treatments, but only palliative treatments exist for GBM (Preusser et al., 2011). Thus it is of critical importance to differentiate GBM from LGG when making decisions on patient treatment options.

The primary way of differentiating GBM from LGG is through histopathology. The primary distinguishing features of GBM include vascular thrombosis, microvascular proliferation, and necrosis (Cavenee et al., 2007). However, these features are not always clear, and they can be difficult to find and recognize in whole slide images, likely accounting for the high inter-reader variability observed between pathologists (Coons et al., 1997).

Three common subtypes of LGG are astrocytomas, oligodendrogliomas, and oligoastrocytomas. Astrocytomas develop from the star-shaped astrocytes (FIG. 1A). While astrocytomas have some molecular commonalities, there is no unifying histopathological phenotype, rather multiple subtypes exist, each with their own identifying set of features. Oligodendrogliomas develop from the branching oligodendrocytes (FIG. 1B). Like the oligodendrocytes they derive from, oligodendrogliomas have a perinuclear halo, giving the tumor cells a "fried egg" appearance. Oligoastrocytomas tumors have a mixed population with some cells showing a more astrocytoma like phenotype and others appearing more like oligodendroglioma cells. Lower grade gliomas, as defined by The Cancer Genome Atlas (TCGA), comprise grade 2 and 3 gliomas, where grade 2 tumors show only cytological atypical and grade 3 tumors also show anaplasia and mitotic activity.

Glioblastoma multiforme is a grade 4 astrocytic tumor. As the descriptor "multiforme" in the name suggests, GBM varies in appearance. While all tumors are highly cellular with high degrees of anaplasia and mitotic activity, some tumors have nuclei which are highly polymorphic, containing many giant multinucleated cells, whereas others are monotonous. While astrocytic features are easily identified in some tumors, they are difficult to distinguish in others due to extreme anaplasia. The primary distinguishing features of GBM include vascular thrombosis, microvascular proliferation, and necrosis (particularly pseudopalisading necrosis) (FIG. 2A, 2B, 2C). The remarkable regional heterogeneity of the tumors makes them challenging to diagnose if these distinguishing features are not present in regions of the pathology image analyzed.

It is believed that computer aided diagnosis applied to digital pathology images can help make the histopathological designation of glioma subtypes clearer by providing reproducible and exhaustive image analysis (Hamilton et al., 2014). In addition, adoption of such computerized methods may improve the pathologists' workflow, and reduce inter-reader variability.

Computerized analysis of digital pathology images offers the potential of improving clinical care (e.g. automated diagnosis) and catalyzing research (eg. discovering disease subtypes).

SPECIFIC PATENTS AND PUBLICATIONS

Ghaznavi et al., "Digital Imaging in Pathology: Whole-Slide Imaging and Beyond," Annu. Rev. Pathol. Mech. Dis. 2013. 8:331-59, presents a review of digital imaging in pathology. Rojo et al., "Critical Comparison of 31 Commercially Available Digital Slide Systems in Pathology," Int. J. Surg. Pathol. 14:285-305 (2006) describes different digital microscopy systems. Cosatto, U.S. Pat. No. 8,934,718, "Interactive analytics of digital histology slides," describes a method for interactive image analysis.

BRIEF SUMMARY OF THE INVENTION

The following brief summary is not intended to include all features and aspects of the present invention, nor does it imply that the invention must include all features and aspects discussed in this summary.

In certain aspects, the present invention comprises a computerized method for classifying tissue characteristics in digital pathology images comprising the steps of: (a) obtaining a digital pathology image of a tissue from a subject (such as brain tissue); (b) dividing the digital pathology image into tiles (contiguous shapes defined in a image to divide it into sections); (c) extracting primary ("coarse") features from the tiles step (b), the primary features comprising shape, color, and texture features in the image; (d) grouping similar tiles (i.e. with similar feature values) into a number of sets based on similarity of the primary features; (e) selecting a representative tile from each set in step (d), based on feature values; (f) extracting secondary features from a selected tile, in the selected tiles in step (e), wherein the secondary features refine primary features; and (g) assigning values to selected tiles, based on secondary features; (h) comparing the values in step (g) to values in a reference, and thereby generating a classification of tissue in the image, wherein the classification indicates a disease condition or prognosis.

In certain aspects, the present invention comprises classifying a digital pathology image of a tissue in step (a) that is selected from tissues from brain, lung, breast, thyroid, blood, prostate tissue, duodenum, and colon. In certain aspects, the present invention comprises using slides wherein the slides are digitally scanned at multiple resolutions between from about 2.5-40×. In certain aspects, the present invention comprises a step of obtaining a digital pathology image that comprises obtaining an image stained with two different stains, one basic and one acidic, whereby DNA structures and RNA structures are stained by the basic stain and proteins and cytoplasmic structures are stained by the acidic stain.

In certain aspects, the present invention comprises one wherein dividing, preferably substantially the entire pathology image, into tiles comprises dividing into between 5 and 20 tiles, and each tile has a size of about 1024 by 1024 pixels (1,048,576 pixels), or a pixel count between about 500,000 pixels to 2 million pixels.

In certain aspects, the present invention comprises the present method further comprising a step of deconvoluting colors from the two different stains, prior to extracting primary features.

In certain aspects of the present invention extracting primary features comprises determining at least one of nuclear segmentation, an unaligned Reisz feature, and a Haralick texture feature. In certain aspects, the present invention comprises a method wherein the step of grouping similar tiles comprises conducting one or both of a principal component analysis (PCA) to reduce the number of primary features and a K-means clustering.

In certain aspects, the present invention comprises a method wherein the step of selecting representative tiles comprises determining a single representative tile whose values are the closest to the centroid of the cluster. In certain aspects, the present invention comprises a method wherein (f) extracting secondary features comprises determining primary features in greater detail. Such greater detail comprises aligning Reisz features (optionally with dyadic scales) and may further comprise more skeleton features of the nuclear morphology.

In certain aspects, the present invention comprises grouping similar tiles using statistical methods, such as assigning a value to each selected tile generating a classification comprises using a regression model.

In certain aspects of the invention, the regression model comprises an elastic net linear regression model.

In certain aspects, the present invention comprises a method wherein the step of assigning a value comprises weighted voting. In certain aspects, the present invention comprises a method wherein the step of generating a classification comprises a classification of a type of cancer. In certain aspects of the present invention, the classification distinguishes a type of brain cancer (e.g. lower grade gliomas and glioblastoma multiforme).

In certain aspects, the present invention comprises a step of generating a classification that further comprises a classification of gender, and the tissue is brain tissue from a subject having a brain cancer.

In certain aspects, the present invention comprises determining levels of OTX2, MAGEC2, PITX2, and BARX1 gene expression in the subject, wherein increased expression indicates preferential prognoses for males and detrimental prognoses for females.

In certain aspects, the present invention comprises a computer system for classifying tissue characteristics in digital pathology images, comprising a computer-readable storage device containing a set of instructions that causes a computer to perform the steps of a method in the various embodiments listed above and described herein.

In certain aspects, the present invention comprises a computer-readable storage medium containing instructions for carrying out methods as listed above and described herein.

DETAILED DESCRIPTION

Overview

Disclosed herein is a method to analyze digital pathology images that utilizes a coarse-to-fine analysis of the localized characteristics in pathology images. An initial surveying stage analyzes the diversity of coarse regions in the whole slide image. This includes extraction of spatially localized features of shape, color and texture from tiled regions covering the slide. Dimensionality reduction of the features assesses the image diversity in the tiled regions and clustering creates representative groups. A second stage provides a detailed analysis of a single representative tile from each group. An Elastic Net classifier produces a diagnostic decision value for each representative tile. A weighted voting scheme aggregates the decision values from these tiles to obtain a diagnosis at the whole slide level.

Figure 1:
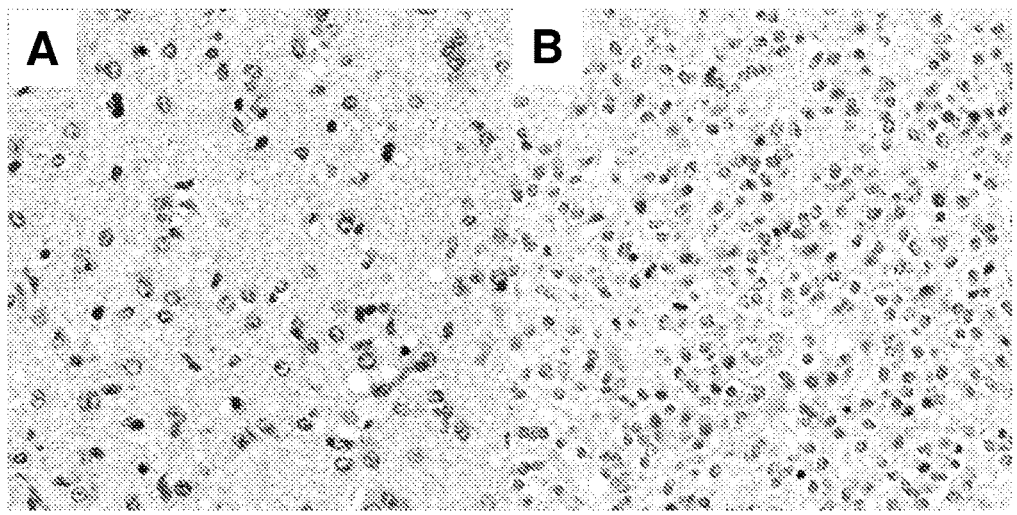
FIG. 1 (Panels A and B) provides sample micrograph images of Lower Grade Gliomas showing a grade 3 anaplastic astrocytoma (Panel A) and a grade 2 oligodendroglioma (Panel B). Note the perinuclear halos in Panel B, seen as a decrease in the eosin stain surrounding the nuclei.
Figure 2:
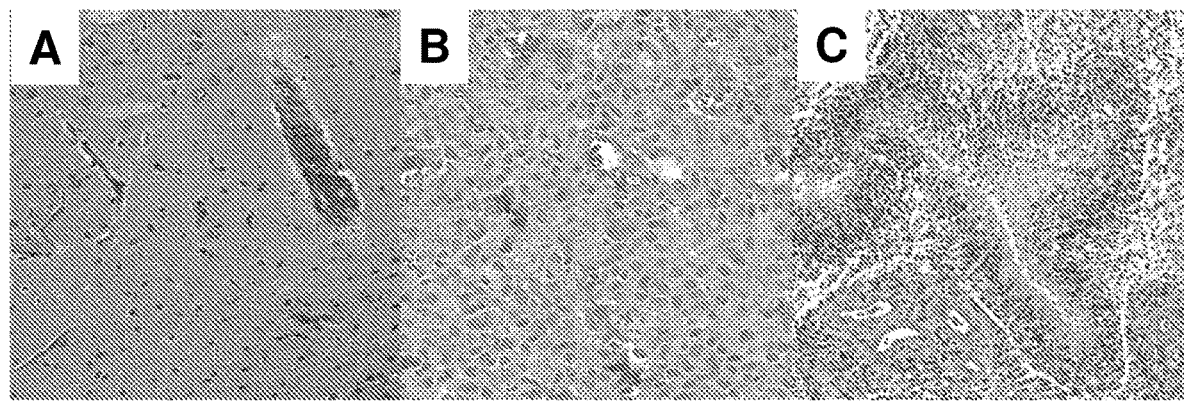
FIG. 2 (Panels A, B and C) provides micrograph images showing three features distinguishing glioblastoma multiforme, vascular thrombosis (Panel A), microvascular proliferation (Panel B), and pseudopalisading necrosis (Panel C).
Figure 3:
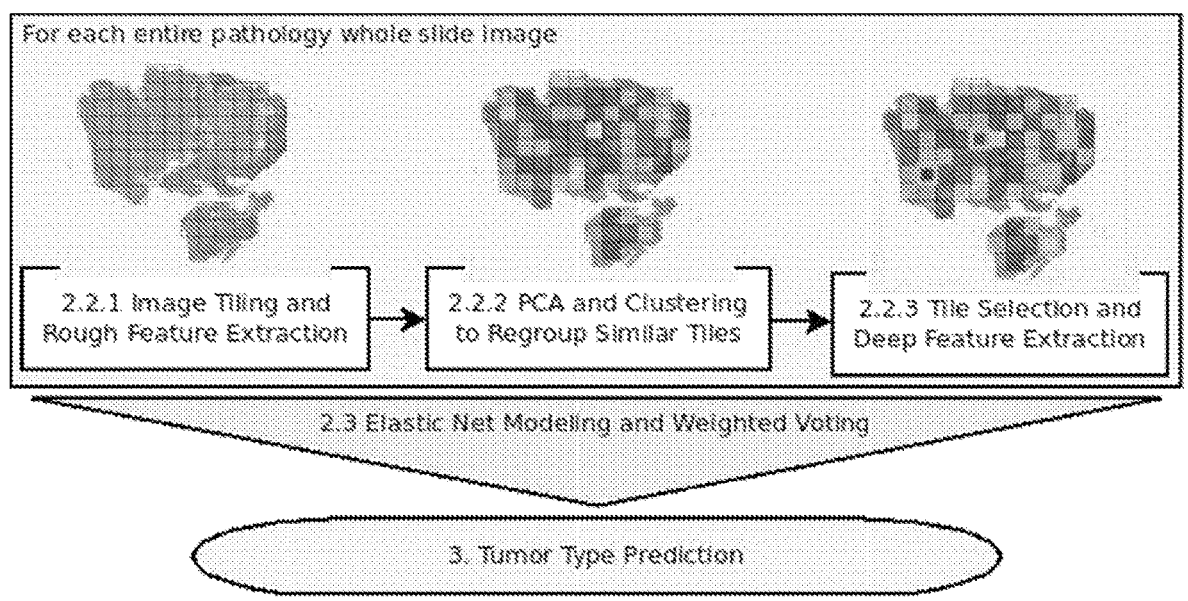
FIG. 3 is a schematic of the pipeline for pathology analysis. Images show a scaled down representative whole-slide image with boxes showing representative tiles from each of the 10 grouped tiles.

As shown in FIG. 3, the pipeline uses a "coarse-to-fine" approach for analyzing the pathology images, where "coarse profiling" assesses image content diversity, followed by "fine profiling" to produce the final evaluation. First, the pipeline tiles input whole slide pathology images and coarsely characterizes them by extracting shape, color, and texture features (i.e., "coarse (primary) features") from each tile. It then clusters all tiles contained within an individual image and identifies tiles nearest the cluster center to select a representative subset of tiles while fostering their diversity. In a second step, the pipeline carries out a deeper characterization of the representative tiles by extracting a more comprehensive set of image features from them (i.e., "fine (secondary) features"). This two-stage approach avoids having to extract all features from all tiles and the corresponding intractable computational load. An Elastic Net classifier (Zou and Hastie, 2005) provides a decision value for each tile. A weighted voting scheme aggregates these decision values to obtain a global decision at the whole-image level.

The present method allows for the classification of whole slide digital pathology images of brain tumors into the GBM and LGG diagnostic categories. The method may be completely automated. It allows for the analysis of the whole tumor through a coarse profiling stage while reducing the noise present in the sample by selecting a smaller number of representative regions. The final step consists of weighted region voting, which allows image regions with strong signal to outweigh signals arising from less relevant (i.e., non-signal containing) regions present in the slide. The present method was evaluated by automatically classifying 302 brain cancer cases into two possible diagnoses (glioblastoma multiforme (N=182) versus lower grade glioma (N=120)) with an accuracy of 93.1% (p<<0.001). The method was also evaluated in the dataset provided for the MICCAI Challenge, in which the present method, trained and tested using 5-fold cross validation, produced a classification accuracy of 100% (p<<0.001). The method showed high stability and robustness to parameter variation, with accuracy varying between 95.5-100% when evaluated for a wide range of parameters. The present approach may be useful to automatically differentiate between the two cancer subtypes.

Definitions

Unless defined otherwise, all technical and scientific terms used herein have the same meaning as commonly understood by those of ordinary skill in the art to which this invention belongs. Although any methods and materials similar or equivalent to those described herein can be used in the practice or testing of the present invention, the preferred methods and materials are described. Generally, nomenclatures utilized in connection with, and techniques of, pathology, microscopy and image processing are those well-known and commonly used in the art. Certain experimental techniques, not specifically defined, are generally performed according to conventional methods well known in the art and as described in various general and more specific references that are cited and discussed throughout the present specification. For purposes of clarity, the following terms are defined below.

Ranges: For conciseness, any range set forth is intended to include any sub-range within the stated range, unless otherwise stated. As a non-limiting example, a range of 120 to 250 is intended to include a range of 120-121, 120-130, 200-225, 121-250 etc. The term "about" has its ordinary meaning of approximately and may be determined in context by experimental variability. In case of doubt, the term "about" means plus or minus 5% of a stated numerical value. Similarly, a stated range, for example, of 90 to 95 present should be read as a possible range of 91-92, 90-92, 90-93, etc.

The term "substantially" has its common meaning, and will be apparent to the reader from the context. In case of doubt, "substantially" refers to at least 55%, and often more than 75%.

The term "digital pathology image" has the accepted meaning (see, e.g. publications from the Digital Pathology Association). It will be understood that such images will have features in the images representing tissue features, such as shape and color, and texture. representing feature appearance taken together, e.g. mosaic, ground glass, etc. As described below, these features can be extracted in quantitative form.

The term "tile" refers to dividing an image into contiguous, equivalent images of a predetermined size within the image. An exemplary image of tiling is shown in FIG. 3. Typically, but not necessarily, the tiles will be square; the will be of substantially equal size.

The term "Riesz feature" is used in reference to the known Riesz transform (See Langley et al., "The Riesz transform and simultaneous representations of phase, energy and orientation in spatial vision," Vision Research, 50:1748-1765 (2010)) and applies here to a texture learning approach that exploits local organizations of scales and directions. First, linear combinations of Riesz wavelets are learned using kernel support vector machines. The visualization of the obtained signatures allows verifying the visual relevance of the learned concepts. Second, the local orientations of the signatures are optimized to maximize their responses, which is carried out analytically and can still be expressed as a linear combination of the initial steerable Riesz templates. This is further elucidated in the cited paper, Depeursinge, A., Foncubierta-Rodriguez, A., Van De Ville, D., Muller, H., 2014. "Rotation Covariant Texture Learning Using Steerable Riesz Wavelets," IEEE Trans. Image Process. 23, 898-908.

An "unaligned" Reisz feature is one generated, as in the above paper, where local orientations of the signatures are left unaligned rather than being optimized to maximize their responses. This reduces computational time at the expense of leaving the features variable to image rotation.

Aligning Reisz features is used in the sense described, e.g. in Depeursinge 2014, cited below. As described there, the signatures are optimized to maximize their responses, which is carried out analytically and can still be expressed as a linear combination of the initial steerable Riesz templates. The global process is iteratively repeated to obtain final rotation-covariant texture signatures.

The term "K-means clustering" is used to mean the conventional k-means unsupervised learning algorithm further described in J. B. MacQueen (1967): "Some Methods for classification and Analysis of Multivariate Observations, *Proceedings of 5-th Berkeley Symposium on Mathematical Statistics and Probability*", Berkeley, University of California Press, 1:281-297 initialized using the kmeans++ method described in Arthur, D. and Vassilvitskii, S. (2007). "*k-means++: the advantages of careful seeding*" (PDF). *Proceedings of the eighteenth annual ACM-SIAM symposium on Discrete algorithms*. Society for Industrial and Applied Mathematics Philadelphia, Pa., USA. pp. 1027-1035. It will classify a given data set through a certain number of clusters (assume k clusters) fixed a priori. The main idea is to define k centroids, one for each cluster.

The term "principal component analysis" is used in the standard sense to refer to a statistical procedure that uses an orthogonal transformation to convert a set of observations of possibly correlated variables into a set of values of linearly uncorrelated variables called principal components. It is available in a number of commercial software products.

The term "Haralick texture feature" refers to texture features calculated as described in Robert M. Haralick, "Statistical and structural approaches to texture," *Proc. IEEE*, vol. 67, no. 5, pp. 786-804, 1979. A software implementation is available from MATLAB Central.

The term "elastic net" refers to a linear regression method as described in Example 3 below.

The terms "OTX2, MAGEC2, PITX2, and BARX1" refer to the standard human gene names given in, for example, in the GeneCards® human gene database, i.e., Orthodenticle Homeobox 2, Melanoma Antigen Family C2, Paired-Like Homeodomain 2, and BARX Homeobox 1.

The term "reference value" refers to numerical values of various features analyzed as described below, where the reference values are known to have been derived from pathology specimens with a known classification. Reference values may be derived from normal tissue, cancerous tissue, male tissue, female tissue, infected tissue, or from a tissue having a particular type or degree of cancer. The reference values is compared to values obtained in the present method from an image to be analyzed.

General Methods

A novel, automated method for classifying digital pathology images of tissues such as brain, duodenum, colon, esophagus, lung, breast, or other potentially neoplastic tissues has been developed. In particular, a system and method that has a computerized system that recognizes GBM versus LGG has been developed. The method is unique in combining three components: (i) coarse profiling of regions within the image to sample tissue diversity, (ii) identifying representative regions automatically in WSI, and (iii) allowing all the representative regions to independently impact the final diagnosis. The method further comprises a more detailed analysis of the coarse profiling. This second step comprises determining fine features in the representative regions (tiles). It is believed that all aspects of the present model are unique and contribute strongly to the high accuracy that is achieved. The model shows low sensitivity to parameters related to the number of clusters, PCA components as well as parameters in the elastic net model. Even with substantial changes to those parameters the accuracy of the classification remains high at 95.5-100%. It is believed that obtaining the appropriate and full representation of the image characteristics is one of the reasons for the high stability of the method.

A variety of prior works have used computational feature extraction from images for classification, but many of these methods selected smaller areas of the tumor for processing (Alexe et al., 2009; Adiga et al., 2006; Aiad et al., 2009; Al-Kadi, 2010; Altunbay et al., 2010; Baak et al., 1981; Basavanhally et al., 2010, 2008; Brook et al., 2007; Doyle et al., 2012a, 2013b, 2008, 2007; Dundar et al., 2011, 2010; Esgiar et al., 2002, 2002; Farjam et al., 2007; Fatima et al., 2014; Glotsos et al., 2008; Gunduz et al., 2004; Gupta et al., 2001; Hall et al., 2008; Huang and Lai, 2010; Huang and Lee, 2009; Jafari-Khouzani and Soltanian-Zadeh, 2003; James P Monaco, 2008; Kong et al., 2007; Kwak et al., 2011; Land et al., 2008; Lessmann et al., 2007; Meng et al., 2010; Monaco et al., 2010; Naik et al., 2008, 2007; Ozolek et al., 2014; Petushi et al., 2006; Qureshi et al., 2008, 2007; Sboner et al., 2003; Schnorrenberg et al., 1997; Sertel et al., 2010; Sparks and Madabhushi, 2013; Sudbø et al., 2000; Tabesh and Teverovskiy, 2006; Tabesh et al., 2007, 2005; Tahir and Bouridane, 2006; Tasoulis et al., 2003; Teverovskiy et al., 2004; Thiran and Macq, 1996; Tsai et al., 2009; Xu et al., 2014; Yang et al., 2009). These approaches also limit the analysis to regions of the image already known to contain signal and therefore limit the potential of discovering new signal in previously unappreciated regions of the tissue sample. However, since the present method is completely agnostic to any predefined tissue structures, it is free to discover signal that had been previously overlooked. Additionally, many previous methods require human intervention, introducing subjectivity, as a human must select a region to be characterized. This subjective step may introduce inter-reader variability, as seen in traditional pathology (Coons et al., 1997). Since the present method is completely automatic, the potential for this type of variability is greatly reduced.

Hierarchical analysis of WSI where an analysis with a reduced computational load precedes a more computationally intensive one has been effective in the past (Sertel et al., 2009). In the present analysis, this is leveraged by using the coarse (primary) features to select representative regions, allowing the model to include information from the entirety of the slide, which average 2 GB. This novel use of coarse analysis eliminates the need for information about the regions of the slide containing tumor versus normal tissue, or the high computational complexity to analyze the whole image as in the methods discussed above. The proposed method overcomes these issues by being completely naive to pathological designations and can work without input from a pathologist or requiring automated tumor segmentation, while still requiring modest computational resources. The information provided by the coarse (primary) features can then be used to appropriately select regions for fine (secondary) feature analysis, increasing the accuracy of the model.

Extracting features separately from the hematoxylin and the eosin stains allows the features to better represent biological complexity. Many other methods collect features from either the original RGB image, a converted image to other non-biologically based color spaces (e.g., Lab or HSL), or from a grayscale version of that same image (Al-Kadi, 2010; Basavanhally et al., 2010; Dundar et al., 2011, 2010; Esgiar et al., 2002; Farjam et al., 2007; Glotsos et al., 2008; Huang and Lee, 2009; Jafari-Khouzani and Soltanian-Zadeh, 2003; Kong et al., 2009; Ozolek et al., 2014; Petushi et al., 2006; Qureshi et al., 2008; Ruiz et al., 2007; Schnorrenberg et al., 1997; Tabesh et al., 2005; Tabesh and Teverovskiy, 2006; Tahir and Bouridane, 2006; Thiran and Macq, 1996; Tuzel et al., 2007; Wang et al., 2010; Wetzel et al., 1999; Weyn et al., 1998; Xu et al., 2014). Since hematoxylin binds to nucleic acids and eosin binds to protein, unmixing the stains allows the feature extraction to directly probe the state of these important biological molecules, whereas features from the mixed image may either miss this signal or be unable to probe them independently.

The breadth of quantitative features extracted from the images plays an additional role in the model's accuracy. The features of shape, size and color derived from the digital pathology image include the shape of a cell and a nucleus, a size of a cell or a nucleus and the colors illustrated by the stains used, reflective of cell components such as polynucleic acids, proteins, etc.

Though many of the features used here are commonly used in pathology image analysis, to our knowledge, the Riesz features are novel in the context of pathology; indeed, these features comprised more than a third of the features used in every model. The multi-scale nature of Riesz wavelets allows examination of the tissue at multiple spatial scales, from individual nuclei to multicellular structures. The directional components of the Riesz features can also be oriented to locally maximize the response of the first filter at the most granular scale, which has the desirable effect of normalizing all image directions among instances (Depeursinge et al., 2014). Since pathology has no universal orientation, this allows us to directly compare features from slide to slide without imposing an arbitrary directionality. The Riesz features are complementary to the more traditional pathology features, and when used together, the model has higher accuracy than using either feature set alone.

Allowing all the representative tiles to independently impact the final decision adds flexibility to the model, making it potentially capable of dealing with diverse pathology image data. The initial clustering produces some clusters that are very relevant to the diagnosis and others that are less relevant. By allowing independent evaluation all the clusters, relevant clusters receive a large decision value and a heavier weight in the final vote, making a stronger impact on the final decision. This enables a strong consensus for the entire tissue, even if the tumor represents only a small portion of the tissue; the impact of the relevant area is not diluted by the effect of the less important tissue surrounding it. While other methods (Kong et al., 2013, 2009; Ruiz et al., 2007; Sertel et al., 2009) have used tiling, they make their final decision based on the proportion of tiles assigned to a particular disease type. These previous methods have been limited to identifying diseases defined by their preponderance of particular tissue types, as they are unable to evaluate diseases where local features are key in determining a diagnosis. They frequently must discard cases having a variety of tissue types, such as samples with large quantities of normal tissue. The present approach is not too dissimilar from that used by a pathologist in evaluating WSI, though the present method is beneficial since in practice, it may be difficult for the human to systematically and consistently scrutinize every tissue region within each slide. It is believed that this contributes to the method's high accuracy.

The method's ability to capture biological information in diverse datasets has strong potential in digital pathology, not only in disease diagnosis, also in other clinical applications, such as survival and analysis of drug treatment response. In addition, it is believed that the present approach is likely generalizable and applicable to other diseases besides brain tumors.

EXAMPLES

Example 1: Dataset and Preprocessing

Dataset Description

Whole slide, diagnostic images were obtained from The Cancer Genome Atlas (TCGA). All slides were stained with hematoxylin and eosin. TCGA data derives from multiple institutions and collected over many years, so results found in these data are expected to hold for other studies. Each slide had been scanned at multiple resolutions ranging from 2.5-40×, with all images containing a maximum resolution scan of at least 20×. For slides where the maximum resolution was 40×, bicubic interpolation (Hou and Andrews, 1978) resized the images to 20×. The ground truth is that designated by The Cancer Genome Atlas based on patient records.

Two datasets each evaluated different aspects of the method. The first dataset comprised 45 images from 2014 MICCAI digital pathology classification grand challenge. This dataset allowed for direct comparison of the method to existing methods that were evaluated in that challenge. These 45 images included two types of brain cancer: 23 images of glioblastoma multiforme (GBM) and 22 images of lower grade glioma (LGG). For the second dataset all 604 images (364 GBM, 240 LGG) from TCGA which had a complete complement of pathology and molecular data were selected to evaluate performance of the method in a larger dataset. No more than one whole slide image came from a single patient.

Tiling the Images

WSI tiling created 1024×1024 pixel images at 20× resolution. This is the same size and resolution used for tissue microarrays, which a trained pathologist can use to make informed opinions about a whole tumor. Tiles were adjacent to one another covering the entire tissue region of the slide. Many tiles contain very little tissue, as tissue generally occupies only a small portion of the glass slide. Tiles of the slide containing a minimum of 0.237 mm$^2$ tissue area were used for further analysis. A tissue area of 0.237 mm$^2$ comprises 90% of the tile, making tiles with this amount of tissue unlikely to have many artifacts derived from the background glass slide. The following procedure distinguished tissue from background: 1) Convert the lowest resolution scan of the image to grayscale. 2) Apply automatic contrast enhancement (Divakar, 2009). 3) Take the 8-bit depth complement. 4) Perform hysteresis thresholding with an experimentally-chosen high threshold of 100 and a low threshold of 50.

Unmixing the Stains

In order to better represent the biological information of a sample, the hematoxylin and eosin stains were separated from the original image using the color deconvolution method used in CellProfiler (Kamentsky et al., 2011). This method for color deconvolution uses pseudo inverse matrices as described by Ruifrok and Johnson (Ruifrok and Johnston, 2001). The RGB values used for hematoxylin were [0.644, 0.717, 0.267] and for eosin were [0.093, 0.954, 0.283]. To obtain the hematoxylin and eosin stain values we find $$\exp\left(\ln(RGB_{i,j})\begin{bmatrix} 0.644, 0.171, 0.267 \\ 0.093, 0.954, 0.283 \end{bmatrix}^{+T}\right) = HE_{i,j}$$

Where $RGB_{i,j}$ are the red, green, and blue channel values for pixel i,j and $HE_{i,j}$ are the deconvoluted hematoxylin and eosin values for pixel i,j. The symbol +T indicates the transpose of the pseudo-inverse of the matrix. Since hematoxylin binds to nucleotides and eosin to proteins, unmixing the stains allows the method to better probe the roles of these biologically important molecules.

Tissue and Nuclei Segmentation

The process described above for tiling the images identified tissue regions in the image tiles. A method we derived from Gurcan (Gurcan et al., 2006) was used to segment the nuclei. In our modification of their work, the hematoxylin stain was transformed using morphological top-hat reconstruction (Meyer, 1979). An iterative series of hysteresis thresholds defined candidate nuclei. The upper threshold ranged from 150-50 and the lower threshold was 0.2× the upper threshold with each iteration, reducing the upper threshold by 5 intensity units. At each iteration, objects meeting size specifications (30-200 pixels) were identified as nuclei. This allows for the identification of a large variety of nuclei with different staining properties.

Exemplary Coarse (Primary) Features

| Riesz Features | - unaligned second-order Riesz features with six dyadic scales |
|---|---|
| eosin1 | Filter 1, Dyadic Scale 1, Eosin Stain, Whole Tissue |
| eosin10 | Filter 2, Dyadic Scale 1, Eosin Stain, Whole Tissue |
| eosin11 | Filter 3, Dyadic Scale 1, Eosin Stain, Whole Tissue |
| eosin12 | Filter 1, Dyadic Scale 2, Eosin Stain, Whole Tissue |
| eosin13 | Filter 2, Dyadic Scale 2, Eosin Stain, Whole Tissue |
| eosin14 | Filter 3, Dyadic Scale 2, Eosin Stain, Whole Tissue |
| eosin15 | Filter 1, Dyadic Scale 3, Eosin Stain, Whole Tissue |
| eosin16 | Filter 2, Dyadic Scale 3, Eosin Stain, Whole Tissue |
| eosin17 | Filter 3, Dyadic Scale 3, Eosin Stain, Whole Tissue |
| eosin18 | Filter 1, Dyadic Scale 4, Eosin Stain, Whole Tissue |
| eosin2 | Filter 2, Dyadic Scale 4, Eosin Stain, Whole Tissue |
| eosin3 | Filter 3, Dyadic Scale 4, Eosin Stain, Whole Tissue |
| eosin4 | Filter 1, Dyadic Scale 5, Eosin Stain, Whole Tissue |
| eosin5 | Filter 2, Dyadic Scale 5, Eosin Stain, Whole Tissue |
| eosin6 | Filter 3, Dyadic Scale 5, Eosin Stain, Whole Tissue |
| eosin7 | Filter 1, Dyadic Scale 6, Eosin Stain, Whole Tissue |
| eosin8 | Filter 2, Dyadic Scale 6, Eosin Stain, Whole Tissue |
| eosin9 | Filter 3, Dyadic Scale 6, Eosin Stain, Whole Tissue |
| hema1 | Filter 1, Dyadic Scale 1, Hematoxylin Stain, Whole Tissue |
| hema10 | Filter 2, Dyadic Scale 1, Hematoxylin Stain, Whole Tissue |
| hema11 | Filter 3, Dyadic Scale 1, Hematoxylin Stain, Whole Tissue |
| hema12 | Filter 1, Dyadic Scale 2, Hematoxylin Stain, Whole Tissue |
| hema13 | Filter 2, Dyadic Scale 2, Hematoxylin Stain, Whole Tissue |

| | - unaligned second-order Riesz features with six dyadic scales |
|---|---|
| hema14 | Filter 3, Dyadic Scale 2, Hematoxylin Stain, Whole Tissue |
| hema15 | Filter 1, Dyadic Scale 3, Hematoxylin Stain, Whole Tissue |
| hema16 | Filter 2, Dyadic Scale 3, Hematoxylin Stain, Whole Tissue |
| hema17 | Filter 3, Dyadic Scale 3, Hematoxylin Stain, Whole Tissue |
| hema18 | Filter 1, Dyadic Scale 4, Hematoxylin Stain, Whole Tissue |
| hema2 | Filter 2, Dyadic Scale 4, Hematoxylin Stain, Whole Tissue |
| hema3 | Filter 3, Dyadic Scale 4, Hematoxylin Stain, Whole Tissue |
| hema4 | Filter 1, Dyadic Scale 5, Hematoxylin Stain, Whole Tissue |
| hema5 | Filter 2, Dyadic Scale 5, Hematoxylin Stain, Whole Tissue |
| hema6 | Filter 3, Dyadic Scale 5, Hematoxylin Stain, Whole Tissue |
| hema7 | Filter 1, Dyadic Scale 6, Hematoxylin Stain, Whole Tissue |
| hema8 | Filter 2, Dyadic Scale 6, Hematoxylin Stain, Whole Tissue |
| hema9 | Filter 3, Dyadic Scale 6, Hematoxylin Stain, Whole Tissue |
| Haralick Features - 0 and 90 degrees, 1 pixel displacement | |
| eosinHaralick1 | Angular Second Moment, Eosin Stain, Whole Tissue |
| eosinHaralick10 | Contrast, Eosin Stain, Whole Tissue |
| eosinHaralick11 | Correlation, Eosin Stain, Whole Tissue |
| eosinHaralick12 | Sum of Squares Variance, Eosin Stain, Whole Tissue |
| eosinHaralick13 | Inverse Difference Moment, Eosin Stain, Whole Tissue |
| eosinHaralick2 | Sum Average, Eosin Stain, Whole Tissue |
| eosinHaralick3 | Sum Variance, Eosin Stain, Whole Tissue |
| eosinHaralick4 | Sum Entropy, Eosin Stain, Whole Tissue |
| eosinHaralick5 | Entropy, Eosin Stain, Whole Tissue |
| eosinHaralick6 | Difference Variance, Eosin Stain, Whole Tissue |
| eosinHaralick7 | Difference Entropy, Eosin Stain, Whole Tissue |
| eosinHaralick8 | Information Measures of Correlation 1, Eosin Stain, Whole Tissue |
| eosinHaralick9 | Information Measures of Correlation 2, Eosin Stain, Whole Tissue |
| hemaHaralick1 | Angular Second Moment, Hematoxylin Stain, Whole Tissue |
| hemaHaralick10 | Contrast, Hematoxylin Stain, Whole Tissue |
| hemaHaralick11 | Correlation, Hematoxylin Stain, Whole Tissue |
| hemaHaralick12 | Sum of Squares Variance, Hematoxylin Stain, Whole Tissue |
| hemaHaralick13 | Inverse Difference Moment, Hematoxylin Stain, Whole Tissue |
| hemaHaralick2 | Sum Average, Hematoxylin Stain, Whole Tissue |
| hemaHaralick3 | Sum Variance, Hematoxylin Stain, Whole Tissue |
| hemaHaralick4 | Sum Entropy, Hematoxylin Stain, Whole Tissue |
| hemaHaralick5 | Entropy, Hematoxylin Stain, Whole Tissue |
| hemaHaralick6 | Difference Variance, Hematoxylin Stain, Whole Tissue |
| hemaHaralick7 | Difference Entropy, Hematoxylin Stain, Whole Tissue |
| hemaHaralick8 | Information Measures of Correlation 1, Hematoxylin Stain, Whole Tissue |
| hemaHaralick9 | Information Measures of Correlation 2, Hematoxylin Stain, Whole Tissue |
| Basic Shape Features | |
| areaPerimRatio | Area/Perimeter Ratio, Whole Tissue |
| convexArea | Convex Area, Whole Tissue |
| eccentricity | Eccentricity, Whole Tissue |
| eulerNumber | Euler Number, Whole Tissue |
| majorAxisLength | Major Axis Length, Whole Tissue |
| minorAxisLength | Minor Axis Length, Whole Tissue |
| percentNuclei | Percent of the Whole Tissue Area Occupied by Nuclei |
| perimeter | Perimeter, Whole Tissue |
| solidity | Solidity, Whole Tissue |
| nucArea | Mean Area, Nuclei |
| nucAreaPerimRatio | Total Nuclei Area/Total Nuclei Perimeter Ratio |
| nucConvexArea | Mean Convex Area, Nuclei |
| nucDensity | Number of Nuclei per Whole Tissue Area |
| nucEccentricity | Mean Eccentricity, Nuclei |
| nucMajorAxisLength | Mean Major Axis Length, Nuclei |
| nucMinorAxisLength | Mean Minor Axis Lenght, Nuclei |
| nucNum | Total Number of Nuclei |
| nucPerimeter | Mean Perimeter, Nuclei |
| nucSolidity | Mean Solidity, Nuclei |
| nuclearDensity | Number of Nuclei per Whole Tissue Area |
| Color Features | |
| meanEosin | Mean Value, Eosin Stain, Whole Tissue |
| cytMeanEosin | Mean Value, Eosin Stain, Cytoplasm |
| nucMeanEosin | Mean Value, Eosin Stain, Nuclei |
| eosinDiff | Difference Between Eosin Stain Value in Whole Tissue vs Mean Eosin in Surrounding 5-Pixel Radius |
| eosinDarkDiff | Difference Between Eosin Stain Value in Whole Tissue vs 25th Percentile Eosin in Surrounding 5-Pixel Radius |
| eosinLightDiff | Difference Between Eosin Stain Value in Whole Tissue vs 75th Percentile Eosin in Surrounding 5-Pixel Radius |
| eosinEdge | Area of Edges Using Cranny Edge Detector, Eosin Stain, Whole Tissue |
| meanHema | Mean Value, Hematoxylin Stain, Whole Tissue |
| cytMeanHema | Mean Value, Hematoxylin Stain, Cytoplasm |
| nucMeanHema | Mean Value, Hematoxylin Stain, Nuclei |
| hemaDiff | Difference Between Hematoxylin Stain Value in Whole Tissue vs Mean Hematoxylin in Surrounding 5-Pixel Radius |
| hemaDarkDiff | Difference Between Hematoxylin Stain Value in Whole Tissue vs 25th Percentile Hematoxylin in Surrounding 5-Pixel Radius |
| hemaLightDiff | Difference Between Hematoxylin Stain Value in Whole Tissue vs 75th Percentile Hematoxylin in Surrounding 5-Pixel Radius |
| hemaEdge | Area of Edges Using Cranny Edge Detector, Hematoxylin Stain, Whole Tissue |

Exemplary Fine (Secondary) Features

| | aligned second-order Riesz features with six dyadic scales |
|---|---|
| Riesz Features | |
| alignedeosin1 | Filter 1, Dyadic Scale 1, Eosin Stain, Whole Tissue |
| alignedeosin2 | Filter 2, Dyadic Scale 1, Eosin Stain, Whole Tissue |
| alignedeosin3 | Filter 3, Dyadic Scale 1, Eosin Stain, Whole Tissue |
| alignedeosin4 | Filter 1, Dyadic Scale 2, Eosin Stain, Whole Tissue |
| alignedeosin5 | Filter 2, Dyadic Scale 2, Eosin Stain, Whole Tissue |
| alignedeosin6 | Filter 3, Dyadic Scale 2, Eosin Stain, Whole Tissue |
| alignedeosin7 | Filter 1, Dyadic Scale 3, Eosin Stain, Whole Tissue |
| alignedeosin8 | Filter 2, Dyadic Scale 3, Eosin Stain, Whole Tissue |

| aligned second-order Riesz features with six dyadic scales | |
|---|---|
| alignedeosin9 | Filter 3, Dyadic Scale 3, Eosin Stain, Whole Tissue |
| alignedeosin10 | Filter 1, Dyadic Scale 4, Eosin Stain, Whole Tissue |
| alignedeosin11 | Filter 2, Dyadic Scale 4, Eosin Stain, Whole Tissue |
| alignedeosin12 | Filter 3, Dyadic Scale 4, Eosin Stain, Whole Tissue |
| alignedeosin13 | Filter 1, Dyadic Scale 5, Eosin Stain, Whole Tissue |
| alignedeosin14 | Filter 2, Dyadic Scale 5, Eosin Stain, Whole Tissue |
| alignedeosin15 | Filter 3, Dyadic Scale 5, Eosin Stain, Whole Tissue |
| alignedeosin16 | Filter 1, Dyadic Scale 6, Eosin Stain, Whole Tissue |
| alignedeosin17 | Filter 2, Dyadic Scale 6, Eosin Stain, Whole Tissue |
| alignedeosin18 | Filter 3, Dyadic Scale 6, Eosin Stain, Whole Tissue |
| alignedeosinCyt1 | Filter 1, Dyadic Scale 1, Eosin Stain, Cytoplasm |
| alignedeosinCyt2 | Filter 2, Dyadic Scale 1, Eosin Stain, Cytoplasm |
| alignedeosinCyt3 | Filter 3, Dyadic Scale 1, Eosin Stain, Cytoplasm |
| alignedeosinCyt4 | Filter 1, Dyadic Scale 2, Eosin Stain, Cytoplasm |
| alignedeosinCyt5 | Filter 2, Dyadic Scale 2, Eosin Stain, Cytoplasm |
| alignedeosinCyt6 | Filter 3, Dyadic Scale 2, Eosin Stain, Cytoplasm |
| alignedeosinCyt7 | Filter 1, Dyadic Scale 3, Eosin Stain, Cytoplasm |
| alignedeosinCyt8 | Filter 2, Dyadic Scale 3, Eosin Stain, Cytoplasm |
| alignedeosinCyt9 | Filter 3, Dyadic Scale 3, Eosin Stain, Cytoplasm |
| alignedeosinCyt10 | Filter 1, Dyadic Scale 4, Eosin Stain, Cytoplasm |
| alignedeosinCyt11 | Filter 2, Dyadic Scale 4, Eosin Stain, Cytoplasm |
| alignedeosinCyt12 | Filter 3, Dyadic Scale 4, Eosin Stain, Cytoplasm |
| alignedeosinCyt13 | Filter 1, Dyadic Scale 5, Eosin Stain, Cytoplasm |
| alignedeosinCyt14 | Filter 2, Dyadic Scale 5, Eosin Stain, Cytoplasm |
| alignedeosinCyt15 | Filter 3, Dyadic Scale 5, Eosin Stain, Cytoplasm |
| alignedeosinCyt16 | Filter 1, Dyadic Scale 6, Eosin Stain, Cytoplasm |
| alignedeosinCyt17 | Filter 2, Dyadic Scale 6, Eosin Stain, Cytoplasm |
| alignedeosinCyt18 | Filter 3, Dyadic Scale 6, Eosin Stain, Cytoplasm |
| alignedeosinNuc1 | Filter 1, Dyadic Scale 1, Eosin Stain, Nuclei |
| alignedeosinNuc2 | Filter 2, Dyadic Scale 1, Eosin Stain, Nuclei |
| alignedeosinNuc3 | Filter 3, Dyadic Scale 1, Eosin Stain, Nuclei |
| alignedeosinNuc4 | Filter 1, Dyadic Scale 2, Eosin Stain, Nuclei |
| alignedeosinNuc5 | Filter 2, Dyadic Scale 2, Eosin Stain, Nuclei |
| alignedeosinNuc6 | Filter 3, Dyadic Scale 2, Eosin Stain, Nuclei |
| alignedeosinNuc7 | Filter 1, Dyadic Scale 3, Eosin Stain, Nuclei |
| alignedeosinNuc8 | Filter 2, Dyadic Scale 3, Eosin Stain, Nuclei |
| alignedeosinNuc9 | Filter 3, Dyadic Scale 3, Eosin Stain, Nuclei |
| alignedeosinNuc10 | Filter 1, Dyadic Scale 4, Eosin Stain, Nuclei |
| alignedeosinNuc11 | Filter 2, Dyadic Scale 4, Eosin Stain, Nuclei |
| alignedeosinNuc12 | Filter 3, Dyadic Scale 4, Eosin Stain, Nuclei |
| alignedeosinNuc13 | Filter 1, Dyadic Scale 5, Eosin Stain, Nuclei |
| alignedeosinNuc14 | Filter 2, Dyadic Scale 5, Eosin Stain, Nuclei |
| alignedeosinNuc15 | Filter 3, Dyadic Scale 5, Eosin Stain, Nuclei |
| alignedeosinNuc16 | Filter 1, Dyadic Scale 6, Eosin Stain, Nuclei |
| alignedeosinNuc17 | Filter 2, Dyadic Scale 6, Eosin Stain, Nuclei |
| alignedeosinNuc18 | Filter 3, Dyadic Scale 6, Eosin Stain, Nuclei |
| alignedhema1 | Filter 1, Dyadic Scale 1, Hematoxylin Stain, Whole Tissue |
| alignedhema2 | Filter 2, Dyadic Scale 1, Hematoxylin Stain, Whole Tissue |
| alignedhema3 | Filter 3, Dyadic Scale 1, Hematoxylin Stain, Whole Tissue |
| alignedhema4 | Filter 1, Dyadic Scale 2, Hematoxylin Stain, Whole Tissue |
| alignedhema5 | Filter 2, Dyadic Scale 2, Hematoxylin Stain, Whole Tissue |
| alignedhema6 | Filter 3, Dyadic Scale 2, Hematoxylin Stain, Whole Tissue |
| alignedhema7 | Filter 1, Dyadic Scale 3, Hematoxylin Stain, Whole Tissue |
| alignedhema8 | Filter 2, Dyadic Scale 3, Hematoxylin Stain, Whole Tissue |
| alignedhema9 | Filter 3, Dyadic Scale 3, Hematoxylin Stain, Whole Tissue |
| alignedhema10 | Filter 1, Dyadic Scale 4, Hematoxylin Stain, Whole Tissue |
| alignedhema11 | Filter 2, Dyadic Scale 4, Hematoxylin Stain, Whole Tissue |
| alignedhema12 | Filter 3, Dyadic Scale 4, Hematoxylin Stain, Whole Tissue |
| alignedhema13 | Filter 1, Dyadic Scale 5, Hematoxylin Stain, Whole Tissue |
| alignedhema14 | Filter 2, Dyadic Scale 5, Hematoxylin Stain, Whole Tissue |
| alignedhema15 | Filter 3, Dyadic Scale 5, Hematoxylin Stain, Whole Tissue |
| alignedhema16 | Filter 1, Dyadic Scale 6, Hematoxylin Stain, Whole Tissue |
| alignedhema17 | Filter 2, Dyadic Scale 6, Hematoxylin Stain, Whole Tissue |
| alignedhema18 | Filter 3, Dyadic Scale 6, Hematoxylin Stain, Whole Tissue |
| alignedhemaCyt1 | Filter 1, Dyadic Scale 1, Hematoxylin Stain, Cytoplasm |
| alignedhemaCyt2 | Filter 2, Dyadic Scale 1, Hematoxylin Stain, Cytoplasm |
| alignedhemaCyt3 | Filter 3, Dyadic Scale 1, Hematoxylin Stain, Cytoplasm |
| alignedhemaCyt4 | Filter 1, Dyadic Scale 2, Hematoxylin Stain, Cytoplasm |
| alignedhemaCyt5 | Filter 2, Dyadic Scale 2, Hematoxylin Stain, Cytoplasm |
| alignedhemaCyt6 | Filter 3, Dyadic Scale 2, Hematoxylin Stain, Cytoplasm |
| alignedhemaCyt7 | Filter 1, Dyadic Scale 3, Hematoxylin Stain, Cytoplasm |
| alignedhemaCyt8 | Filter 2, Dyadic Scale 3, Hematoxylin Stain, Cytoplasm |
| alignedhemaCyt9 | Filter 3, Dyadic Scale 3, Hematoxylin Stain, Cytoplasm |
| alignedhemaCyt10 | Filter 1, Dyadic Scale 4, Hematoxylin Stain, Cytoplasm |
| alignedhemaCyt11 | Filter 2, Dyadic Scale 4, Hematoxylin Stain, Cytoplasm |
| alignedhemaCyt12 | Filter 3, Dyadic Scale 4, Hematoxylin Stain, Cytoplasm |
| alignedhemaCyt13 | Filter 1, Dyadic Scale 5, Hematoxylin Stain, Cytoplasm |
| alignedhemaCyt14 | Filter 2, Dyadic Scale 5, Hematoxylin Stain, Cytoplasm |
| alignedhemaCyt15 | Filter 3, Dyadic Scale 5, Hematoxylin Stain, Cytoplasm |
| alignedhemaCyt16 | Filter 1, Dyadic Scale 6, Hematoxylin Stain, Cytoplasm |
| alignedhemaCyt17 | Filter 2, Dyadic Scale 6, Hematoxylin Stain, Cytoplasm |
| alignedhemaCyt18 | Filter 3, Dyadic Scale 6, Hematoxylin Stain, Cytoplasm |
| alignedhemaNuc1 | Filter 1, Dyadic Scale 1, Hematoxylin Stain, Nuclei |
| alignedhemaNuc2 | Filter 2, Dyadic Scale 1, Hematoxylin Stain, Nuclei |
| alignedhemaNuc3 | Filter 3, Dyadic Scale 1, Hematoxylin Stain, Nuclei |

| | aligned second-order Riesz features with six dyadic scales |
|---|---|
| alignedhemaNuc4 | Filter 1, Dyadic Scale 2, Hematoxylin Stain, Nuclei |
| alignedhemaNuc5 | Filter 2, Dyadic Scale 2, Hematoxylin Stain, Nuclei |
| alignedhemaNuc6 | Filter 3, Dyadic Scale 2, Hematoxylin Stain, Nuclei |
| alignedhemaNuc7 | Filter 1, Dyadic Scale 3, Hematoxylin Stain, Nuclei |
| alignedhemaNuc8 | Filter 2, Dyadic Scale 3, Hematoxylin Stain, Nuclei |
| alignedhemaNuc9 | Filter 3, Dyadic Scale 3, Hematoxylin Stain, Nuclei |
| alignedhemaNuc10 | Filter 1, Dyadic Scale 4, Hematoxylin Stain, Nuclei |
| alignedhemaNuc11 | Filter 2, Dyadic Scale 4, Hematoxylin Stain, Nuclei |
| alignedhemaNuc12 | Filter 3, Dyadic Scale 4, Hematoxylin Stain, Nuclei |
| alignedhemaNuc13 | Filter 1, Dyadic Scale 5, Hematoxylin Stain, Nuclei |
| alignedhemaNuc14 | Filter 2, Dyadic Scale 5, Hematoxylin Stain, Nuclei |
| alignedhemaNuc15 | Filter 3, Dyadic Scale 5, Hematoxylin Stain, Nuclei |
| alignedhemaNuc16 | Filter 1, Dyadic Scale 6, Hematoxylin Stain, Nuclei |
| alignedhemaNuc17 | Filter 2, Dyadic Scale 6, Hematoxylin Stain, Nuclei |
| alignedhemaNuc18 | Filter 3, Dyadic Scale 6, Hematoxylin Stain, Nuclei |

*Haralick Features - 0 and 90 degrees, 1 pixel displacement

| eosinHaralick1 | Angular Second Moment, Eosin Stain, Whole Tissue |
|---|---|
| eosinHaralick2 | Contrast, Eosin Stain, Whole Tissue |
| eosinHaralick3 | Correlation, Eosin Stain, Whole Tissue |
| eosinHaralick4 | Sum of Squares Variance, Eosin Stain, Whole Tissue |
| eosinHaralick5 | Inverse Difference Moment, Eosin Stain, Whole Tissue |
| eosinHaralick6 | Sum Average, Eosin Stain, Whole Tissue |
| eosinHaralick7 | Sum Variance, Eosin Stain, Whole Tissue |
| eosinHaralick8 | Sum Entropy, Eosin Stain, Whole Tissue |
| eosinHaralick9 | Entropy, Eosin Stain, Whole Tissue |
| eosinHaralick10 | Difference Variance, Eosin Stain, Whole Tissue |
| eosinHaralick11 | Difference Entropy, Eosin Stain, Whole Tissue |
| eosinHaralick12 | Information Measures of Correlation 1, Eosin Stain, Whole Tissue |
| eosinHaralick13 | Information Measures of Correlation 2, Eosin Stain, Whole Tissue |
| eosinHaralickCyt1 | Angular Second Moment, Eosin Stain, Cytoplasm |
| eosinHaralickCyt2 | Contrast, Eosin Stain, Cytoplasm |
| eosinHaralickCyt3 | Correlation, Eosin Stain, Cytoplasm |
| eosinHaralickCyt4 | Sum of Squares Variance, Eosin Stain, Cytoplasm |
| eosinHaralickCyt5 | Inverse Difference Moment, Eosin Stain, Cytoplasm |
| eosinHaralickCyt6 | Sum Average, Eosin Stain, Cytoplasm |
| eosinHaralickCyt7 | Sum Variance, Eosin Stain, Cytoplasm |
| eosinHaralickCyt8 | Sum Entropy, Eosin Stain, Cytoplasm |
| eosinHaralickCyt9 | Entropy, Eosin Stain, Cytoplasm |
| eosinHaralickCyt10 | Difference Variance, Eosin Stain, Cytoplasm |
| eosinHaralickCyt11 | Difference Entropy, Eosin Stain, Cytoplasm |
| eosinHaralickCyt12 | Information Measures of Correlation 1, Eosin Stain, Cytoplasm |
| eosinHaralickCyt13 | Information Measures of Correlation 2, Eosin Stain, Cytoplasm |
| eosinHaralickNuc1 | Angular Second Moment, Eosin Stain, Nuclei |
| eosinHaralickNuc2 | Contrast, Eosin Stain, Nuclei |
| eosinHaralickNuc3 | Correlation, Eosin Stain, Nuclei |
| eosinHaralickNuc4 | Sum of Squares Variance, Eosin Stain, Nuclei |
| eosinHaralickNuc5 | Inverse Difference Moment, Eosin Stain, Nuclei |
| eosinHaralickNuc6 | Sum Average, Eosin Stain, Nuclei |
| eosinHaralickNuc7 | Sum Variance, Eosin Stain, Nuclei |
| eosinHaralickNuc8 | Sum Entropy, Eosin Stain, Nuclei |
| eosinHaralickNuc9 | Entropy, Eosin Stain, Nuclei |
| eosinHaralickNuc10 | Difference Variance, Eosin Stain, Nuclei |
| eosinHaralickNuc11 | Difference Entropy, Eosin Stain, Nuclei |
| eosinHaralickNuc12 | Information Measures of Correlation 1, Eosin Stain, Nuclei |
| eosinHaralickNuc13 | Information Measures of Correlation 2, Eosin Stain, Nuclei |
| hemaHaralick1 | Angular Second Moment, Hematoxylin Stain, Whole Tissue |
| hemaHaralick2 | Contrast, Hematoxylin Stain, Whole Tissue |
| hemaHaralick3 | Correlation, Hematoxylin Stain, Whole Tissue |
| hemaHaralick4 | Sum of Squares Variance, Hematoxylin Stain, Whole Tissue |
| hemaHaralick5 | Inverse Difference Moment, Hematoxylin Stain, Whole Tissue |
| hemaHaralick6 | Sum Average, Hematoxylin Stain, Whole Tissue |
| hemaHaralick7 | Sum Variance, Hematoxylin Stain, Whole Tissue |
| hemaHaralick8 | Sum Entropy, Hematoxylin Stain, Whole Tissue |
| hemaHaralick9 | Entropy, Hematoxylin Stain, Whole Tissue |
| hemaHaralick10 | Difference Variance, Hematoxylin Stain, Whole Tissue |
| hemaHaralick11 | Difference Entropy, Hematoxylin Stain, Whole Tissue |
| hemaHaralick12 | Information Measures of Correlation 1, Hematoxylin Stain, Whole Tissue |
| hemaHaralick13 | Information Measures of Correlation 2, Hematoxylin Stain, Whole Tissue |
| hemaHaralickCyt1 | Angular Second Moment, Hematoxylin Stain, Cytoplasm |
| hemaHaralickCyt2 | Contrast, Hematoxylin Stain, Cytoplasm |
| hemaHaralickCyt3 | Correlation, Hematoxylin Stain, Cytoplasm |
| hemaHaralickCyt4 | Sum of Squares Variance, Hematoxylin Stain, Cytoplasm |
| hemaHaralickCyt5 | Inverse Difference Moment, Hematoxylin Stain, Cytoplasm |
| hemaHaralickCyt6 | Sum Average, Hematoxylin Stain, Cytoplasm |
| hemaHaralickCyt7 | Sum Variance, Hematoxylin Stain, Cytoplasm |
| hemaHaralickCyt8 | Sum Entropy, Hematoxylin Stain, Cytoplasm |
| hemaHaralickCyt9 | Entropy, Hematoxylin Stain, Cytoplasm |
| hemaHaralickCyt10 | Difference Variance, Hematoxylin Stain, Cytoplasm |
| hemaHaralickCyt11 | Difference Entropy, Hematoxylin Stain, Cytoplasm |
| hemaHaralickCyt12 | Information Measures of Correlation 1, Hematoxylin Stain, Cytoplasm |
| hemaHaralickCyt13 | Information Measures of Correlation 2, Hematoxylin Stain, Cytoplasm |
| hemaHaralickNuc1 | Angular Second Moment, Hematoxylin Stain, Nuclei |
| hemaHaralickNuc2 | Contrast, Hematoxylin Stain, Nuclei |
| hemaHaralickNuc3 | Correlation, Hematoxylin Stain, Nuclei |
| hemaHaralickNuc4 | Sum of Squares Variance, Hematoxylin Stain, Nuclei |
| hemaHaralickNuc5 | Inverse Difference Moment, Hematoxylin Stain, Nuclei |
| hemaHaralickNuc6 | Sum Average, Hematoxylin Stain, Nuclei |
| hemaHaralickNuc7 | Sum Variance, Hematoxylin Stain, Nuclei |
| hemaHaralickNuc8 | Sum Entropy, Hematoxylin Stain, Nuclei |
| hemaHaralickNuc9 | Entropy, Hematoxylin Stain, Nuclei |
| hemaHaralickNuc10 | Difference Variance, Hematoxylin Stain, Nuclei |
| hemaHaralickNuc11 | Difference Entropy, Hematoxylin Stain, Nuclei |
| hemaHaralickNuc12 | Information Measures of Correlation 1, Hematoxylin Stain, Nuclei |
| hemaHaralickNuc13 | Information Measures of Correlation 2, Hematoxylin Stain, Nuclei |

-continued

| | aligned second-order Riesz features with six dyadic scales |
|---|---|
| *Basic Shape Features | |
| areaPerimRatio | Area/Perimeter Ratio, Whole Tissue |
| convexArea | Convex Area, Whole Tissue |
| eccentricity | Eccentricity, Whole Tissue |
| eulerNumber | Euler Number, Whole Tissue |
| majorAxisLength | Major Axis Length, Whole Tissue |
| meanEdgeDist | Standard Deviation of Distance of Whole Tissue to Nearest Segmentation Edge |
| stdevEdgeDist | Mean Distance of Whole Tissue to Nearest Segmentation Edge |
| minorAxisLength | Minor Axis Length, Whole Tissue |
| percentNuclei | Percent of the Whole Tissue Area Occupied by Nuclei |
| perimeter | Perimeter, Whole Tissue |
| solidity | Solidity, Whole Tissue |
| nucArea | Mean Area, Nuclei |
| nucAreaPerimRatio | Total Nuclei Area/Total Nuclei Perimeter Ratio |
| nucConvexArea | Mean Convex Area, Nuclei |
| nucDensity | Number of Nuclei per Whole Tissue Area |
| nucEccentricity | Mean Eccentricity, Nuclei |
| nucMajorAxisLength | Mean Major Axis Length, Nuclei |
| nucMinorAxisLength | Mean Minor Axis Lenght, Nuclei |
| nucNum | Total Number of Nuclei |
| nucPerimeter | Mean Perimeter, Nuclei |
| nucSolidity | Mean Solidity, Nuclei |
| nuclearDensity | Number of Nuclei per Whole Tissue Area |
| *Skeleton Shape Features - Derived from skeleton erosion of Nuclei | |
| nucBranchPerEnd | Mean Number of Branch Points per Endpoints in Nuclei |
| nucNumBranch | Mean Number of Branch Points in Nuclei |
| nucNumEnds | Mean Number of Endpoints in Nuclei |
| nucSkelArea | Mean Area of Skeleton in Nuclei |
| *Color Features | |
| meanEosin | Mean Value, Eosin Stain, Whole Tissue |
| cytMeanEosin | Mean Value, Eosin Stain, Cytoplasm |
| nucMeanEosin | Mean Value, Eosin Stain, Nuclei |
| eosinDiff | Difference Between Eosin Stain Value in Whole Tissue vs Mean Eosin in Surrounding 5-Pixel Radius |
| eosinDarkDiff | Difference Between Eosin Stain Value in Whole Tissue vs 25th Percentile Eosin in Surrounding 5-Pixel Radius |
| eosinLightDiff | Difference Between Eosin Stain Value in Whole Tissue vs 75th Percentile Eosin in Surrounding 5-Pixel Radius |
| nucMeanEosinDiff | Difference Between nucMeanEosin and cytMeanEosin |
| eosinEdge | Area of Edges Using Cranny Edge Detector, Eosin Stain, Whole Tissue |
| meanHema | Mean Value, Hematoxylin Stain, Whole Tissue |
| cytMeanHema | Mean Value, Hematoxylin Stain, Cytoplasm |
| nucMeanHema | Mean Value, Hematoxylin Stain, Nuclei |
| hemaDiff | Difference Between Hematoxylin Stain Value in Whole Tissue vs Mean Hematoxylin in Surrounding 5-Pixel Radius |
| hemaDarkDiff | Difference Between Hematoxylin Stain Value in Whole Tissue vs 25th Percentile Hematoxylin in Surrounding 5-Pixel Radius |
| hemaLightDiff | Difference Between Hematoxylin Stain Value in Whole Tissue vs 75th Percentile Hematoxylin in Surrounding 5-Pixel Radius |
| nucMeanHemaDiff | Difference Between nucMeanHema and cytMeanHema |
| hemaEdge | Area of Edges Using Cranny Edge Detector, Hematoxylin Stain, Whole Tissue |

The dyadic scales referred to are those known for use in image segmentation. Dyadic wavelet transforms are scale samples of wavelet transforms following a geometric sequence. See, Wikipedia, "Dyadic transformation." The dyadic scale features here may be considered a scale of a value of a feature in the image being analyzed. A feature may be defined as an order in the image, e.g. a particular line or a particular square.

Example 2: Tile-Based Local Image Characterization

Figure 4:
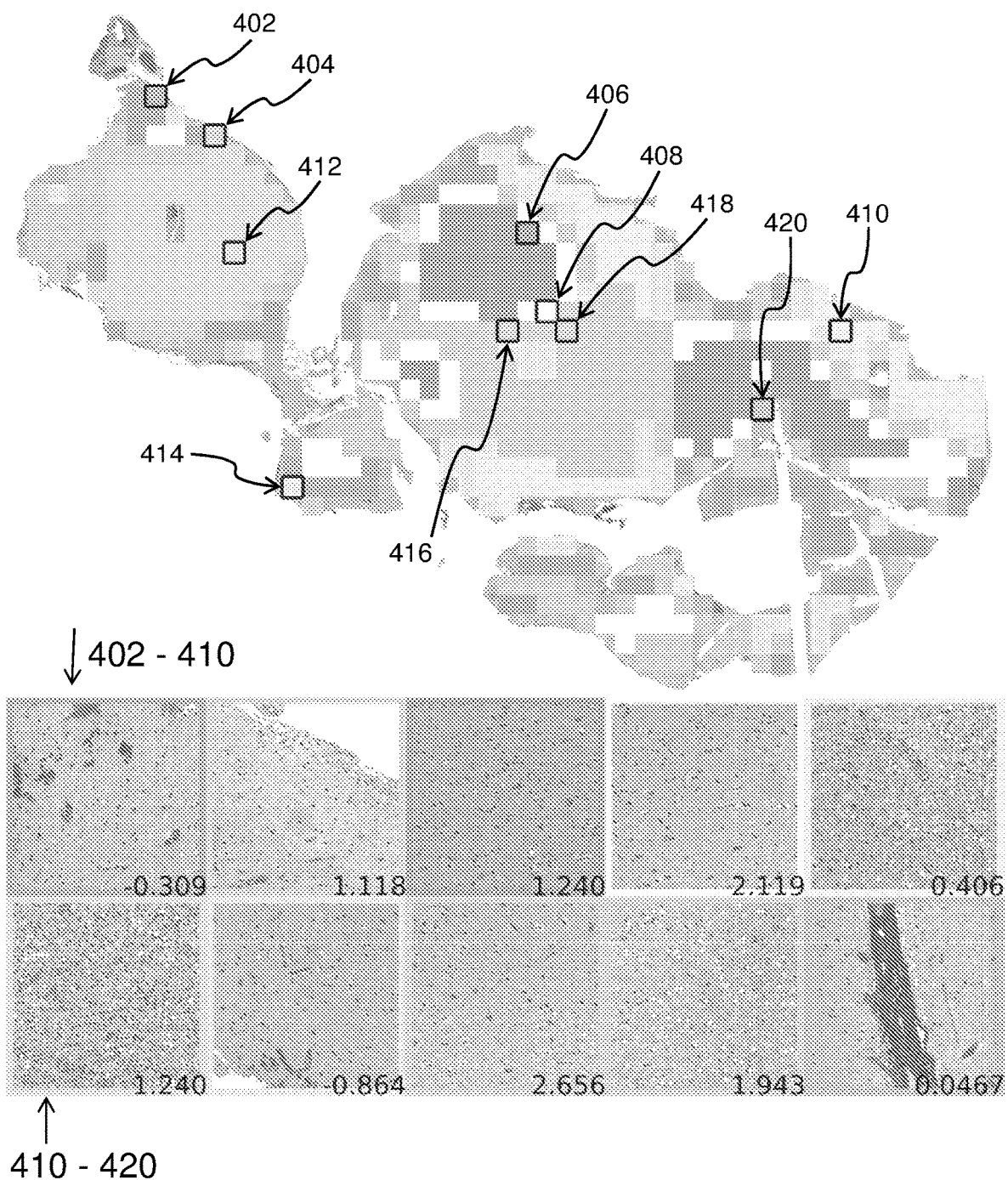
FIG. 4 is a set of images showing the results of the image processing pipeline. Black boxes represent tiles selected for "fine" profiling of secondary features. Images at the bottom show the tiles selected from each cluster. Numbers at the bottom are the decision values the tiles received.

In order to profile the entire tumor and to sample image diversity, the whole slide image is coarsely profiled, and similar regions are clustered together. The tile deemed most representative of each cluster receives a more through characterization for tissue modeling. Using this strategy ensures that the many varied regions of the tumor are represented in the model. Since both GMB and LGG have heterogeneous phenotypes, sampling the image in this way can aid in classification. FIG. 4 shows a sample image with clusters as well as the representative tiles and decision values from the model. Black boxes labeled with reference numerals 402-420 represent tiles chosen for "fine" profiling. Images at the bottom show the tiles selected from each cluster, with the upper five images corresponding to tiles 402, 404, 406, 408 and 410 from left to right, and the lower five images corresponding to tiles 412, 414, 416, 418 and 420 from left to right. Numbers at the bottom are the decision values the tiles received after machine learning analysis with positive values indicating a correct decision and negative values indicating an incorrect one. The strong positive values from some tiles (ex. 2.656 in tile 416) are able to overcome weak incorrect decisions from others (ex.—0.309 in tile 402). Additionally, the small decision value for the bleeding artifact in tile 420, demonstrates the pipeline's ability to minimize the impact of artifacts on the final decision.

"Coarse" Feature Extraction

Extracting fine (secondary) features for all tiles may highly increase the computational load. As a first step, coarse (primary) feature collection and profiling are computed on all tiles to select a subset of tiles that may serve as representatives of the WSI. Since pathology images may contain a variety of tissue types and other features of interest, the coarse analysis procedure enables the best representation of the tissue diversity in the WSI. Examining cell nuclei is one of the primary ways that pathologists establish diagnoses in pathology images. Therefore, segmenting cell nuclei and collecting features which characterize them is fundamental to quantitative digital pathology image analysis (Gil and Wu, 2003). For this first pass, a simple threshold on the hematoxylin stain segments the nuclei rather than using the iterative hysteresis thresholding described in Example 1 on tissue and nuclei segmentation to save computational time. Then, features were extracted from the whole tissue segmentation, from the nuclear segmentation, and from the non-nuclear regions, independently for both the hematoxylin and eosin stains. Specifically, shape, color (Gurcan et al., 2009), Haralick texture features (Haralick et al., 1973), and second order unaligned Riesz features (Depeursinge et al., 2014) were extracted from each tile.

Figure 5:
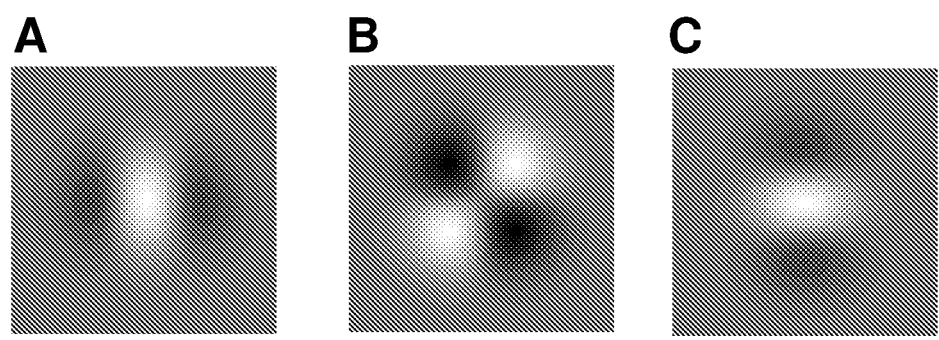
FIG. 5 (Panels A, B and C) provides images showing second order Riesz filterbank at a fixed scale.

The Riesz features correspond qualitatively to a multi-scale Hessian filterbank (FIGS. 5A,5B,5C) and can describe local organizations of image directions (i.e., for a fixed scale) that are specific to a given texture pattern (i.e., from single oligodendroglial cell appearances to tissue organization like pseudopalisadation). Haralick features were computed from a one pixel displacement, symmetric gray level co-occurrence matrix at 0 and 90 degrees. The 96-feature set comprised 15 shape, 12 color, 26 Haralick, and 36 Riesz features. There were 38 features derived from the hematoxylin stain and 38 features from the eosin stain. There were 13 features derived from the nuclei, 2 from the cytoplasm (regions designated as tissue, but not nuclei), and 81 from the tissue as a whole. On average, it takes ~6.2 s to calculate coarse (primary) features from 1024×1024 pixel tile.

PCA and Clustering to Regroup Similar Tiles

After collecting the features from the "coarse analysis", principal component analysis (PCA) was used to reduce the substantial number of "coarse" features, decreasing computational complexity of the classification algorithm. The first few components of the PCA, which are the components with the largest eigenvalues (i.e., capturing most of the variance in the data), serve as a basis for the information description. Three PCA components represented each tile. K-means clustering defined similar tiles based on the reduced-feature collection. The K-Means++ algorithm (Arthur and Vassilvitskii, 2007) allowed for more stable clustering. K-Means++ outperforms classic k-means with random selection of initial seeds. It results in much more stable clustering by reducing the distance from the points to the nearest cluster center in O(log(k)) time. Ten clusters represented various groups of similar tiles. For each cluster, a single representative tile whose values were the closest to the centroid of the cluster were selected to use in the "fine analysis" (see next section). Selecting tiles after the clustering procedure ensures that diverse tissue elements in the slide are included in modeling.

"Fine" Feature Extraction

For the more detailed "fine" analysis, all the features types collected in the "coarse" analysis (see section above on "coarse" feature extraction) are collected from the selected representative tiles, with a few changes that increased feature quality at the cost of computational time. Most notably, the features derive from the more detailed nuclear segmentation described in the section on tissue and nuclei segmentation in Example 1. Skeleton features for the nuclei were computed along with the other shape features to better define nuclear morphology (Zhao and Daut, 1991). Additionally, aligned second-order Riesz features with six dyadic scales are computed to characterize texture in the fine analysis, rather than using the unaligned features used in the coarse analysis (Depeursinge et al., 2014).

Alignment of the Riesz wavelets allows for rotation invariance, and avoids imposing arbitrary directionality on the tissue analysis. As in the section on "coarse" feature extraction, features derive from within the nuclei segmentation, in the cytoplasm segmentation (regions designated tissue but not nuclear), and from the tissue as a whole, as well as from both the hematoxylin and eosin stain. A total of 227 features are extracted, comprising 19 shape, 15 color, 78 Haralick, and 108 Riesz features. There were 101 features derived from the hematoxylin stain and 101 from the eosin stain. Eighty-one features derived from the nuclei, 64 from the cytoplasm (regions designated as tissue, but not nuclei), and 83 from the tissue as a whole. On average it takes ~185.2 s to calculate fine (secondary) features from a 1024×1024 pixel tile.

Example 3: Whole Slide Classification Using Elastic Net Classification and Weighted Voting The Elastic Net linear regression model (Zou and Hastie, 2005) is used to generate the predicted diagnosis from our data. Elastic Net combines the L1 and L2 penalties from the LASSO and ridge regression model. More specifically, elastic net seeks to minimize, $$\underset{(\beta_0,\beta)\in\mathbb{R}^{P+1}}{\mathrm{argmin}}\left[\frac{1}{2N}\sum_{i=1}^{N}(y_i-\beta_0-x_i^T\beta)^2+\lambda P_\alpha(\beta)\right] \text{ where,}$$

$$P_\alpha(\beta)=(1-\alpha)\frac{1}{2}\|\beta\|_{l_2}^2+\alpha\|\beta\|_{l_2} \text{ and}$$

$$0\le\alpha\le 1.$$

$\beta_0$ is the intercept for the linear regression model, $\beta$ represents the feature weights, $x_i$ is the feature vector for image i, $y_i$ is the outcome for image i, and N the number of training examples. As in other regression models, $\lambda$, is penalizing the feature coefficients $\beta$. Additionally, Elastic Net includes the parameter $\alpha$, which balances between the l1 and l2 penalties.

All of the features from the tiles selected in the section on "fine" feature extraction in Example 2 are normalized, and each tile becomes an independent instance. The glmnet implementation (Friedman et al., 2010) of a binomial elastic net logistic regression machine with an $\alpha$ value of 0.5 was used to model the data. A five fold cross-validation on the training set was used to select the $\lambda$, parameter with the lowest mean cross-validated error.

In order to estimate the generalized classification performance using all images, a 5-fold cross-validation is used. For each iteration of 5-fold cross-validation, we define our training set T for test images j-j+n such that $$T=\{x_{i,c},y_{i,c}\} \text{ for } i=1,\ldots,j-1,j+n+1,\ldots,I \text{ and}$$
$$c=1,\ldots,C$$

where $x_{i,c}$ is the feature vector for image i, n is the number of images required for 5-fold cross validation, cluster c and $y_{i,c}$ is the ground truth for image i, cluster c, I is the number of images and C the number of clusters. Note that in this method of cross-validation, the feature vectors for all clusters from an image are either left out or included in each fold to avoid training and testing the model with tiles belonging to the same image. 5-fold cross-validation produced a total of 5 models and classified the entire dataset.

In order to get the final, aggregated, decision value for a whole image i, we compute the value ŷ.

$$\hat{y}=\sum_{c=1}^{C}\beta_0+x_{i,c}^T\beta$$

An appropriate threshold, $\hat{t}$, for the final LGG-versus-GBM classification is selected from the training set such that:

$$\hat{t}=\underset{t}{\mathrm{argmax}}[\mathrm{sensitivity}(t,\hat{y}_i)+\mathrm{specificity}(t,\hat{y}_i)] \text{ for } i=1,$$
$$\ldots,j-1,j+n+1,\ldots I.$$

Final class designation for the test image j was made as $\hat{y}_j > \hat{t}$.

Example 4: Classification Accuracy

Comparison with MICCAI Challenge Results

The predicted classes of the test images matched the ground truth in all 45 tissue slices, out-performing the methods from the MICCAI challenge (Table 1). All other methods used in this comparison included a manual step where regions of the slide were selected for analysis. Since this method was able to out-perform the others, it indicates strong potential for the tile selection methods employed.

TABLE 1

| Method | Accuracy (%) |
|---|---|
| present method | 100 |
| Bueno et al, 2014 | 98.1 |
| Chang and Parvin, 2014 | 85.83 |
| Xu et al., 2014 | 97.8 |

Classification of a Larger Data Set

Figure 6:
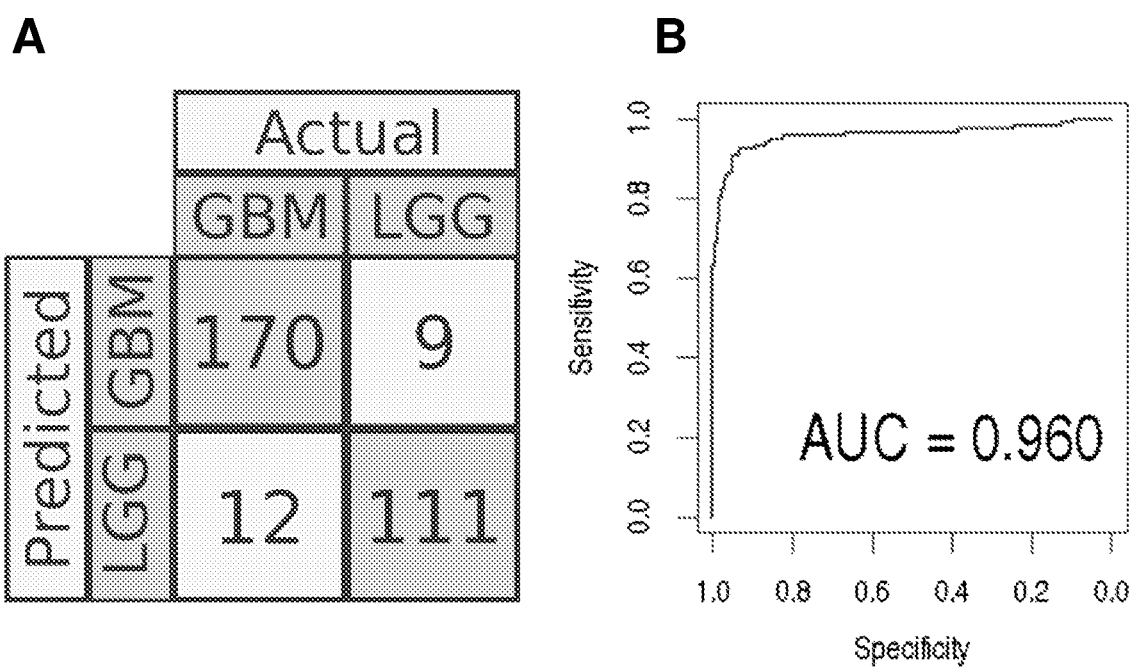
FIG. 6 (Panels A and B) is a matrix and a curve showing the accuracies of LGG/GBM classification in a larger dataset. Panel A shows a confusion matrix summarizing the dataset classification results. Panel B shows an ROC curve demonstrating that the values generated by the model match the predicted classes.

The high classification accuracy in the MICCAI dataset held when the present method was applied to the larger dataset of 604 images from TCGA. This dataset was randomized and split so that half of the WSIs were in the test set and half in the training set. The classification accuracy of the present method was 93.1%. A one sided binomial test with a no information rate of 0.6 determined this accuracy was highly unlikely to be accounted for by chance ($p \ll 0.001$), making it unlikely that the high accuracy seen in the MICCAI challenge results was due to sample bias (FIG. 6A, 6B). Additionally, the ROC curve showed high performance, with an AUC 0.96.

LGG-versus-GBM classification is not a trivial task. Both LGG and GBM are diverse diseases known for their varied appearance in pathology samples. In many cases, a single small region of the slide with a few distinguishing features gives the pathologist the ability to diagnose a sample. For this reason, it is not surprising that in the MICCAI challenge, all of our competitors manually selected a smaller region of the slide for classification (Bueno et al., 2014, Chang and Parvin, 2014, Xu et al., 2014). The present model obtained 100% classification accuracy and was able to exceed other competitors' performance in addition to the advantage of being fully automatic (Table 1), indicating that its ability to select regions for analysis may out-perform that of a human being. An extended dataset that contains 604 images was also analyzed producing a classification accuracy of 93.1%. One other group attempted classification of a larger cohort of TCGA images (51 GBM, 87 LGG, Mousavi et al., 2015). Their classification accuracy was much lower at 84.7%, suggesting that automated classification task is not trivial. While the present method shows a decrease in accuracy the results obtained in the larger dataset are still very good and potentially promising as an aid in clinical practice.

Example 5: Importance of the Feature Groups

Impact of the Fine (Secondary) Features

The impact of the fine (secondary) features in the final classification was tested. Instead of using the fine (secondary) features from the selected tiles, the same coarse (primary) features used for PCA and clustering were applied. This modified version of the pipeline classified the 604 previously described tumor samples as described in the section on classification of a larger data set in Example 4. Using only coarse (primary) features decreased the classification accuracy from 93.1% to 88.4%. Both the Net Reclassification Improvement (NRI=0.100, p=1.12e-3) and the Integrated Discrimination Improvement (IDI=0.100, 1.17e-3) suggest improvement in the model when adding the fine (secondary) features (Pencina et al., 2008), justifying the computational time.

Use of Available Feature Space

Figure 7:
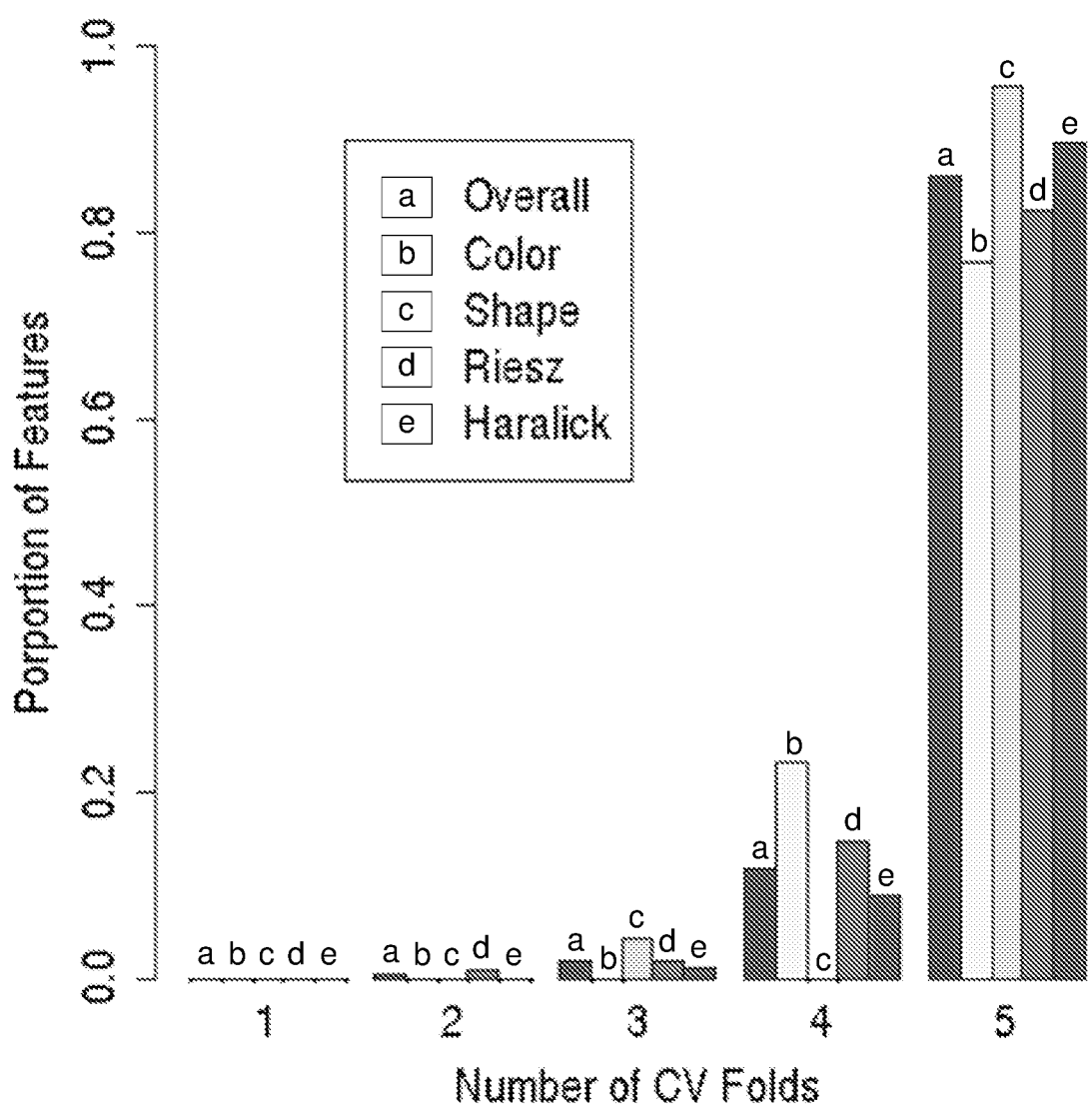
FIG. 7 is a histogram distribution of features used in Elastic Net models, showing the number of models in which features of a given class appear.

The feature space diversity was well exploited, where shape, color, Haralick, and Riesz features, as well as features from the nuclei and the cytoplasm, and both the hematoxylin and eosin stain were selected by every model built in the cross-validation. One hundred and ninety-one features represented the data in all five folds of cross-validation including 22 shape, 10 color, 70 Haralick, 89 Riesz (FIG. 7). FIG. 7 shows the histogram distribution of features used in Elastic Net models, showing the number of models in which features of a given class appear. The number of features is normalized based on the total number of features represented for each class, and number of cross validations. Letters a, b, c, d and e in the Figure represent the feature class. Most features for each class appears in all, or nearly all models, as would be expected if they have diagnostic value. As would be expected based on current histopathological convention where the nuclei are the primary focus, the hematoxylin stain and nuclear-derived features were well represented in the models with 88 hematoxylin and 76 nuclear features. More surprisingly, eosin and cytoplasm features were nearly as well represented with 81 eosin and 49 cytoplasm features, demonstrating the model's ability to discover previously unappreciated signal. Additionally, it was observed that the majority of the features appeared in all models indicating stability with respect to the training set.

Contribution of Riesz Texture Features

The contribution of the Riesz texture features to the accuracy of the model was tested using two experiments. The pipeline classified the 604 TCGA images that were divided as described in the section on classification of a larger data set in Example 4 two ways: 1) excluding the Riesz features and 2) using only the Riesz features.

Classifying the images without using Riesz features reduced the accuracy to 90.4% (NRI=0.067, p=1.56e-2; IDI=0.067, p=1.60e-2) from the original pipeline. Using the Riesz features alone reduced the accuracy to 90.0% (NRI=0.058, p=1.95e-2; IDI=0.058, p=1.62e-2). In order to evaluate if the better fit was simply a product of increasing the number of features, two models were compared using the Rao's efficient score test. This test determines if adding features to a model reduces the deviance residuals in the model. The test requires the models be nested, so features for the models were selected as follows. The patient samples were divided and trained an elastic net model as previously described. Features included in the model were recorded. This was done three times, once using all features, once excluding the Riesz features, and once including only the Riesz features producing three feature sets.

$$A = xa_1, xa_2, xa_3, \ldots, ra_1, ra_2, ra_3 \ldots$$

$$B = xb_1, xb_2, xb_3, \ldots$$

$$C = rc_1, rc_2, rc_3, \ldots$$

Where A is the set of features used in the model including all features, B is the set of features used in the model excluding the Riesz features, C is the set of features used in the model including only the Riesz features, $xn_i$ is the ith non-Riesz feature in feature set N, and $rn_i$ is the ith Riesz feature in feature set N. Four binomial general logistic regression models (f) were made on the testing data such that:

$$M_{OS}=f(xb_1,xb_2,xb_3,\ldots)$$

$$M_{PR}=f(xb_1,xb_2,xb_3,\ldots ra_1,ra_2,ra_3 \ldots)$$

$$M_{OR}=f(rc_1,rc_2,rc_3,\ldots)$$

$$M_{PS}=f(xa_1,xa_2,xa_3,\ldots,rc_1,rc_2,rc_3,\ldots)$$

The test found that adding both the Riesz features to the standard features ($Rao(M_{OS},M_{PR})\ll 0.001$) and adding the standard features to the Riesz features ($Rao(M_{OS},M_{PR})\ll 0.001$) reduced the residuals in the model. Combining the Riesz and traditional quantitative histopathology features gives a higher accuracy and reduced residuals compared to either models with only one of these feature sets, indicating that the two feature sets are complementary rather than redundant, demonstrating the synergy between the feature sets.

Example 6: Analysis of Tile Classification

Figure 8:
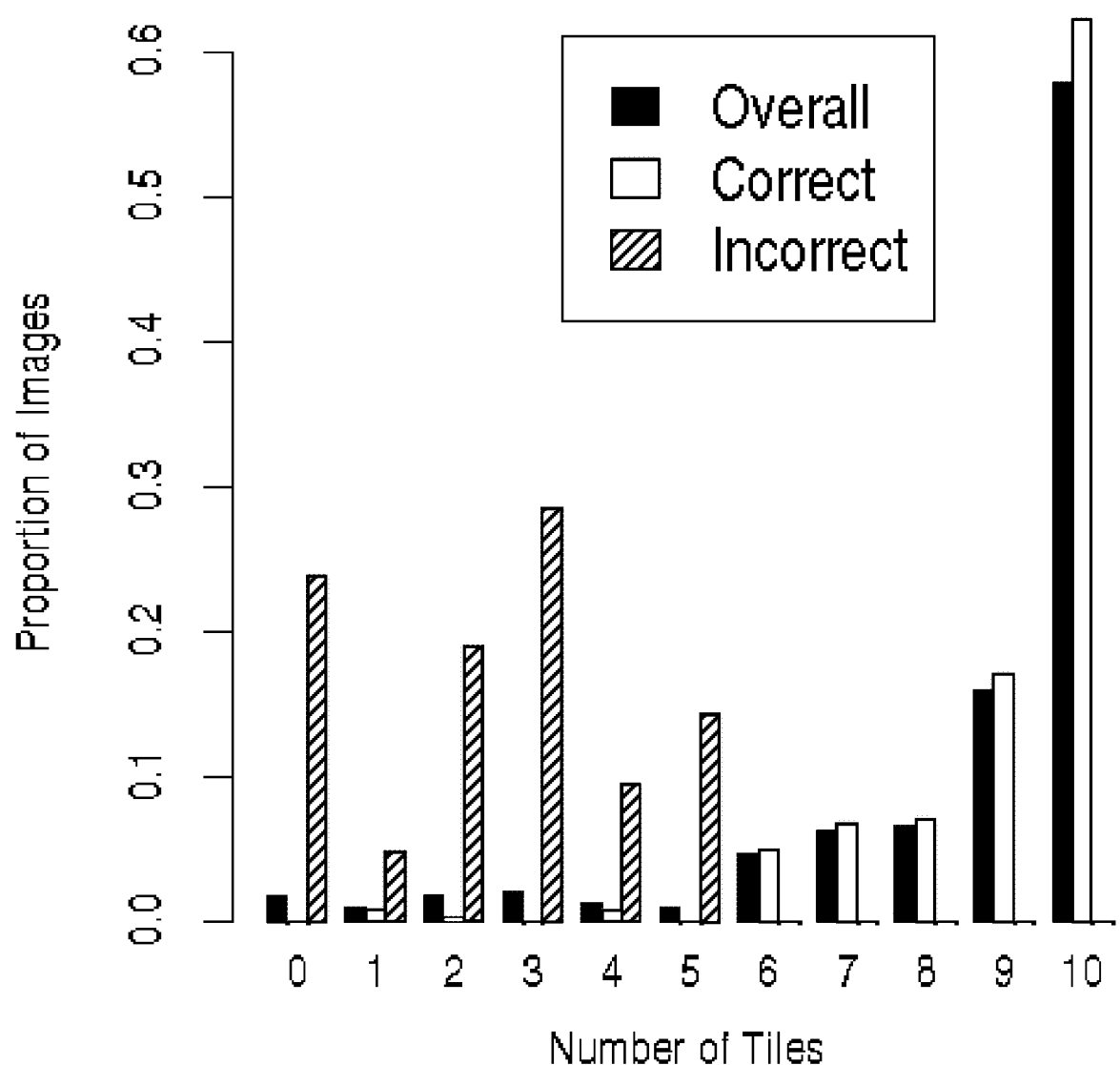
FIG. 8 is a histogram of the number of tiles correctly classified for each WSI, for all the images over all, the images that were correctly classified, and the images that were incorrectly classified.

This example shows how well the WSI are classified, but also how the individual representative tile classification compares to the WSI classification. In more than half the cases, all tiles were correctly classified (FIG. 8), indicating that the method is capable of finding signal in nearly all regions of the tumor. Even when tiles are incorrectly classified, in most cases, the pipeline is capable of making the correct decision based on the correct classification of the other tiles. In two cases, the method made the correct decision based on a strong correct decision for a single tile. On the other hand, when an image was incorrectly classified, in every case, less than half of the tiles were classified correctly. This demonstrates the importance of the final weighted voting to detect strong signal in the data and make correct classifications.

Example 7: Model Stability with Respect to Parameter Variation

Stability with Respect to Clustering Parameters

Figure 9:
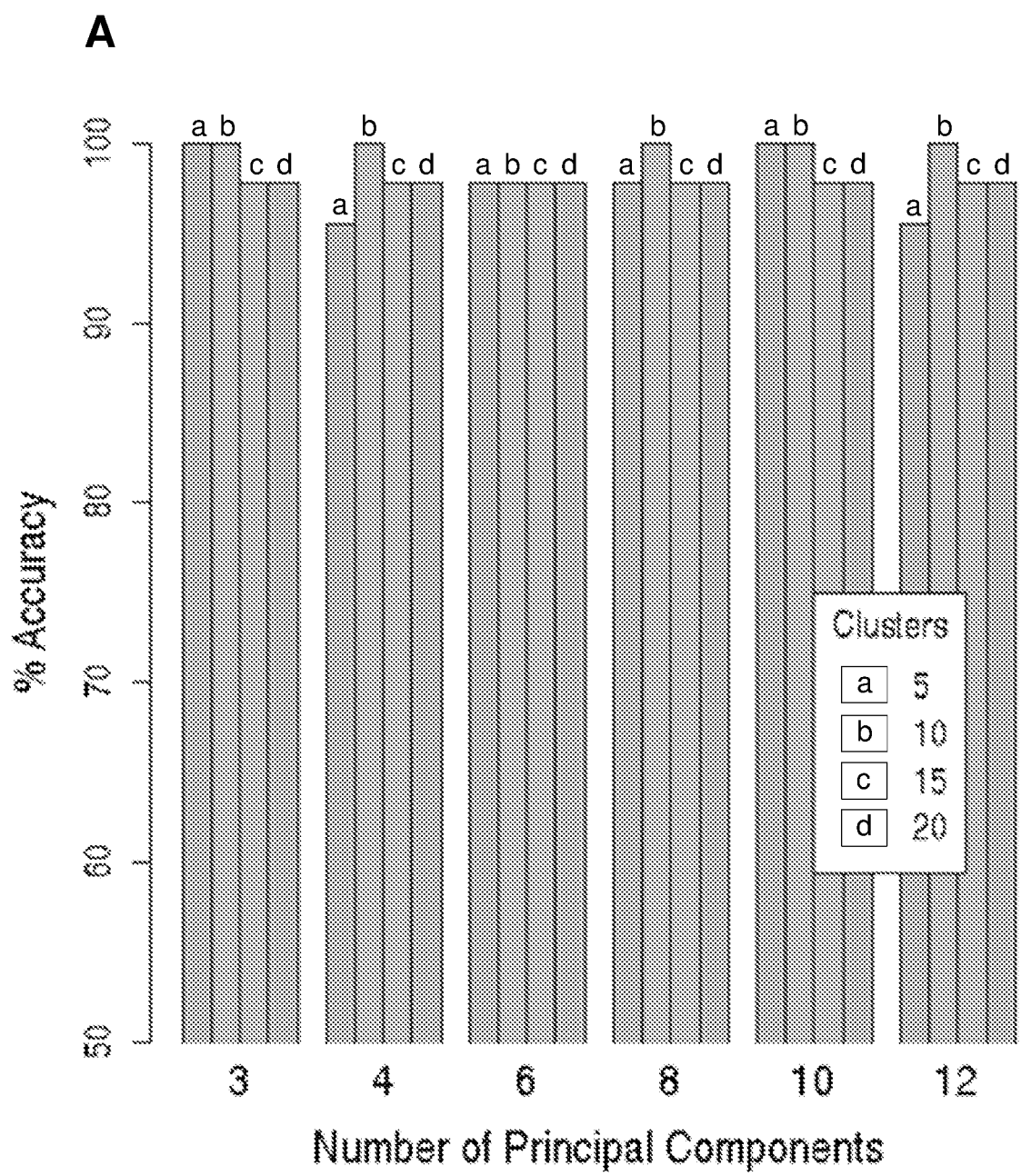
FIG. 9 (Panels A and B) provides graphs showing the impact of tile selection parameters on model stability. Panel A shows the accuracy of the models with differing numbers of clusters and principal components derived from the coarse (primary) features used for tile selection. The term "primary" refers to order in the sequence of the analysis, as compared to secondary features, which are determined after the coarse (primary) features. Panel B shows the decision value distribution for each tissue slice over all combinations of tile selection methods. Greater values indicate a stronger prediction, positive values indicate an accurate prediction and negative values indicate an inaccurate one. For both Panels A and B, the letters a, b, c and d represent models with the indicated number of clusters. Both accuracy and decision values remain consistent over a wide range of parameter values, indicating that the model is robust to variation in the parameters guiding tile selection.
Figure 9:
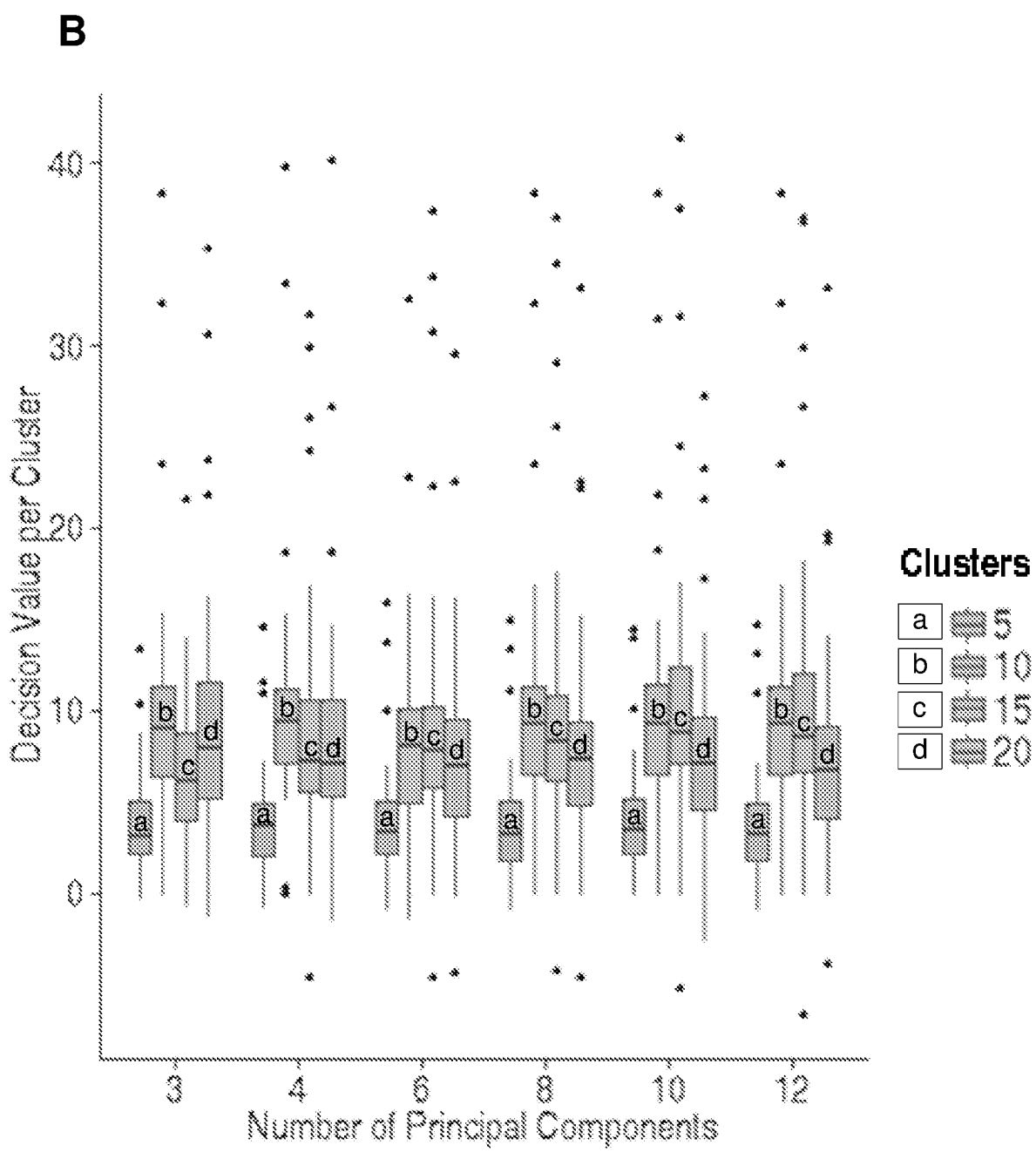

The stability of the model with respect to the number of clusters and the number of PCA components used to select representative tiles was tested. All combinations of 5, 10, 15, and 20 clusters and 3, 4, 6, 8, 10, or 12 principal components have been examined. The accuracy of the classification remained stable and yielded accuracies between 95.5-100% (FIG. 9A). Additionally, when the decision values used to assign the classification were examined, it was found that the mean decision values per number of clusters generated by the Elastic Net model was also similar across all combinations of parameters, with the sole exception of the 5 cluster models (FIG. 9B). This suggests that with only 5 clusters, the tissue diversity is not adequately sampled. In the instances of misclassified images, the magnitude of the decision value was well below the mean, indicating a lack of confidence in the assignment. This demonstrates that the model provided reproducible predictions with respect to the parameters used in tile selection.

Stability with Respect to Machine Learning Parameters

Figure 10:
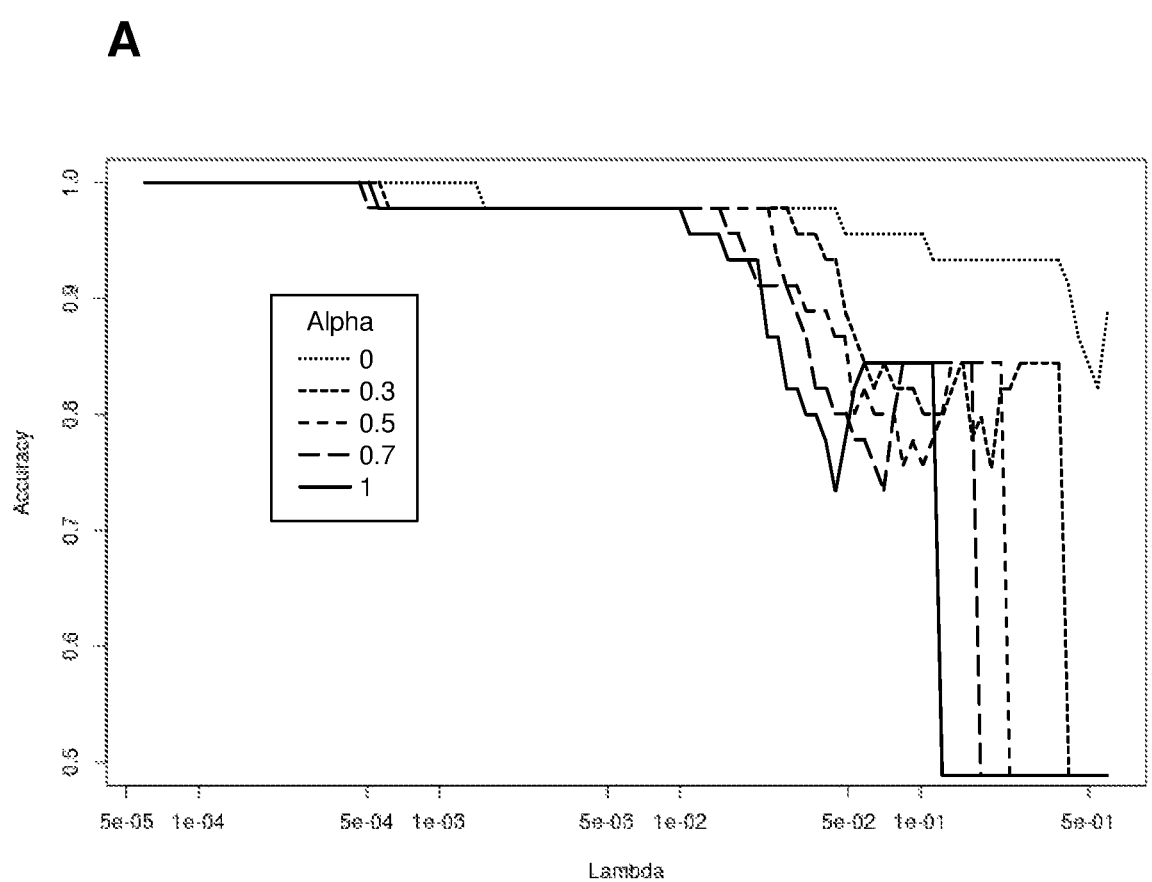
FIG. 10 (Panels A and B) provides graphs showing the effect of the Elastic Net model parameters on classification predictions. Panel A shows the impact of lambda and alpha on accuracy over five orders of magnitude for lambda and five different alpha values. Panel B shows the distance distributions of the decision values from the classification threshold for alpha values (0.0, 0.3, 0.5, 0.7, 1.0). Greater values indicate a stronger prediction, positive values indicate an accurate prediction and negative values indicate an inaccurate prediction. There were no inaccurate predictions for any alpha value at lambda min. Accuracy of the model is stable over much of the parameter range, with lower accuracy only occurring where lambda forces few to no features to be included in the model.
Figure 10:
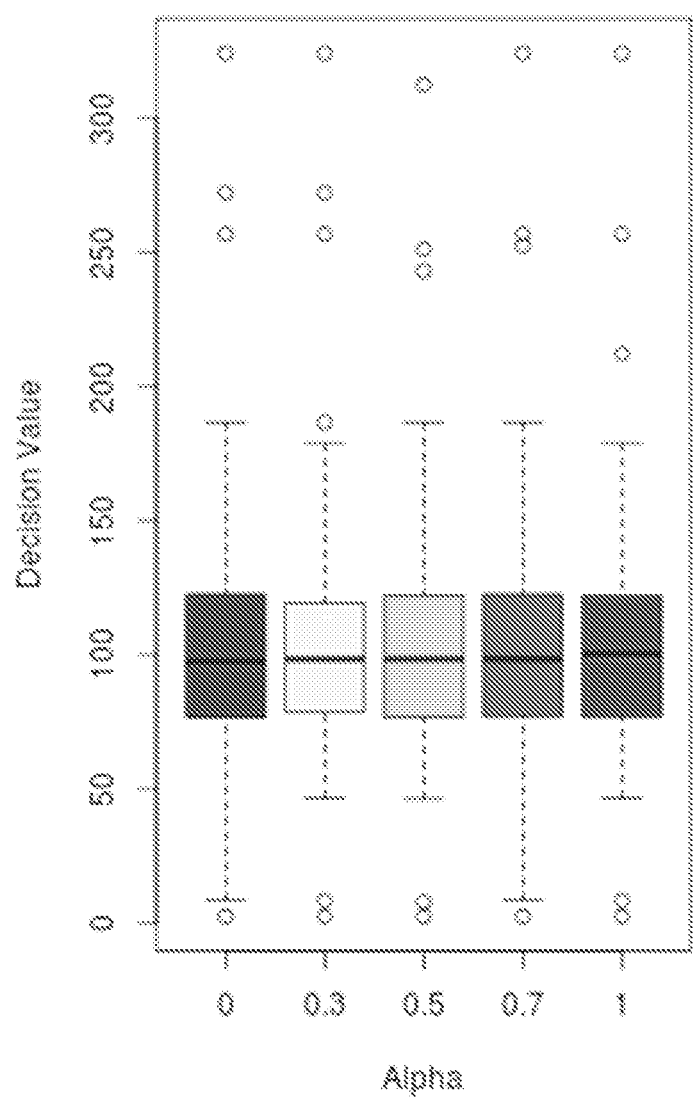

To test the model stability with respect to the parameters in the Elastic Net model, an evaluation of the accuracy of the prediction when varying the logistic regression penalty value $\lambda$, and $\alpha$, which controls the balance between the L1 and L2 penalty, was carried out. $\lambda$ was evaluated at 100 different values ranging from 6e-5 to 0.6 with a logarithmically-spaced interval between adjacent test values and $\alpha$ for five values (0.0, 0.3, 0.5, 0.7, 1.0) (FIG. 10A). The accuracy of the predictions with respect to $\lambda$ was stable over four orders of magnitude for all $\alpha$ values, only degrading at the extreme high end of the range when only a very small number of features were included in the model. The accuracy of predictions with respect to a remained stable at 100% when evaluated at the $\lambda$ with the minimum cross validated mean square error. To evaluate the impact that $\alpha$ had on the model at a specific $\lambda$ value, the distances of the final decision values from the threshold were looked at to estimate the certainty of the predictions (FIG. 10B). The distance distribution was very similar for all $\alpha$. Together these results indicate that the model can provide fairly robust classification predictions.

Example 8: Pathology Image Analysis that Reveals Gender Subtypes Affecting Patient Survival in Gliomas Gender-based differences exist in nearly every aspect of disease biology, from the genome to phenotype, including patient outcomes and response to therapy (Dorak, M. T. & Karpuzoglu, E. Gender Differences in Cancer Susceptibility: An Inadequately Addressed Issue. *Front. Genet.* 3, (2012)). However, gender's role in biology is still inadequately understood, leading to calls to action in both basic and clinical trial research (Schiebinger, L. Scientific research must take gender into account. *Nature* 507, 9 (2014); Nature. Putting gender on the agenda. *Nature* 465, 665-665 (2010)). Many gender-based differences are subtle and easy to overlook, particularly in fields such as pathology, where qualitative evaluation by visual inspection of tissue slides is the most common method of analysis. New applications of image processing in pathology use quantitative features and machine learning to discover underappreciated signals in these data to define new prognostically-differing disease subtypes (Beck, A. H. et al. Systematic Analysis of Breast Cancer Morphology Uncovers Stromal Features Associated with Survival. *Sci. Transl. Med.* 3, 108ra113-108ra113 (2011)). Here it is shown that it is possible to define four distinct gender-based subtypes of lower grade gliomas, each having differing overall survival rate, thus making them highly relevant for more personalized clinical decision making. In order to postulate a molecular mechanism for these gender-based survival differences, differential expression analysis on these disease subtypes was performed, and four genes (OTX2, MAGEC2, PITX2, and NUP62CL) associated with a detrimental phenotype in females and a beneficial one in males were discovered. OTX2, MAGEC2 and PITX2 have known cancer associations, including regulation of known cancer pathways, such as Cyclins A and D and the Wnt signaling pathway (Huang, Y., Guigon, C. J., Fan, J., Cheng, S. & Zhu, G.-Z. Pituitary homeobox 2 (PITX2) promotes thyroid carcinogenesis by activation of cyclin D2. *Cell Cycle* 9, 1333-1341 (2010); Liu, Y., Huang, Y. & Zhu, G.-Z. Cyclin A1 is a transcriptional target of PITX2 and overexpressed in papillary thyroid carcinoma. *Mol. Cell. Biochem.* 384, 221-227 (2013); Vela, I. et al. PITX2 and non-canonical Wnt pathway interaction in metastatic prostate cancer. *Clin. Exp. Metastasis* 31, 199-211 (2014); Wang, R. et al. MiR-206 regulates neural cells proliferation and apoptosis via Otx2. *Cell. Physiol. Biochem. Int. J. Exp. Cell. Physiol. Biochem. Pharmacol.* 29, 381-390 (2012)). These genes are also enriched for development of the pituitary gland—the brain region responsible for many sexually dimorphic traits. Together, these results indicate a putative mechanism for the observed gender-based differences in survival. The discovered role for gender in pathology has substantial potential applications in the clinic, by predicting patient prognostic differences, and in basic research, through discovery of putative mechanisms for the gender-based differences.

Many researchers have focused on differing incidence rates of disease between the genders, but differing incidence rates and prognosis are not necessarily correlated (Cook, M. B., McGlynn, K. A., Devesa, S. S., Freedman, N. D. & Anderson, W. F. Sex Disparities in Cancer Mortality and Survival. *Cancer Epidemiol. Biomark. Prev. Publ. Am. Assoc. Cancer Res. Cosponsored Am. Soc. Prev. Oncol.* 20, 1629-1637 (2011)). Therefore, it is important to consider not only incidence, but also survival when analyzing gender differences in cancer.

Pathology data have long been used to identify subtypes of cancers with differing prognosis. For instance, in glioma brain cancers pathologists examine tissue for features such as nuclear atypia, necrosis, and vascular proliferation to determine subtypes with widely varying survival rates (Cavenee, W. K., Louis, D. N., Ohgaki, H. & Wiestler. *WHO classification of tumours of the central nervous system.* (Distributed by WHO Press, World Health Organization, 2007). at <http (colon slash slash) site (dot) ebrary.com/id/10214529>). While pathology-based subtypes of gliomas show differing incidence rates between males and females, there are currently no known prognostic differences between genders visible in the pathology slides. Recently, image processing has examined previously under-appreciated areas of breast cancer to develop new subtypes with differing prognosis where none was known before. The presently disclosed method combines gender based analysis with pathology image processing in lower grade glioma brain tumors to create new gender based subtypes with prognostic implications.

Figure 11:
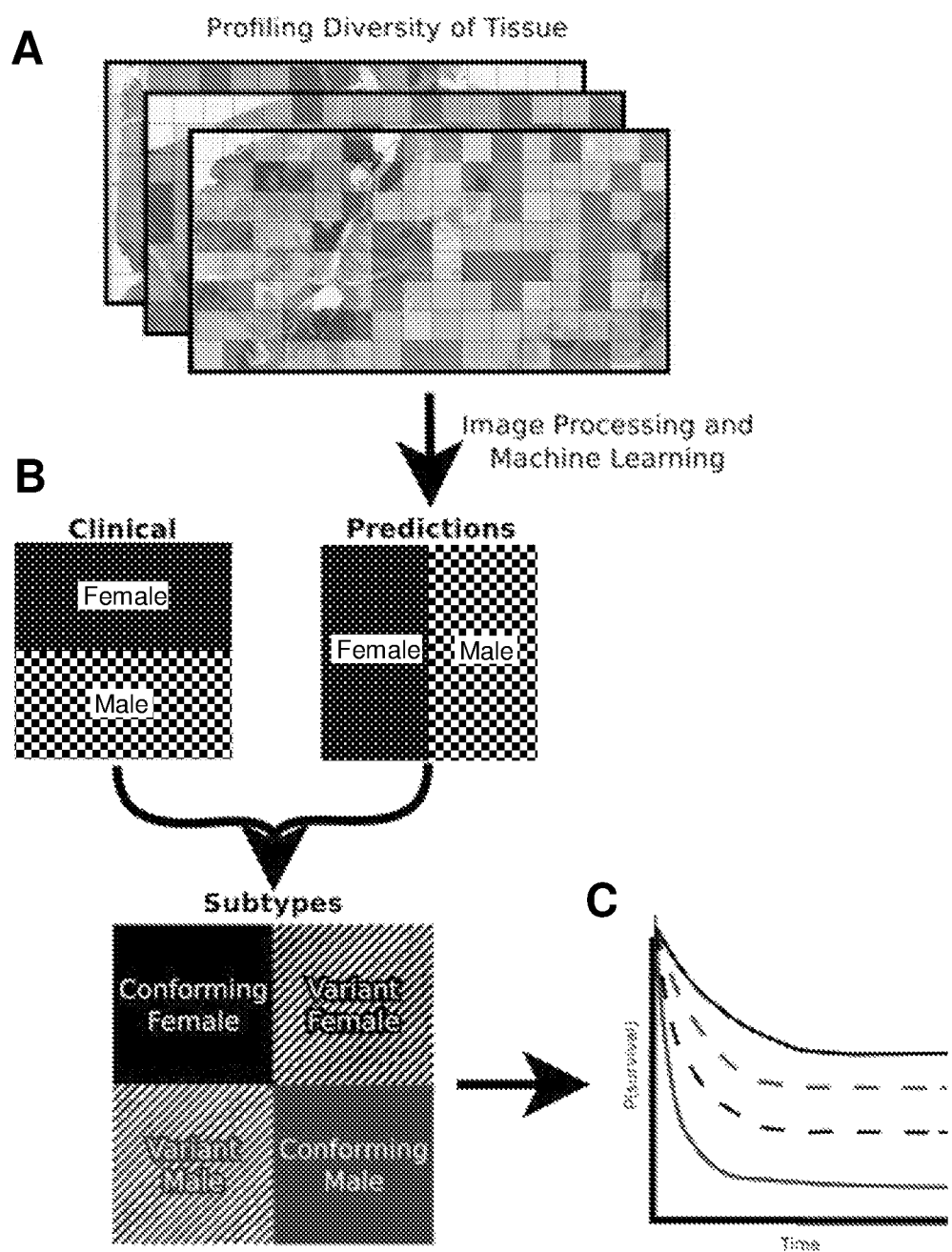
FIG. 11 (Panels A, B and C) provides a schematic showing an overview of an image processing pipeline and gender subtype modeling procedure. In Panel A, tissue from each whole slide pathology image is profiled to identify regions (image tiles) of similar tissue in the slide. A single representative image tile from every identified region taken from all the training slides is used to build a gender model. In Panel B, predicted genders from the test set are combined with actual genders from the clinical data to define four subtypes: Conforming Female, Variant Female, Conforming Male, and Variant Male. In Panel C, Kaplan-Meier curves are generated for the patients of each subtype to evaluate differential survival.

Gender prediction based on pathology data analysis was performed using a modeling method that seeks to minimize the number of presuppositions involved in data analysis. Many other models select regions of a pathology image deemed to be important and limit their analysis to only this region of data. The present model, on the other hand, surveys the entire slide and seeks to identify a few representative regions that best summarize tissue diversity (FIG. 11A). Machine learning and post-processing of the results allows for the model to emphasize or minimize the impact of the various regions based on their predictive value, producing a prediction that is largely free from imposing preexisting beliefs of value on the data. Since there is presently no known impact of gender on pathology features, it is thought that this approach heightens the potential for discovery by allowing the entire dataset to be analyzed.

The pipeline accounts for potential anomalies in the dataset and incorporates clinical data to create four gender based subtypes: Conforming Female, Variant Female, Conforming Male, and Variant Male (FIG. 11B). Subtypes classified as "Conforming" indicate that the predicted gender from the modeling and the actual gender have the same value, while "Variant" subtypes indicate a conflict between the predicted and actual gender. "Female" and "Male" refer to the actual gender of the patient. The final analysis looks for differential survival between the four gender-derived subtypes (FIG. 11C).

Dataset description: 232 lower grade glioma (LGG; astrocytomas, oligodendrogliomas, and oligoastrocytomas grade 2 and 3) diagnostic images were obtained from The Cancer Genome Atlas (TCGA) with each image representing a unique patient. The patients were selected on the basis of having data available for both whole slide images and RNASeq data. The pathology images were whole slide images stained with hematoxylin and eosin. Each slide had been scanned at multiple resolutions ranging from 2.5-40×, with all images containing a maximum resolution scan of at least 20×. For slides where the maximum resolution was 40×, the images were resized to 20× using bicubic interpolation (Hou, H. S. & Andrews, H. Cubic splines for image interpolation and digital filtering. IEEE Trans. Acoust. Speech Signal Process. 26, 508-517 (1978)). Additionally Level 3 RNA seq data was obtained from TCGA for each of the patients. The remaining 213 patients with RNASeq data, but no pathology data, were used in the experiments validating the subtypes with RNASeq data.

Image Processing and Modeling:

Image processing and feature extraction were performed as described above. Briefly, the images were tiled and quantitative coarse (primary) feature profiling is performed to analyze the diversity of the tissue in the slide. Based on this profiling, 10 tiles of the images were selected that maximally represent the diversity of the data. A more detailed quantitative profiling were performed before analysis with an Elastic Net machine (Zou, H. & Hastie, T. Regularization and variable selection via the Elastic Net. *J. R. Stat. Soc. Ser. B* 67, 301-320 (2005)). A weighted voting scheme for the 10 tiles was used to assign the final classification. In this application, the classes were the gender of the patients. To obtain class assignments for all patients, cross validation was performed, with groups of 10 patients in each fold. The four final subtype assignments were defined as a combination of the predicted and actual gender for each patient, with correct assignments designated as "Conforming" and incorrect assignments as "Variant" (eg Conforming Female, Conforming Male, Variant Female, Variant Male).

Figure 12:
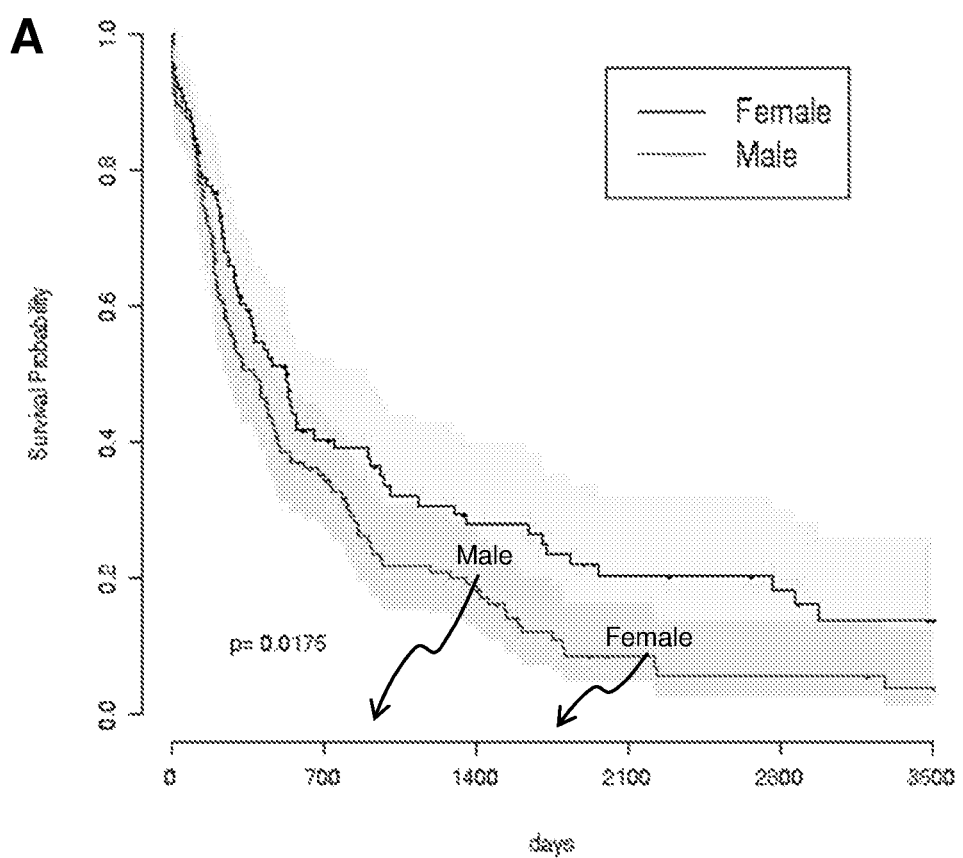
FIG. 12 (Panels A and B) provides graphs showing differential survival analysis for four subtypes defined by gender modeling. Panel A shows Kaplan-Meier curves based on gender. Panel B shows Kaplan-Meier curves for the machine learning defined gender based subtypes. While females and males in this dataset show statistically significant differential survival, the p-value is high (p=0.018). Dividing the patients into the four gender based subtypes drastically decreases the p-value (p=2.36e-6) validating the four subtypes. Additionally, the two subtypes of female and male both show statically significant differences, indicating gender-based subtyping generated from pathology data has implications for patient health.
Figure 12:
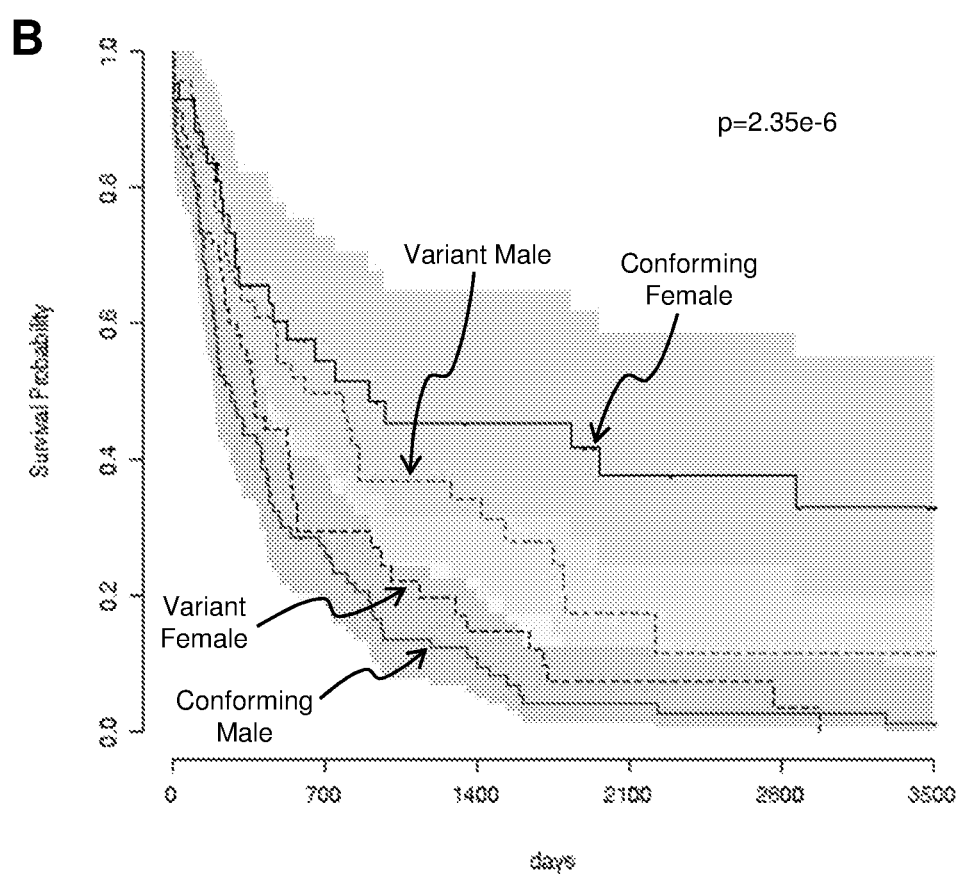

The dataset (n=232) showed a small difference in survival between females and males (FIG. 12A, p=0.018), but subtyping found populations within each gender having drastically different survival characteristics (FIG. 12B, p=2.36e-6). The "Conforming" and "Variant" subtypes for each gender also showed differential survival indicating that these subtypes for each gender are distinct populations of patients; Table 2 gives log-rank test p-values for differential expression between groups. These results indicate that not only are there pathology differences between the genders, but that within each gender there are unique pathology-defined subtypes with different survival characteristics.

TABLE 2

| Description | P-value |
| --- | --- |
| Predicted Female v Predicted Male | 6.48e-7 |
| All four subtypes | 2.36e-6 |
| Conforming Female v Conforming Male v Variant | 3.40e-6 |
| Conforming Female v Conforming Male | 3.67e-6 |
| Conforming Female v Variant Female | 7.23E-4 |
| Conforming Male v Variant Male | 9.80e-4 |
| Actual Female v Actual Male | 1.75e-2 |
| Variant Female v Variant Male | 4.04e-2 |

Figure 13:
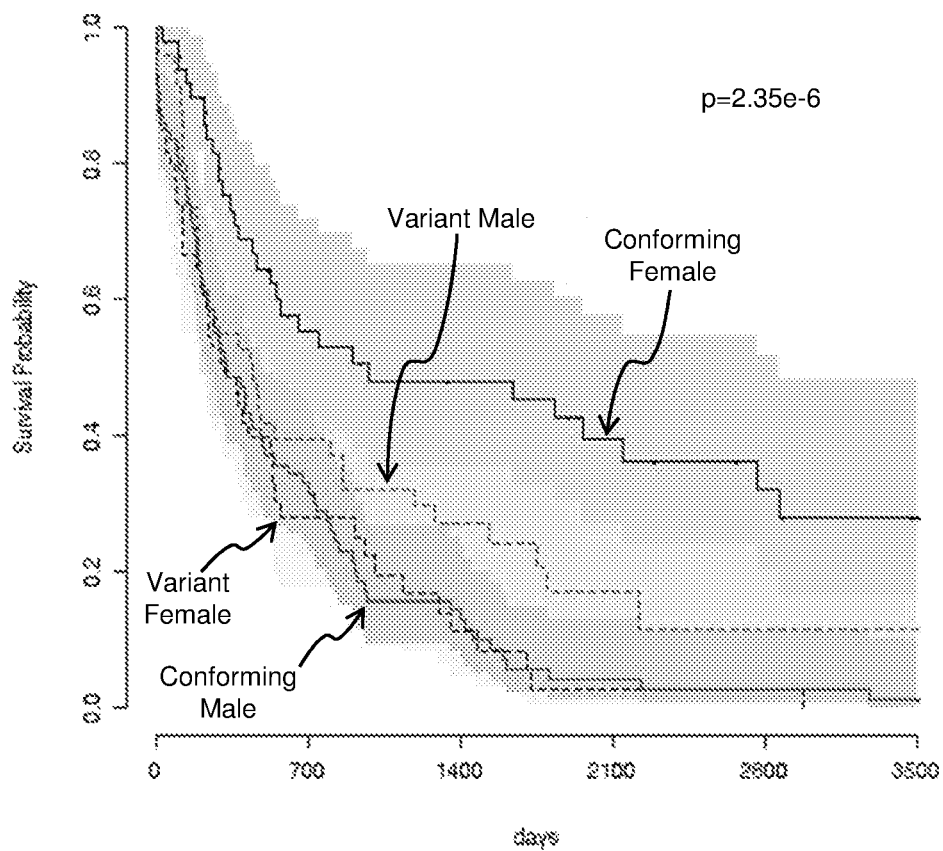
FIG. 13 is a graph showing differential survival analysis for gender subtypes generated by modeling where the model was trained on all pathological subtypes save one, and tested on the excluded subtype. A statistically significant difference is seen between the gender subtypes, as was the case with subtyping naïve to pathological subtypes.
Figure 14:
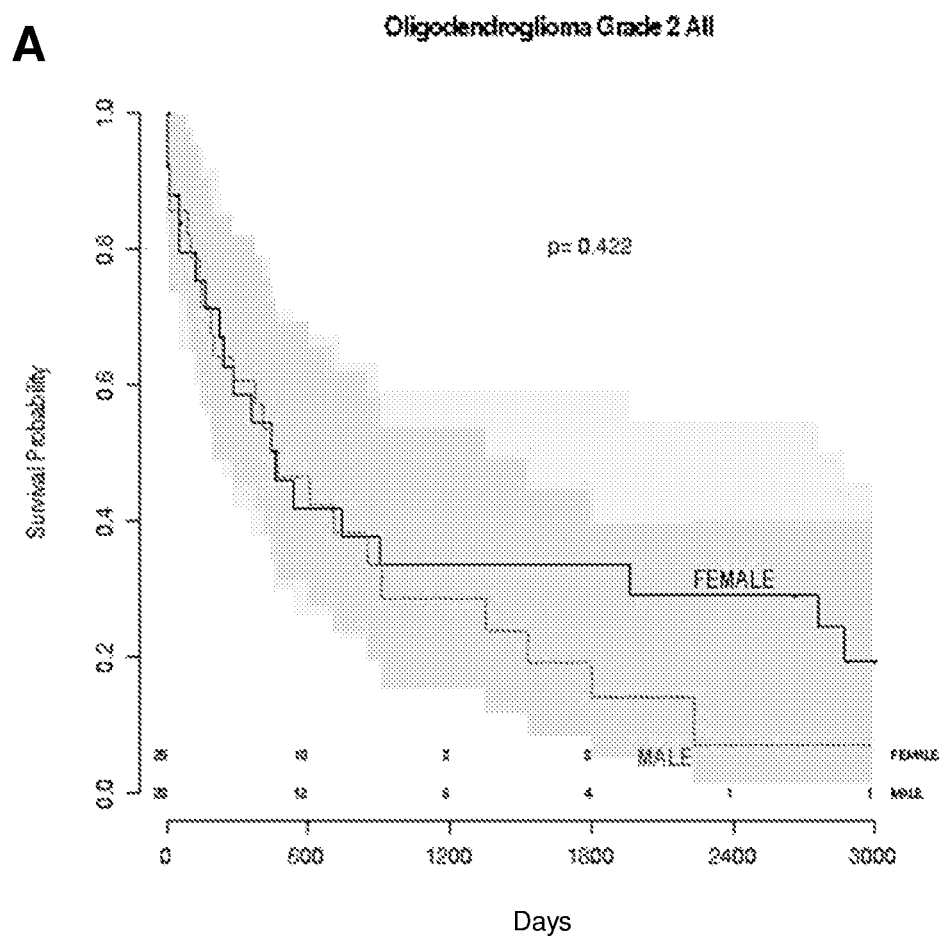
FIG. 14 (Panels A, B, C and D) provides graphs showing differential survival analysis for models where each pathological subtype of oligodendrogliomas was classified independently. While no difference in survival probabilities is seen between the genders before the gender based subtyping, both show statistically significant differences based on their gender subtypes.
Figure 14:
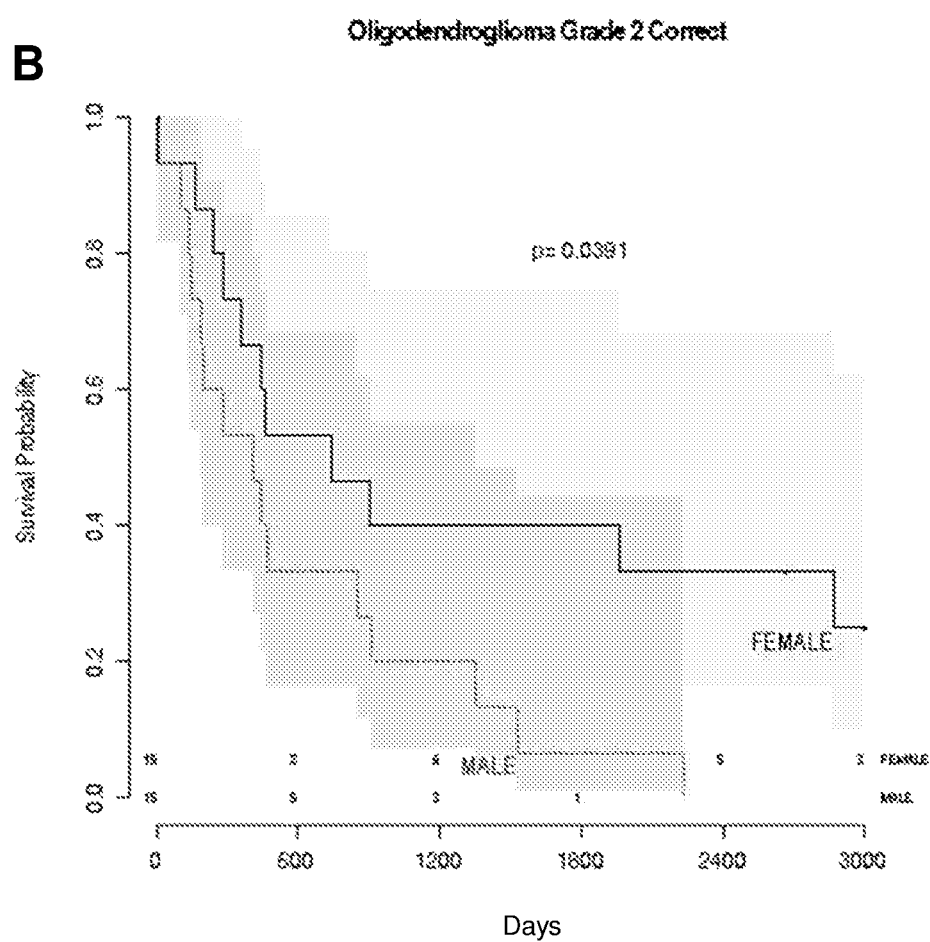
Figure 14:
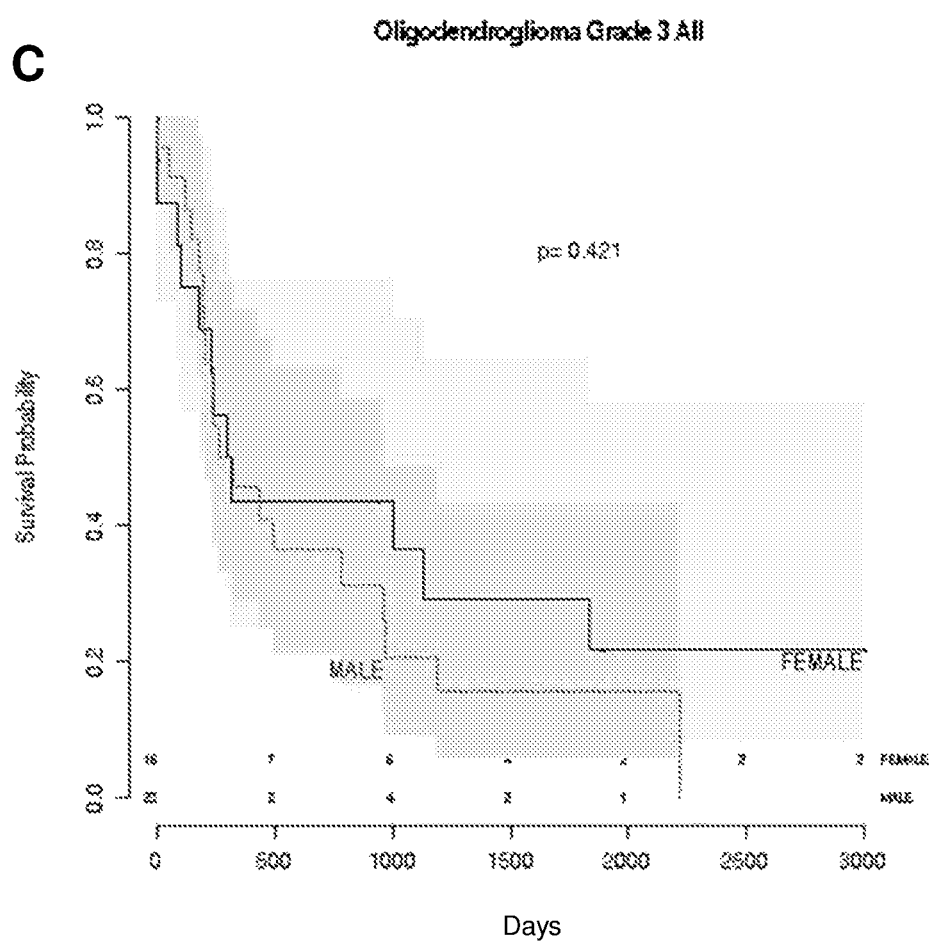
Figure 14:
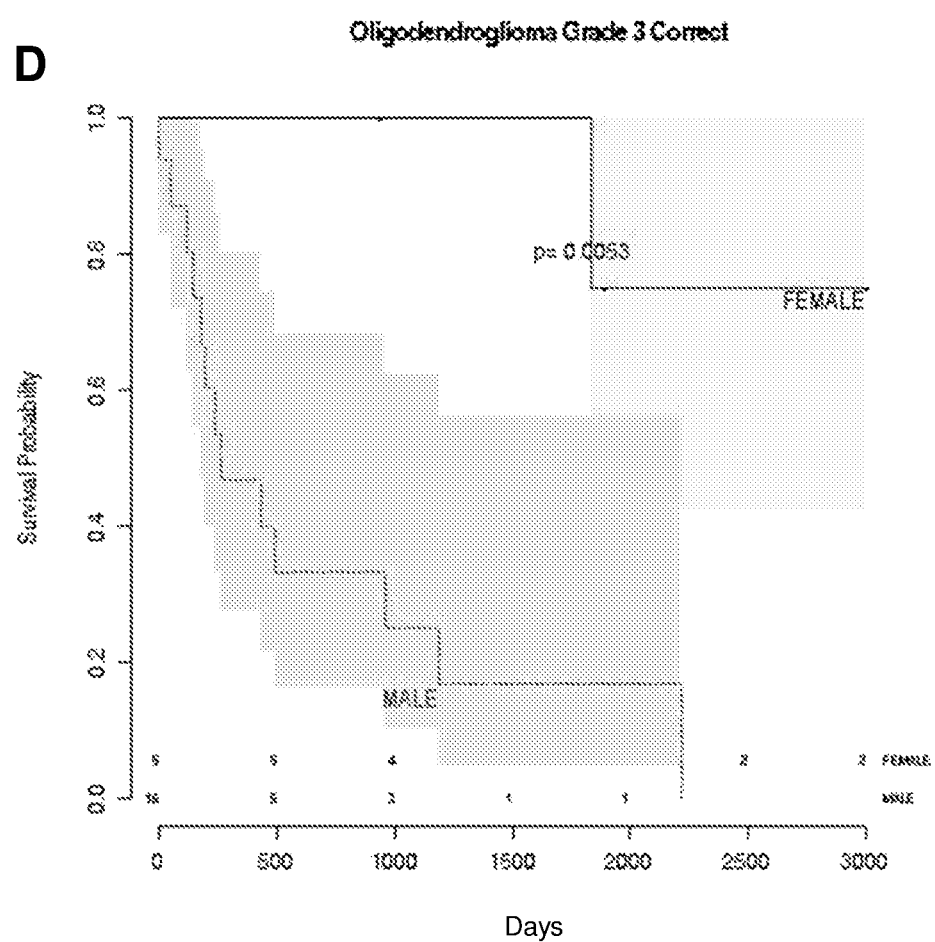

Since lower grade gliomas represent multiple known subtypes (grades 2 and 3 for astrocytomas, oligodendrogliomas, and oligoastrocytomas), it was necessary to control for the possibility that the pipeline was identifying known subtypes having differential incidence for each gender. Gender subtyping was performed in which the model was trained on all pathology subtypes save one, and tested on the excluded subtype. The gender subtypes showed similar differential survival characteristics as when performed without accounting for pathology subtypes (FIG. 13). Additionally, gender subtyping was performed within each pathology subtype. While most pathology subtypes contained too few cases to show statistically significant differences, both grade 2 and 3 oligodendrogliomas showed significant differences between the Conforming Female and Conforming Male subtypes, but not the overall male and female gendered patients (FIG. 14A, 14B, 14C, 14D). This result indicates that the known pathology subtypes are not causing the differential survival seen in the gender subtypes. Additionally, the distribution of two mutations (IDHmt (Yan, H., Bigner, D. D., Velculescu, V. & Parsons, D. W. Mutant Metabolic Enzymes Are at the Origin of Gliomas. *Cancer Res.* 69, 9157-9159 (2009)) and 1p19q co-deletion (Cairncross, J. G. et al. Specific Genetic Predictors of Chemotherapeutic Response and Survival in Patients With Anaplastic Oligodendrogliomas. *J. Natl. Cancer Inst.* 90, 1473-1479 (1998))) known to affect survival in gliomas was similar among the gender-based subtypes making these mutations unlikely to be the source of survival differences (Table 3). In other words, mutations occur in similar ratios between the subtypes making it unlikely that the survival differences seen between the groups can be accounted for by known mutations.

TABLE 3

Distribution of mutations known to affect survival in gliomas among the four gender-based subtypes.

| Subtype | IDH Mutant | IDH Wild Type | co-del 1p19q | non-co-del 1p19q |
|---|---|---|---|---|
| Conforming Female | 78.6% | 21.4% | 37.2% | 62.8% |
| Conforming Male | 88.2% | 11.8% | 30.6% | 69.4% |
| Variant Female | 71.9% | 28.1% | 24.6% | 75.4% |
| Variant Male | 78.3% | 21.7% | 31.9% | 68.1% |

To validate the subtypes, a classifier was built based on the RNASeq data from the patients with pathology samples. The goal of this classifier was to attempt to replicate the female and male predictions from the original pathology based model using the RNASeq data as features and pathology-based predictions as outputs. A new set of samples (n=213) was then classified and using these new predictions and the actual genders, four subtypes were defined as before. Modeling the RNASeq data was done using Bioconductor's MLSeq package (Zararsiz, G. et al. MLSeq: Machine learning interface for RNA-Seq data. (2015)), an extension of the DESeq package that incorporates machine learning functionality. Read counts were normalized using estimates of the size factors generatedRMS R package by dividing each sample by the geometric means of the transcript counts, and then transformed using variance stabilizing transformation. A bagged SVM was trained using three repeats of five-fold cross validation to predict the gender classes created by the pathology-based classifier.

Figure 15:
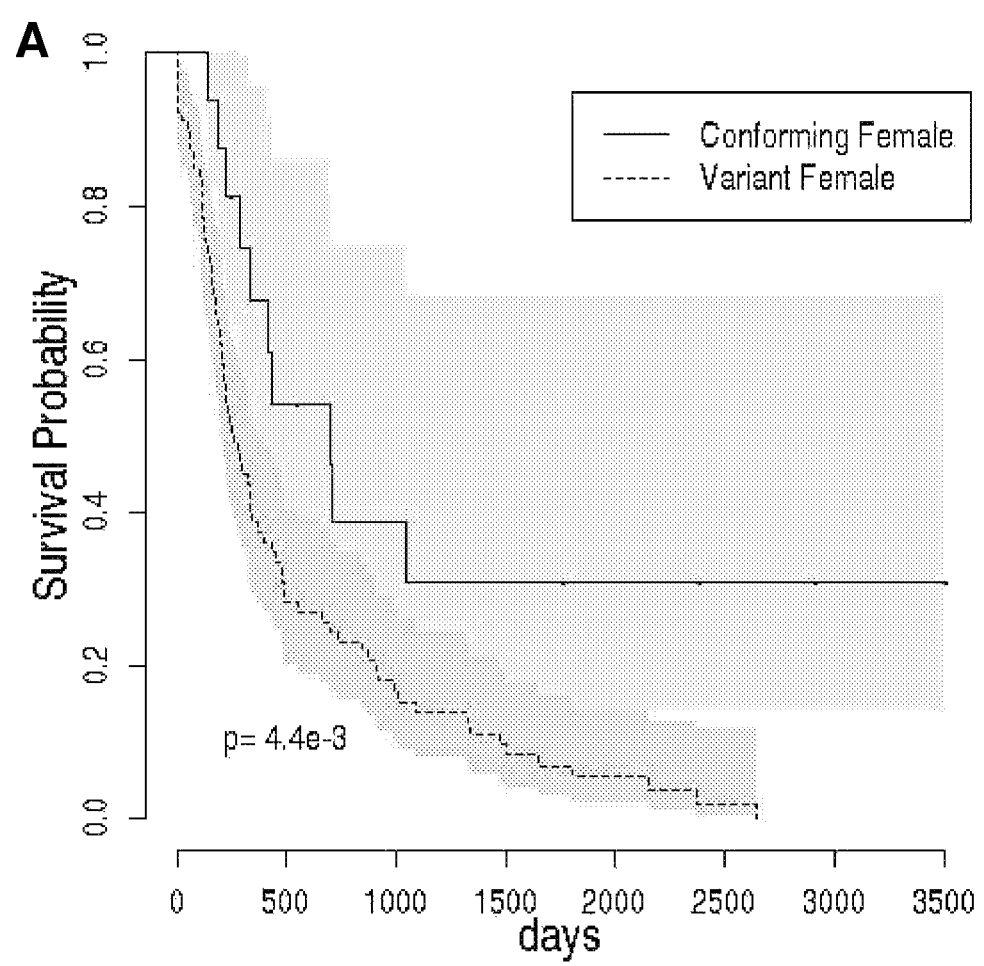
FIG. 15 (Panels A and B) provides graphs showing Kaplan-Meier curves for the differential survival of females (Panel A) and males (Panel B) in RNASeq defined conforming and variant groups. An RNASeq classifier was built to replicate the classes generated by the pathology model, and new samples were classified into their gender-based subtypes. Gene expression differences in the pathology defined subtypes are capable of replicating the survival differences. P-values calculated using the log-rank test (n=213).
Figure 15:
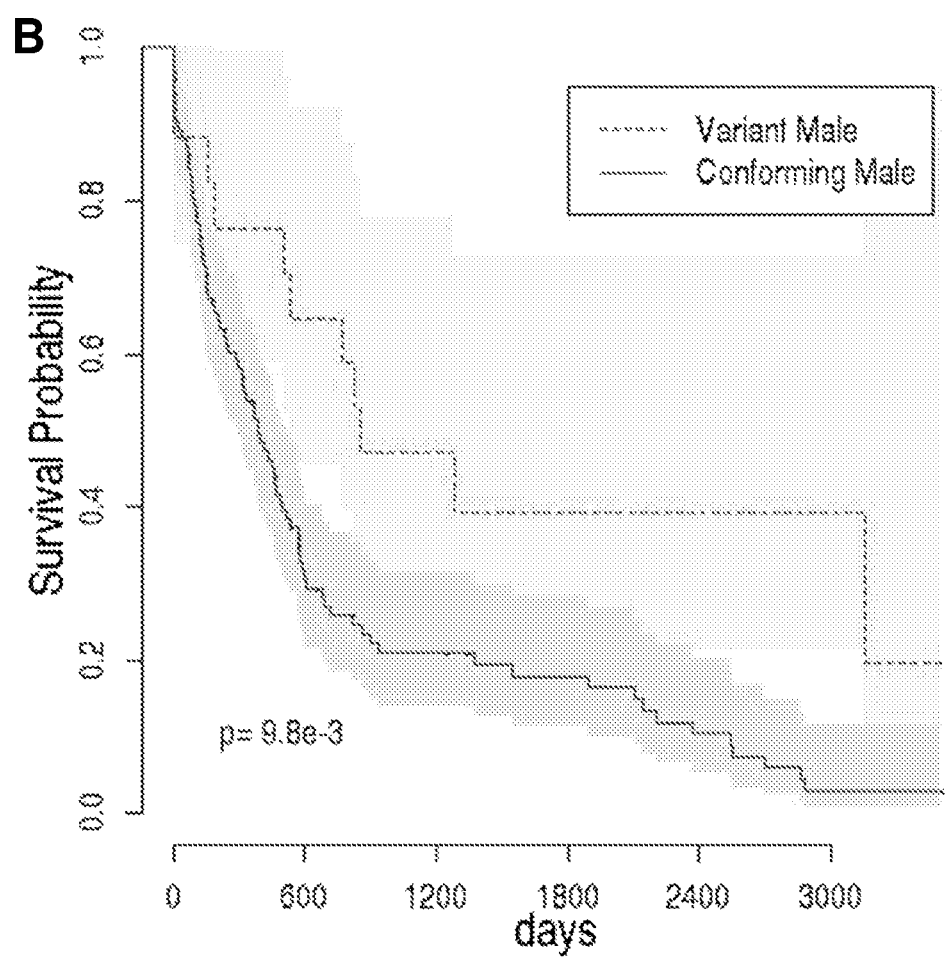

Once again, survival differences were clearly seen among the four subtypes (p=1.1e-4) as well as between the conforming and variant subtypes for each gender (FIG. 15A, 15B). This indicates that while the original subtypes can be defined solely based on gender and pathology, the differences among the subtypes exist in other elements of the disease biology.

The novel finding that gender impacts pathology features in lower grade gliomas is not intuitive. While differences in incidence rates for lower grade gliomas have been observed between genders, survival differences were not apparent (Cavenee et al., 2007). This may be due to each gender having unique subpopulations each with differing survival probabilities. Only by considering pathology in the context of gender was it possible to discover these subpopulations of clinical importance.

Figure 16:
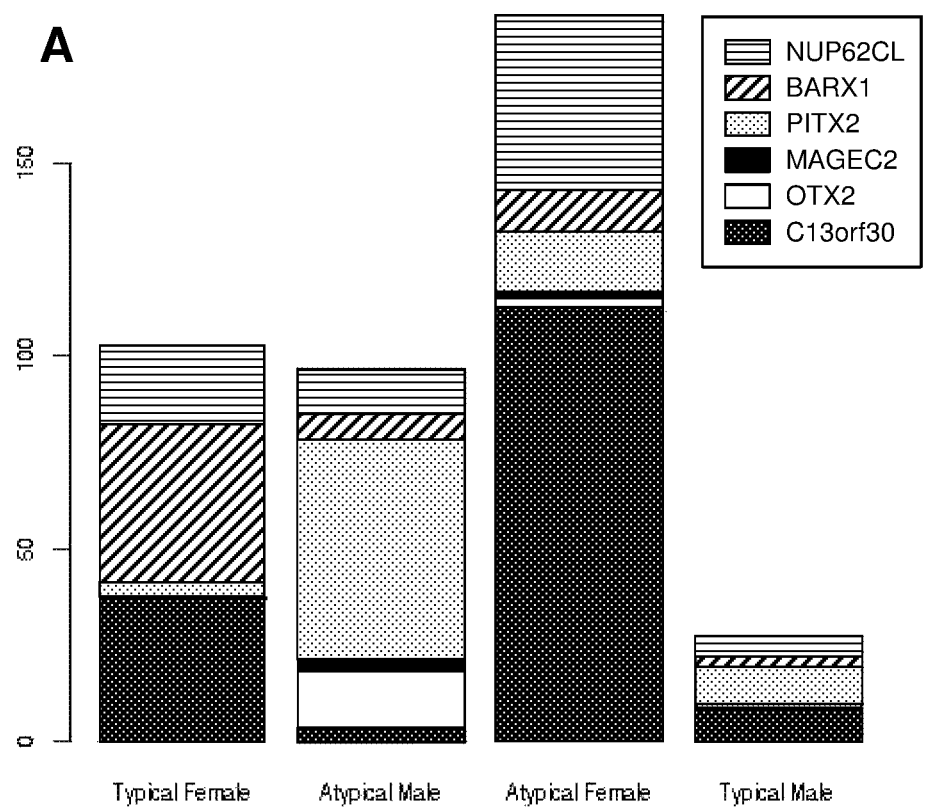
FIG. 16 (Panels A and B) provides bar graphs showing differential gene expression analysis for the four gender based subtypes. Panel A shows conditional mean expression values for differentially expressed genes. Panel B shows log 2 of the posterior fold change of the subtype with the preferential survival over the subtype with detrimental survival for each gender (Conforming Female over Variant Female in black, Variant Male over Conforming Male in white). Note that in 4 out of 6 cases, the group with the preferential survival shows opposite expression patterns between the genders.
Figure 16:
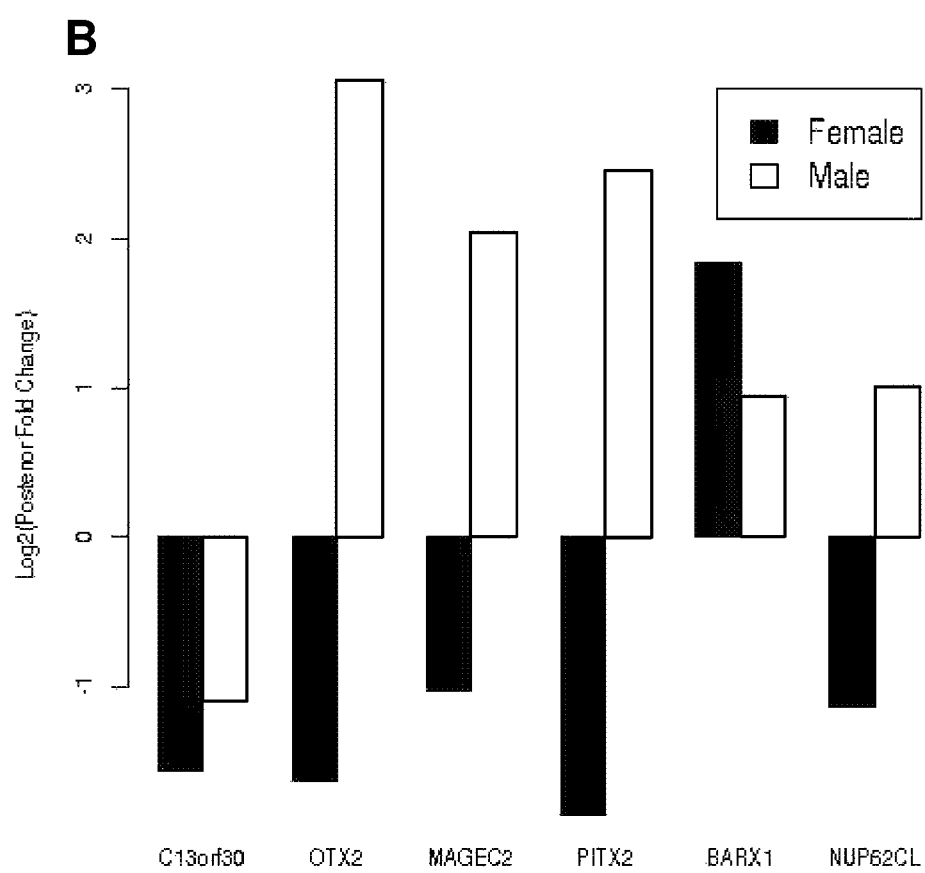

In order to suggest a mechanism for the survival differences in the gender-based subtypes, differential expression analysis in the four gender-based subtypes to look for molecular differences was performed. Differential expression analysis for the RNA seq data was performed using Bioconductor's EBSeq package using multiple hypothesis testing and a Bayesian approach to accurately estimate gene expression (Leng, N. et al. EBSeq: an empirical Bayes hierarchical model for inference in RNA-seq experiments. *Bioinformatics* 29, 1035-1043 (2013)). All possible combinations of differential expression within the four subtypes were explored, creating a total of 15 comparisons. Genes with a posterior probability of being differentially expressed in the four subtypes of <0.01 were selected for enrichment analysis using PANTHER with the species as *H. sapien* and the "biological process" branch of the Gene Ontology (Thomas, P. D. et al. PANTHER: A Library of Protein Families and Subfamilies Indexed by Function. *Genome Res.* 13, 2129-2141 (2003)). Final probabilities of enrichment were corrected using the Bonferroni correction. Six genes showed differential expression signatures which define the populations (FIG. 16A and Table 4). Table 4 shows the posterior probability for differential expression for each gene. Four of the genes, OTX2, MAGEC2, PITX2, and BARX1, are involved in developmental pathways that are known to be deregulated in brain cancers (Karamboulas, C. & Ailles, L. Developmental signaling pathways in cancer stem cells of solid tumors. *Biochim. Biophys. Acta BBA—Gen. Subj.* 1830, 2481-2495 (2013)). More specifically, two of the genes, OTX2 and PITX2, regulate diencephalon development, part of which becomes the pituitary gland (Table 5). The pituitary gland is responsible for many sexually dimorphic traits, therefore genes involved in its development could play a role in the gender based differences in survival. Table 5 gives binomial test p-values for GO Terms enriched among the six differentially expressed genes. Even though only a small subset of genes show differential expression, many of the genes share biological functions, indicating a possible mechanism. Notably, many of these functions are related to development, and as described above, some gene annotations are specific to diencephalon development, part of which becomes the pituitary gland.

TABLE 4

| Gene | PP |
|---|---|
| C13orf30 | 1.40e−4 |
| OTX2 | 1.92e−4 |
| MAGEC2 | 1.06e−2 |
| PITX2 | 1.93e−2 |
| BARX1 | 3.56e−2 |
| NUP62CL | 4.29e−2 |

TABLE 5

| GO Term | P-Value |
| --- | --- |
| Spleen development | 7.80e−3 |
| Diencephalon development | 1.72e−2 |
| Digestive system development | 6.17e−2 |
| Regionalization | 7.34e−2 |
| Pattern specification process | 9.49e−2 |

In order to examine the effect of the differentially expressed genes on survival for each gender, the posterior probability of the fold change in gene expression for the two subtypes for each gender was calculated (FIG. 16B). In OTX2, MAGEC2, PITX2, and NUP62CL the subtype having increased expression of these genes indicated preferential prognoses for males and detrimental prognoses for females. In females, the subtype with preferential survival (Conforming Female) showed decreased expression of the four genes, whereas in males the subtype with preferential survival (Variant Male) showed an increased expression. This makes it likely that the correlation of these genes with differential survival subtypes would not be discovered without the pathology-gender based profiling.

Of the four genes involved in development, three of these genes, OTX2, MAGEC2, and PITX2, have known roles in various cancers. OTX2, which normally plays a role in brain, craniofacial, and sensory organ development, mediates proliferation and apoptosis in gliomas (Wang et al., 2012). While normally only expressed in the testis, MAGEC2 is expressed in multiple types of cancer including tumors of the gastrointestinal tract (Ghadban, T. et al. Expression of cancer testis antigens CT10 (MAGE-C2) and GAGE in gastrointestinal stromal tumors. *Eur. J. Surg. Oncol. J. Eur. Soc. Surg. Oncol. Br. Assoc. Surg. Oncol.* 40, 1307-1312 (2014)), breast (Yang, F. et al. MAGEC2, an epithelial-mesenchymal transition inducer, is associated with breast cancer metastasis. *Breast Cancer Res. Treat.* 145, 23-32 (2014)), skin (Curioni-Fontecedro, A. et al. Expression of MAGE-C1/CT7 and MAGE-C2/CT10 predicts lymph node metastasis in melanoma patients. *PloS One* 6, e21418 (2011); Bhatia, N. et al. MAGE-C2 promotes growth and tumorigenicity of melanoma cells, phosphorylation of KAP1, and DNA damage repair. *J. Invest. Dermatol.* 133, 759-767 (2013); Caballero, O. L. et al. Frequent MAGE mutations in human melanoma. *PloS One* 5, (2010)), prostate (von Boehmer, L. et al. MAGE-C2/CT10 protein expression is an independent predictor of recurrence in prostate cancer. *PloS One* 6, e21366 (2011); Bode, P. K. et al. MAGEC2 is a sensitive and novel marker for seminoma: a tissue microarray analysis of 325 testicular germ cell tumors. *Mod. Pathol. Off. J. U. S. Can. Acad. Pathol. Inc* 24, 829-835 (2011)), bone (Pabst, C. et al. Expression and prognostic relevance of MAGE-C1/CT7 and MAGE-C2/CT10 in osteolytic lesions of patients with multiple myeloma. *Exp. Mol. Pathol.* 89, 175-181 (2010)), and liver (Riener, M.-O. et al. Frequent expression of the novel cancer testis antigen MAGE-C2/CT-10 in hepatocellular carcinoma. *Int. J. Cancer J. Int. Cancer* 124, 352-357 (2009)).

PITX2, which has been more extensively profiled, is normally involved in transcriptional regulation of the development of diencephalon derived structures, and mutations in PITX2 are known to be associated with multiple eye disorders (Reis, L. M. et al. PITX2 and FOXC1 spectrum of mutations in ocular syndromes. *Eur. J. Hum. Genet.* 20, 1224-1233 (2012)). More recent evidence has suggested a role for PITX2 in pituitary cancer (Acunzo, J. et al. Inactivation of PITX2 Transcription Factor Induced Apoptosis of Gonadotroph Tumoral Cells. *Endocrinology* 152, 3884-3892 (2011)) as well as cancers of the breast (Harbeck, N. et al. Multicenter Study Using Paraffin-Embedded Tumor Tissue Testing PITX2 DNA Methylation As a Marker for Outcome Prediction in Tamoxifen-Treated, Node-Negative Breast Cancer Patients. *J. Clin. Oncol.* 26, 5036-5042 (2008); Nimmrich, I. et al. DNA hypermethylation of PITX2 is a marker of poor prognosis in untreated lymph node-negative hormone receptor-positive breast cancer patients. *Breast Cancer Res. Treat.* 111, 429-437 (2007)), thyroid (Huang et al., 2010; Liu et al., 2013), prostate (Vela et al., 2014; Nimmrich et al., 2007; Schayek, H. et al. Global methylation analysis identifies PITX2 as an upstream regulator of the androgen receptor and IGF-I receptor genes in prostate cancer. *Horm. Metab. Res. Horm. Stoffwechselforschung Horm. Métabolisme* 44, 511-519 (2012)), eye (Lee, W.-K., Chakraborty, P. K. & Thévenod, F. Pituitary homeobox 2 (PITX2) protects renal cancer cell lines against doxorubicin toxicity by transcriptional activation of the multidrug transporter ABCB1. *Int. J. Cancer* 133, 556-567 (2013)), and ovaries (Fung, F. K. C. et al. Increased Expression of PITX2 Transcription Factor Contributes to Ovarian Cancer Progression. *PLoS ONE* 7, e37076 (2012)). These functions seem to be largely due to PITX2's role in regulating proteins involved in proliferation (Liu et al., 2013; Vela et al., 2014; Schayek et al., 2012; Fung et al., 2012) such as Cyclins A and D, Wnt, and IGF. It is noted that among these cancers PITX2 seems to have a role in, three of them: breast, prostate, and ovarian cancer are either exclusive to, or have highly biased occurrence rates in one gender. It is possible that the gender-specific role of PITX2 seen in this study may hold in other cancers, making discovery of this role easier to identify in these gender biased cancers.

The present analysis of pathology images and the discovery of gender based subtypes indicate a strong role for the future of pathology and image processing in understanding cancer. While much of the recent research into patient prognosis has shifted to molecular based profiles, this analysis indicates that pathology still has a vital role in improving patient health care. Computer based analysis allows for the discovery of new information within the pathology data that may not be understood without the aid of quantitative methods. It is believed that this pipeline will allow for new discoveries both in existing and newly generated data that may have never been appreciated otherwise.

REFERENCES

Adiga, U., Malladi, R., Fernandez-Gonzalez, R., de Solorzano, C. O., 2006. High-throughput analysis of multispectral images of breast cancer tissue. IEEE Trans. Image Process. 15, 2259-2268.

Aiad, H., Abdou, A., Bashandy, M., Said, A., Ezz-Elarab, S., Zahran, A., 2009. Computerized nuclear morphometry in the diagnosis of thyroid lesions with predominant follicular pattern. ecancermedicalscience 3.

Alexe, G., Monaco, J., Doyle, S., Basavanhally, A., Reddy, A., Seiler, M., Ganesan, S., Bhanot, G., Madabhushi, A., 2009. Towards Improved Cancer Diagnosis and Prognosis Using Analysis of Gene Expression Data and Computer Aided Imaging. Exp. Biol. Med. 234, 860-879.

Al-Kadi, O. S., 2010. Texture measures combination for improved meningioma classification of histopathological images. Pattern Recognit. 43, 2043-2053.

Altunbay, D., Cigir, C., Sokmensuer, C., Gunduz-Demir, C., 2010. Color Graphs for Automated Cancer Diagnosis and Grading. IEEE Trans. Biomed. Eng. 57, 665-674.

Arthur, D., Vassilvitskii, S., 2007. K-means++: The Advantages of Careful Seeding, in: Proceedings of the Eighteenth Annual ACM-SIAM Symposium on Discrete Algorithms, SODA '07. Society for Industrial and Applied Mathematics, Philadelphia, Pa., USA, pp. 1027-1035.

Baak, J. P. A., Kurver, P. H. J., Overdiep, S. H., Delemarre, J. F. M., Boon, M. E., Lindeman, J., Diegenbach, P. C., 1981. Quantitative, microscopical, computer-aided diagnosis of endometrial hyperplasia or carcinoma in individual patients. Histopathology 5, 689-695.

Basavanhally, A. N., Agner, S., Alexe, G., Bhanot, G., Ganesan, S., Madabhushi, A., 2008. Manifold learning with graph-based features for identifying extent of lymphocytic infiltration from high grade, her2 breast cancer histology. Image Anal Appl Biol Conjunction MICCAI.

Basavanhally, A. N., Ganesan, S., Agner, S., Monaco, J. P., Feldman, M. D., Tomaszewski, J. E., Bhanot, G., Madabhushi, A., 2010. Computerized Image-Based Detection and Grading of Lymphocytic Infiltration in HER2+ Breast Cancer Histopathology. IEEE Trans. Biomed. Eng. 57, 642-653.

Brook, A., El-Yaniv, R., Issler, E., Kimmel, R., Meir, R., Peleg, D., 2007. Breast Cancer Diagnosis From Biopsy Images Using Generic Features and SVMs. Presented at the IEEE Transactions on Information Technology in Biomedicine.

Bueno, G., Fernández, M., Serrano, I., Vállez, N., Gutiérrez, J., Déniz, O., Salido, J., 2014. Statistical and Frequential Bag of Features for Automatic Classification of Gliomas, in: Digital Pathology Classification and Segmentation Challenge. Presented at the MICCAI, Boston, Mass.

Cavenee, W. K., Louis, D. N., Ohgaki, H., Wiestler, 2007. WHO classification of tumours of the central nervous system. Distributed by WHO Press, World Health Organization, Geneva, Switzerland.

Chang, H., Parvin, B., 2014. Segmentation of Necrosis based on Spatial Organization, in: Digital Pathology Classification and Segmentation Challenge. Presented at the MICCAI, Boston, Mass.

Coons, S. W., Johnson, P. C., Scheithauer, B. W., Yates, A. J., Pearl, D. K., 1997. Improving diagnostic accuracy and interobserver concordance in the classification and grading of primary gliomas. Cancer 79, 1381-1393.

Depeursinge, A., Foncubierta-Rodriguez, A., Van De Ville, D., Muller, H., 2014. Rotation Covariant Texture Learning Using Steerable Riesz Wavelets. IEEE Trans. Image Process. 23, 898-908.

Divakar, R., 2009. Auto Contrast. MATLAB Cent. File Exch.

Doi, K., 2007. Computer-Aided Diagnosis in Medical Imaging: Historical Review, Current Status and Future Potential. Comput. Med. Imaging Graph. Off. J. Comput. Med. Imaging Soc. 31, 198-211.

Doyle, S., Agner, S., Madabhushi, A., Feldman, M., Tomaszewski, J., 2008. Automated grading of breast cancer histopathology using spectral clustering with textural and architectural image features, in: 5th IEEE International Symposium on Biomedical Imaging: From Nano to Macro, 2008. ISBI 2008. Presented at the 5th IEEE International Symposium on Biomedical Imaging: From Nano to Macro, 2008. ISBI 2008, pp. 496-499.

Doyle, S., Feldman, M. D., Shih, N., Tomaszewski, J., Madabhushi, A., 2012a. Cascaded discrimination of normal, abnormal, and confounder classes in histopathology: Gleason grading of prostate cancer. BMC Bioinformatics 13,282.

Doyle, S., Feldman, M., Tomaszewski, J., Madabhushi, A., 2012b. A Boosted Bayesian Multiresolution Classifier for Prostate Cancer Detection From Digitized Needle Biopsies. IEEE Trans. Biomed. Eng. 59, 1205-1218.

Doyle, S., Hwang, M., Shah, K., Madabhushi, A., Feldman, M., Tomazeweski, J., 2007. Automated Grading of Prostate Cancer Using Architextural and Textural Image Features, in: 4th IEEE International Symposium on Biomedical Imaging: From Nano to Macro, 2007. ISBI 2007. Presented at the 4th IEEE International Symposium on Biomedical Imaging: From Nano to Macro, 2007. ISBI 2007, pp. 1284-1287.

Dundar, M. M., Badve, S., Bilgin, G., Raykar, V., Jain, R., Sertel, O., Gurcan, M. N., 2011. Computerized Classification of Intraductal Breast Lesions using Histopathological Images. IEEE Trans. Biomed. Eng. 58, 1977-1984.

Dundar, M. M., Badve, S., Raykar, V. C., Jain, R. K., Sertel, O., Gurcan, M. N., 2010. A Multiple Instance Learning Approach toward Optimal Classification of Pathology Slides, in: 2010 20th International Conference on Pattern Recognition (ICPR). Presented at the 2010 20th International Conference on Pattern Recognition (ICPR), pp. 2732-2735.

Esgiar, A. N., Naguib, R. N. G., Sharif, B. S., Bennett, M. K., Murray, A., 2002. Fractal analysis in the detection of colonic cancer images. IEEE Trans. Inf. Technol. Biomed. 6, 54-58.

Farjam, R., Soltanian-Zadeh, H., Jafari-Khouzani, K., Zoroofi, R. A., 2007. An image analysis approach for automatic malignancy determination of prostate pathological images. Cytometry B Clin. Cytom. 72B, 227-240.

Fatima, K., Arooj, A., Majeed, H., 2014. A new texture and shape based technique for improving meningioma classification. Microsc. Res. Tech. n/a-n/a.

Friedman, J. H., Hastie, T., Tibshirani, R., 2010. Regularization Paths for Generalized Linear Models via Coordinate Descent. J. Stat. Softw. 33, 1-22.

Gil, J., Wu, H.-S., 2003. Applications of Image Analysis to Anatomic Pathology: Realities and Promises. Cancer Invest. 21, 950-959.

Glotsos, D., Kalatzis, I., Spyridonos, P., Kostopoulos, S., Daskalakis, A., Athanasiadis, E., Ravazoula, P., Nikiforidis, G., Cavouras, D., 2008. Improving accuracy in astrocytomas grading by integrating a robust least squares mapping driven support vector machine classifier into a two level grade classification scheme. Comput. Methods Programs Biomed. 90, 251-261.

Gunduz, C., Yener, B., Gultekin, S. H., 2004. The cell graphs of cancer. Bioinformatics 20, i145-i151.

Gupta, N., Sarkar, C., Singh, R., Karak, A. K., 2001. Evaluation of diagnostic efficiency of computerized image analysis based quantitative nuclear parameters in papillary and follicular thyroid tumors using paraffin-embedded tissue sections. Pathol. Oncol. Res. 7, 46-55.

Gurcan, M. N., Boucheron, L., Can, A., Madabhushi, A., Rajpoot, N., Yener, B., 2009. Histopathological Image Analysis: A Review. IEEE Rev. Biomed. Eng. 2, 147-171.

Gurcan, M. N., Pan, T., Shimada, H., Saltz, J., 2006. Image analysis for neuroblastoma classification: segmentation of cell nuclei. Conf. Proc. Annu. Int. Conf. IEEE Eng. Med. Biol. Soc. IEEE Eng. Med. Biol. Soc. Conf. 1, 4844-4847.

Hall, B. H., Ianosi-Irimie, M., Javidian, P., Chen, W., Ganesan, S., Foran, D. J., 2008. Computer-assisted assessment of the Human Epidermal Growth Factor Receptor 2 immunohistochemical assay in imaged histologic sections using a membrane isolation algorithm and quantitative analysis of positive controls. BMC Med. Imaging 8, 11.

Hamilton, P. W., Bankhead, P., Wang, Y., Hutchinson, R., Kieran, D., McArt, D. G., James, J., Salto-Tellez, M., 2014. Digital pathology and image analysis in tissue biomarker research. Methods, Advancing the boundaries of molecular cellular pathology 70, 59-73.

Haralick, R. M., Shanmugam, K., Dinstein, I., 1973. Textural features for image classification. IEE Trans. Syst. Man Cybern. SMC-3, 610-621.

Hou, H. S., Andrews, H., 1978. Cubic splines for image interpolation and digital filtering. IEEE Trans. Acoust. Speech Signal Process. 26, 508-517.

Huang, P.-W., Lai, Y.-H., 2010. Effective segmentation and classification for HCC biopsy images. Pattern Recognit. 43, 1550-1563.

Huang, P.-W., Lee, C.-H., 2009. Automatic Classification for Pathological Prostate Images Based on Fractal Analysis. IEEE Trans. Med. Imaging 28, 1037-1050.

Jafari-Khouzani, K., Soltanian-Zadeh, H., 2003. Multiwavelet grading of pathological images of prostate. IEEE Trans. Biomed. Eng. 50, 697-704.

James P Monaco, J. E. T., 2008. Detection of prostate cancer from whole-mount histology images using Markov random fields.

Kamentsky, L., Jones, T. R., Fraser, A., Bray, M.-A., Logan, D. J., Madden, K. L., Ljosa, V., Rueden, C., Eliceiri, K. W., Carpenter, A. E., 2011. Improved structure, function and compatibility for CellProfiler: modular high-throughput image analysis software. Bioinforma. Oxf. Engl. 27, 1179-1180.

Khasraw, M., Lassman, A. B., 2010. Advances in the Treatment of Malignant Gliomas. Curr. Oncol. Rep. 12, 26-33. doi:10.1007/s11912-009-0077-4

Kong, J., Cooper, L. A. D., Wang, F., Gao, J., Teodoro, G., Scarpace, L., Mikkelsen, T., Schniederjan, M. J., Moreno, C. S., Saltz, J. H., Brat, D. J., 2013. Machine-Based Morphologic Analysis of Glioblastoma Using Whole-Slide Pathology Images Uncovers Clinically Relevant Molecular Correlates. PLoS ONE 8, e81049.

Kong, J., Sertel, O., Shimada, H., Boyer, K. L., Saltz, J. H., Gurcan, M. N., 2009. Computer-aided evaluation of neuroblastoma on whole-slide histology images: Classifying grade of neuroblastic differentiation. Pattern Recognit., Digital Image Processing and Pattern Recognition Techniques for the Detection of Cancer 42, 1080-1092.

Kong, J., Shimada, H., Boyer, K., Saltz, J., Gurcan, M., 2007. Image analysis for automated assessment of grade of neuroblastic differentiation, in: 4th IEEE International Symposium on Biomedical Imaging: From Nano to Macro, 2007. ISBI 2007. Presented at the 4th IEEE International Symposium on Biomedical Imaging: From Nano to Macro, 2007. ISBI 2007, pp. 61-64.

Kwak, J. T., Hewitt, S. M., Sinha, S., Bhargava, R., 2011. Multimodal microscopy for automated histologic analysis of prostate cancer. BMC Cancer 11, 62.

Land, W. H., McKee, D. W., Zhukov, T., Song, D., Wei Qian, 2008. A kernelised fuzzy-Support Vector Machine CAD system for the diagnosis of lung cancer from tissue images. Int. J. Funct. Inform. Pers. Med. 1, 26-52.

Lessmann, B., Nattkemper, T. W., Hans, V. H., Degenhard, A., 2007. A method for linking computed image features to histological semantics in neuropathology. J. Biomed. Inform., Intelligent Data Analysis in Biomedicine 40, 631-641.

Meng, T., Lin, L., Shyu, M.-L., Chen, S.-C., 2010. Histology Image Classification Using Supervised Classification and Multimodal Fusion, in: 2010 IEEE International Symposium on Multimedia (ISM). Presented at the 2010 IEEE International Symposium on Multimedia (ISM), pp. 145-152.

Meyer, F., 1979. Iterative image transformations for an automatic screening of cervical smears. J. Histochem. Cytochem. 27, 128-135.

Monaco, J. P., Tomaszewski, J. E., Feldman, M. D., Hagemann, I., Moradi, M., Mousavi, P., Boag, A., Davidson, C., Abolmaesumi, P., Madabhushi, A., 2010. High-throughput detection of prostate cancer in histological sections using probabilistic pairwise Markov models. Med. Image Anal. 14, 617-629.

Mousavi, H. S., Monga, V., Rao, G., Rao, A. U. K., 2015. Automated discrimination of lower and higher grade gliomas based on histopathological image analysis. J. Pathol. Inform. 6, 15.

Naik, S., Doyle, S., Agner, S., Madabhushi, A., Feldman, M., Tomaszewski, J., 2008. Automated gland and nuclei segmentation for grading of prostate and breast cancer histopathology, in: 5th IEEE International Symposium on Biomedical Imaging: From Nano to Macro, 2008. ISBI 2008. Presented at the 5th IEEE International Symposium on Biomedical Imaging: From Nano to Macro, 2008. ISBI 2008, pp. 284-287.

Naik, S., Doyle, S., Feldman, M., Tomaszewski, J., Madabhushi, A., 2007. Gland Segmentation and Computerized Gleason Grading of Prostate Histology by Integrating Low-, High-level and Domain Specific Information. Presented at the MIAAB Workshop.

Onega, T., Weaver, D., Geller, B., Oster, N., Tosteson, A. N. A., Carney, P. A., Nelson, H., Allison, K. H., O'Malley, F. P., Schnitt, S. J., Elmore, J. G., 2014. Digitized Whole Slides for Breast Pathology Interpretation: Current Practices and Perceptions. J. Digit. Imaging 27, 642-648.

Ostrom, Q. T., Gittleman, H., Liao, P., Rouse, C., Chen, Y., Dowling, J., Wolinsky, Y., Kruchko, C., Barnholtz-Sloan, J., 2014. CBTRUS Statistical Report: Primary Brain and Central Nervous System Tumors Diagnosed in the United States in 2007-2011. Neuro-Oncol. 16, iv1-iv63.

Ozolek, J. A., Tosun, A. B., Wang, W., Chen, C., Kolouri, S., Basu, S., Huang, H., Rohde, G. K., 2014. Accurate diagnosis of thyroid follicular lesions from nuclear morphology using supervised learning. Med. Image Anal. 18, 772-780.

Pencina, M. J., D'Agostino, R. B., D'Agostino, R. B., Vasan, R. S., 2008. Evaluating the added predictive ability of a new marker: From area under the ROC curve to reclassification and beyond. Stat. Med. 27, 157-172.

Petushi, S., Garcia, F. U., Haber, M. M., Katsinis, C., Tozeren, A., 2006. Large-scale computations on histology images reveal grade-differentiating parameters for breast cancer. BMC Med. Imaging 6, 14.

Preusser, M., de Ribaupierre, S., Wohrer, A., Erridge, S. C., Hegi, M., Weller, M., Stupp, R., 2011. Current concepts and management of glioblastoma. Ann. Neurol. 70, 9-21. doi:10.1002/ana.22425

Qureshi, H., Rajpoot, N., Nattkemper, T., Hans, V., 2007. Comparative Analysis of Discriminant Wavelet Packet Features and Raw Image Features for Classification of Meningioma Subtypes. Presented at the Medical Image Understanding and Analysis, Aberystwyth, Wales.

Qureshi, H., Sertel, O., Rajpoot, N., Wilson, R., Gurcan, M., 2008. Adaptive Discriminant Wavelet Packet Transform and Local Binary Patterns for Meningioma Subtype Classification, in: Metaxas, D., Axel, L., Fichtinger, G., Székely, G. (Eds.), Medical Image Computing and Computer-Assisted Intervention—MICCAI 2008, Lecture Notes in Computer Science. Springer Berlin Heidelberg, pp. 196-204.

Ruifrok, A. C., Johnston, D. A., 2001. Quantification of histochemical staining by color deconvolution. Anal. Quant. Cytol. Histol. Int. Acad. Cytol. Am. Soc. Cytol. 23, 291-299.

Ruiz, A., Sertel, O., Ujaldon, M., Catalyurek, U., Saltz, J., Gurcan, M., 2007. Pathological Image Analysis Using the GPU: Stroma Classification for Neuroblastoma, in: IEEE International Conference on Bioinformatics and Biomedicine, 2007. BIBM 2007. Presented at the IEEE International Conference on Bioinformatics and Biomedicine, 2007. BIBM 2007, pp. 78-88.

Sboner, A., Eccher, C., Blanzieri, E., Bauer, P., Cristofolini, M., Zumiani, G., Forti, S., 2003. A multiple classifier system for early melanoma diagnosis. Artif. Intell. Med. 27, 29-44.

Schnorrenberg, F., Pattichis, C. S., Kyriacou, K. C., Schizas, C. N., 1997. Computer-aided detection of breast cancer nuclei. IEEE Trans. Inf. Technol. Biomed. 1, 128-140.

Sertel, O., Kong, J., Shimada, H., Catalyurek, U. V., Saltz, J. H., Gurcan, M. N., 2009. Computer-aided prognosis of neuroblastoma on whole-slide images: Classification of stromal development. Pattern Recognit., Digital Image Processing and Pattern Recognition Techniques for the Detection of Cancer 42, 1093-1103.

Sertel, O., Lozanski, G., Shana'ah, A., Gurcan, M. N., 2010. Computer-aided Detection of Centroblasts for Follicular Lymphoma Grading using Adaptive Likelihood based Cell Segmentation. IEEE Trans. Biomed. Eng. 57, 2613-2616.

Sparks, R., Madabhushi, A., 2013. Explicit shape descriptors: Novel morphologic features for histopathology classification. Med. Image Anal. 17, 997-1009.

Sudbø, J., Marcelpoil, R., Reith, A., 2000. New algorithms based on the Voronoi Diagram applied in a pilot study on normal mucosa and carcinomas. Anal. Cell. Pathol. 21, 71-86.

Tabesh, A., Kumar, V. P., Pang, H.-Y., Verbel, D., Kotsianti, A., Teverovskiy, M., Saidi, O., 2005. Automated prostate cancer diagnosis and Gleason grading of tissue microarrays. pp. 58-70.

Tabesh, A., Teverovskiy, M., 2006. Tumor Classification in Histological Images of Prostate Using Color Texture, in: Fortieth Asilomar Conference on Signals, Systems and Computers, 2006. ACSSC '06. Presented at the Fortieth Asilomar Conference on Signals, Systems and Computers, 2006. ACSSC '06, pp. 841-845.

Tabesh, A., Teverovskiy, M., Pang, H.-Y., Kumar, V. P., Verbel, D., Kotsianti, A., Saidi, O., 2007. Multifeature Prostate Cancer Diagnosis and Gleason Grading of Histological Images. IEEE Trans. Med. Imaging 26, 1366-1378.

Tahir, M. A., Bouridane, A., 2006. Novel Round-Robin Tabu Search Algorithm for Prostate Cancer Classification and Diagnosis Using Multispectral Imagery. IEEE Trans. Inf. Technol. Biomed. 10, 782-793.

Tasoulis, D. K., Spyridonos, P., Pavlidis, N. G., Cavouras, D., Ravazoula, P., Nikiforidis, G., Vrahatis, M. N., 2003. Urinary Bladder Tumor Grade Diagnosis Using On-line Trained Neural Networks, in: Palade, V., Howlett, R. J., Jain, L. (Eds.), Knowledge-Based Intelligent Information and Engineering Systems, Lecture Notes in Computer Science. Springer Berlin Heidelberg, pp. 199-206.

Teverovskiy, M., Kumar, V., Ma, J., Kotsianti, A., Verbel, D., Tabesh, A., Pang, H.-Y., Vengrenyuk, Y., Fogarasi, S., Saidi, O., 2004. Improved prediction of prostate cancer recurrence based on an automated tissue image analysis system, in: IEEE International Symposium on Biomedical Imaging: Nano to Macro, 2004. Presented at the IEEE International Symposium on Biomedical Imaging: Nano to Macro, 2004, pp. 257-260 Vol. 1.

Thiran, J. P., Macq, B., 1996. Morphological feature extraction for the classification of digital images of cancerous tissues. IEEE Trans. Biomed. Eng. 43, 1011-1020.

Tsai, H.-W., Tsai, H.-H., Kuo, F.-Y., Chang, K.-C., 2009. Computerized analyses of morphology and proliferative activity differentiate hepatoblastoma from paediatric hepatocellular carcinoma. Histopathology 54, 328-336.

Tuzel, O., Yang, L., Meer, P., Foran, D. J., 2007. Classification of hematologic malignancies using texton signatures. Pattern Anal. Appl. PAA 10, 277-290.

Wang, W., Ozolek, J. A., Rohde, G. K., 2010. Detection and classification of thyroid follicular lesions based on nuclear structure from histopathology images. Cytometry A 77A, 485-494.

Wetzel, A. W., Crowley, R., Kim, S., Dawson, R., Zheng, L., Joo, Y. M., Yagi, Y., Gilbertson, J., Gadd, C., Deerfield, D. W., Becich, M. J., 1999. Evaluation of prostate tumor grades by content-based image retrieval. pp. 244-252.

Weyn, B., van de Wouwer, G., van Daele, A., Scheunders, P., van Dyck, D., van Marck, E., Jacob, W., 1998. Automated breast tumor diagnosis and grading based on wavelet chromatin texture description. Cytometry 33, 32-40.

Xu, Y., Jia, Z., Zhang, F., Ai, Y., Lai, M., Chang, E. I.-C., 2014. Deep Convolutional Activation Features for Large Brain Tumor Histopathology Image Classification, in: Digital Pathology Classification and Segmentation Challenge. Presented at the MICCAI, Boston, Mass.

Xu, Y., Zhu, J.-Y., Chang, E. I.-C., Lai, M., Tu, Z., 2014. Weakly supervised histopathology cancer image segmentation and classification. Med. Image Anal. 18, 591-604.

Yang, L., Chen, W., Meer, P., Salaru, G., Goodell, L. A., Berstis, V., Foran, D. J., 2009. Virtual Microscopy and Grid-Enabled Decision Support for Large-Scale Analysis of Imaged Pathology Specimens. IEEE Trans. Inf. Technol. Biomed. 13, 636-644.

Zhao, D., Daut, D. G., 1991. Shape recognition using morphological transformations, in: 1991 International Conference on Acoustics, Speech, and Signal Processing, 1991. ICASSP-91. Presented at the, 1991 International Conference on Acoustics, Speech, and Signal Processing, 1991. ICASSP-91, pp. 2565-2568 vol. 4.

Zou, H., Hastie, T., 2005. Regularization and variable selection via the Elastic Net. J. R. Stat. Soc. Ser. B 67, 301-320.

Notwithstanding the appended clauses, the disclosure set forth herein is also defined by the following clauses:

1. A computerized method for classifying tissue characteristics in digital pathology images, comprising the steps of:
   (a) obtaining a digital pathology image of a tissue from a subject;
   (b) dividing the digital pathology image into tiles;
   (c) extracting primary features from the tiles in step (b), the primary features comprising shape, color, and texture features in the image;
   (d) grouping similar tiles into a number of sets based on similarity of the primary features;
   (e) selecting a representative tile from each set in step (d);
   (f) extracting secondary features from selected tiles from step (e), wherein the secondary features refine primary features; and (g) assigning values to selected tiles, based on secondary features; and
(h) comparing the values in step (g) to values in a reference.
2. The method according to clause 1, further comprising generating a classification of tissue in the image based on the comparing the values in step (g) to values in a reference.
3. The method according to clause 2, wherein the classification indicates a disease condition or prognosis.
4. The method according to clause 3, wherein the digital pathology image of a tissue in step (a) is selected from tissues from brain, lung, breast, thyroid, blood, prostate tissue, duodenum, and colon.
5. The method according to clause 4, wherein the tissue is brain tissue.
6. The method according to any one of clauses 1 to 5, wherein the slides are digitally scanned at multiple resolutions between from about 2.5-40×.
7. The method according to any one of clauses 1 to 6, wherein the step of (a) obtaining a digital pathology image comprises obtaining an image stained with two different stains, one basic and one acidic, whereby DNA structures and RNA structures are stained by the basic stain and proteins and cytoplasmic structures are stained by the acidic stain.
8. The method according to any one of clauses 1 to 7, wherein the step of (b) dividing substantially the entire pathology image into tiles comprises dividing into between 5 and 20 tiles, and each tile has a size of about 1024 by 1024 pixels (1,048,576 pixels), or a pixel count between about 500,000 pixels to 2 million pixels.
9. The method according to any one of clauses 1 to 8, further comprising a step of deconvoluting colors from the two different stains, prior to extracting primary features (c).
10. The method according to any one of clauses 1 to 9, wherein the step of (c) extracting primary features comprises determining at least one of nuclear segmentation, an unaligned Reisz feature, and a Haralick texture feature.
11. The method according to any one of clauses 1 to 10, wherein the step of (d) grouping similar tiles comprises conducting one or both of a principal component analysis (PCA) to reduce the number of primary features and a K-means clustering.
12. The method according to any one of clauses 1 to 11, wherein the step of (e) selecting a representative tiles comprises determining a single representative tile whose values are the closest to the centroid of the cluster.
13. The method according to any one of clauses 1 to 12, wherein step of (f) extracting secondary features comprises (i) determining primary features in greater detail as in primary features and at least one of (ii) aligning Reisz features and (iii) determining more skeleton features of the nuclear morphology.
14. The method according to any one of clauses 1 to 13, wherein the step of (g) assigning a value to each selected tile comprises generating a classification using a regression model.
15. The method according to clause 14 wherein the regression model comprises an elastic net linear regression model.
16. The method according to any one of clauses 1 to 15, wherein the step of (g) assigning a value comprises weighted voting.
17. The method according to any one of clauses 2 to 16, wherein the step of (h) generating a classification comprises a classification of a type of cancer.
18. The method according to clause 17, wherein the classification distinguishes a type of brain cancer.
19. The method according to clause 18, wherein the classification is one of lower grade glioma and glioblastoma multiforme.
20. The method according to any one of clauses 2 to 19, wherein the step of (h) generating a classification comprises a classification of gender, and the tissue is brain tissue from a subject having a brain cancer.
21. The method according to clause 20, further comprising determining levels of one or more of OTX2, MAGEC2, PITX2, and BARX1 gene expression in the subject.
22. The method according to clause 21, wherein increased expression indicates preferential prognoses for males and detrimental prognoses for females.
23. A computer system for classifying tissue characteristics in digital pathology images, comprising a computer-readable storage device containing a set of instructions that causes the computer system to perform the steps of a method of any one of clauses 1-22.
24. A computer-readable storage medium containing instructions for carrying out the method according to any one of clauses 1-22.

CONCLUSION

The above specific description is meant to exemplify and illustrate the invention and should not be seen as limiting the scope of the invention, which is defined by the literal and equivalent scope of the appended claims. Any patents or publications mentioned in this specification are intended to convey details of methods and materials useful in carrying out certain aspects of the invention which may not be explicitly set out but which would be understood by workers in the field. Such patents or publications are hereby incorporated by reference to the same extent as if each was specifically and individually incorporated by reference and contained herein, as needed for the purpose of describing and enabling the method or material referred to.

What is claimed is:
1. A computerized method for classifying tissue characteristics in digital pathology images, comprising the steps of:
(a) obtaining a digital pathology image of a tissue from a subject;
(b) dividing the digital pathology image into tiles;
(c) extracting primary features from the tiles in step (b), the primary features comprising shape, color, and texture features in the image;
(d) grouping similar tiles into a number of sets based on similarity of the primary features;
(e) selecting a representative tile from each set in step (d);
(f) extracting secondary features from selected tiles from step (e), wherein the secondary features refine primary features;
(g) assigning values to selected tiles, based on secondary features; and
(h) comparing the values in step (g) to values in a reference.
2. The method according to claim 1, comprising generating a classification of tissue in the image based on the comparing the values in step (g) to values in a reference.
3. The method according to claim 2, wherein the classification indicates a disease condition or prognosis.

4. The method according to claim 2, wherein generating a classification comprises a classification of a type of cancer.

5. The method according to claim 4, wherein the classification distinguishes a type of brain cancer.

6. The method according to claim 5, wherein the classification is one of lower grade glioma and glioblastoma multiforme.

7. The method according to claim 2, wherein generating a classification comprises a classification of gender, and the tissue is brain tissue from a subject having a brain cancer.

8. The method according to claim 1, wherein the tissue is selected from the group consisting of: brain, lung, breast, thyroid, blood, prostate tissue, duodenum, and colon.

9. The method according to claim 8, wherein the tissue is brain tissue.

10. The method according to claim 1, wherein the slides are digitally scanned at multiple resolutions between from about 2.5-40x.

11. The method according to claim 1, wherein the step of (a) obtaining a digital pathology image comprises obtaining an image of a tissue stained with two different stains, one basic and one acidic, whereby DNA structures and RNA structures are stained by the basic stain and proteins and cytoplasmic structures are stained by the acidic stain.

12. The method according to claim 1, wherein the step of (b) dividing substantially the entire pathology image into tiles comprises dividing into between 5 and 20 tiles, and each tile has a size of about 1024 by 1024 pixels (1,048,576 pixels), or a pixel count between about 500,000 pixels to 2 million pixels.

13. The method according to claim 1, further comprising a step of deconvoluting colors from the two different stains, prior to extracting primary features (c).

14. The method according to claim 1, wherein the step of (c) extracting primary features comprises determining at least one of nuclear segmentation, an unaligned Reisz feature, and a Haralick texture feature.

15. The method according to claim 1, wherein the step of (d) grouping similar tiles comprises conducting one or both of a principal component analysis (PCA) to reduce the number of primary features and a K-means clustering.

16. The method according to claim 1, wherein the step of (e) selecting a representative tiles comprises determining a single representative tile whose values are the closest to the centroid of the cluster.

17. The method according to claim 1, wherein step of (f) extracting secondary features comprises (i) determining primary features in greater detail as in primary features and at least one of (ii) aligning Reisz features and (iii) determining more skeleton features of the nuclear morphology.

18. The method according to claim 1, wherein the step of (g) assigning a value to each selected tile comprises: generating a classification using a regression model, weighted voting, or both.

19. A computer system for classifying tissue characteristics in digital pathology images, comprising a computer-readable storage device containing a set of instructions that causes the computer system to perform the steps of the method according to claim 1.

20. A non-transitory computer-readable storage medium containing instructions for carrying out the method according to claim 1.

* * * * *